(12) United States Patent
Hu

(10) Patent No.: US 12,014,223 B2
(45) Date of Patent: Jun. 18, 2024

(54) CONTENT SHARING METHOD AND ELECTRONIC DEVICE

(71) Applicant: Huawei Technologies Co., Ltd., Shenzhen (CN)

(72) Inventor: Yingfeng Hu, Shenzhen (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 172 days.

(21) Appl. No.: 17/609,557

(22) PCT Filed: May 28, 2020

(86) PCT No.: PCT/CN2020/092908
§ 371 (c)(1),
(2) Date: Nov. 8, 2021

(87) PCT Pub. No.: WO2020/239019
PCT Pub. Date: Dec. 3, 2020

(65) Prior Publication Data
US 2022/0229708 A1     Jul. 21, 2022

(30) Foreign Application Priority Data
May 31, 2019   (CN) .......................... 201910473206.9

(51) Int. Cl.
| | |
|---|---|
| G06F 9/54 | (2006.01) |
| G06F 3/04817 | (2022.01) |
| G06F 3/04842 | (2022.01) |
| G06F 3/04883 | (2022.01) |
| G06F 16/16 | (2019.01) |
| G06F 16/176 | (2019.01) |

(52) U.S. Cl.
CPC ............ *G06F 9/54* (2013.01); *G06F 3/04817* (2013.01); *G06F 3/04842* (2013.01); *G06F 3/04883* (2013.01); *G06F 16/162* (2019.01); *G06F 16/176* (2019.01)

(58) Field of Classification Search
None
See application file for complete search history.

(56) References Cited

U.S. PATENT DOCUMENTS

| | | | |
|---|---|---|---|
| 2009/0164944 A1* | 6/2009 | Webster | ................ G06F 3/0489 715/838 |
| 2013/0145280 A1 | 6/2013 | Green | |
| 2014/0053116 A1* | 2/2014 | Smith | .................. G06F 3/0488 715/863 |

(Continued)

FOREIGN PATENT DOCUMENTS

| | | |
|---|---|---|
| CN | 103593180 A | 2/2014 |
| CN | 106055202 A | 10/2016 |

(Continued)

*Primary Examiner* — Syed A Roni
(74) *Attorney, Agent, or Firm* — Conley Rose, P.C.

(57) ABSTRACT

A content sharing method includes displaying, by an electronic device, an interface of a first application, where a text and a picture are displayed in the interface, performing, by a user, an operation on the picture in the interface such that the electronic device displays the picture in a suspended first window, dragging, by the user, the picture in the first window to a second application, and sharing, by the user, the picture with another user using the second application.

20 Claims, 50 Drawing Sheets

(56) References Cited

U.S. PATENT DOCUMENTS

| | | | | |
|---|---|---|---|---|
| 2014/0331114 | A1* | 11/2014 | Shen | G06F 16/957 |
| | | | | 715/205 |
| 2015/0026549 | A1* | 1/2015 | Shao | G06F 40/134 |
| | | | | 715/205 |
| 2016/0357415 | A1* | 12/2016 | Bovet | H04N 23/62 |
| 2017/0083189 | A1 | 3/2017 | Yang et al. | |
| 2018/0300187 | A1 | 10/2018 | Powell et al. | |
| 2022/0050582 | A1 | 2/2022 | Zhou et al. | |

FOREIGN PATENT DOCUMENTS

| | | | | |
|---|---|---|---|---|
| CN | 106681641 | A | 5/2017 | |
| CN | 107463310 | A | 12/2017 | |
| CN | 107465949 | A | 12/2017 | |
| CN | 108536365 | A | 9/2018 | |
| CN | 108595237 | A | 9/2018 | |
| CN | 109164964 | A | 1/2019 | |
| CN | 109271262 | A | 1/2019 | |
| CN | 109445572 | A | 3/2019 | |
| CN | 109683714 | A | 4/2019 | |
| CN | 110333814 | A | 10/2019 | |
| WO | WO-2016203096 | A1 * | 12/2016 | G06F 17/30165 |

* cited by examiner

TO

CONTENT SHARING METHOD AND ELECTRONIC DEVICE

CROSS-REFERENCE TO RELATED APPLICATIONS

This is a U.S. National Stage of International Patent Application No. PCT/CN2020/092908 filed on May 28, 2020, which claims priority to Chinese Patent Application No. 201910473206.9 filed on May 31, 2019, both of which are hereby incorporated by reference in their entireties.

TECHNICAL FIELD

The present invention relates to the field of terminal technologies, and in particular, to a content sharing method and an electronic device.

BACKGROUND

With development of terminal technologies, electronic devices such as smartphones and tablet computers start to have more functions. Mobile phones are used as an example. Mobile phones become a main communication tool for communication between users. In particular, in social applications, for example, WeChat and QQ, in the mobile phones, users can chat and share content such as pictures and texts that the users view in another social media application.

For example, to-be-shared content is a picture. In the conventional technology, some applications, for example, a browser application, support sharing of a picture on a web page to a friend in a social application, and some applications, for example, a Weibo application, do not support separate sharing of a picture. Refer to FIG. 1. If a user wants to separately share a picture 101 embedded in a text in a Weibo interface 110, an operation process is cumbersome and operations are inconvenient for the user.

SUMMARY

Embodiments of this application provide a content sharing method and an electronic device, to simplify operations of sharing content in an application.

According to a first aspect, an embodiment of this application provides a content sharing method. The method may be applied to a first electronic device, and includes: The first electronic device displays a home screen. The home screen includes a first application and a second application. The first electronic device detects a first operation on the first application, and displays a first user interface in response to the first operation. The first user interface includes first content, and the first content includes a picture or a text. Then the first electronic device detects a second operation on the first content, and displays a first window in a first region in response to the second operation. The first content is displayed in the first window. The first electronic device detects a third operation on the electronic device, and displays the home screen in response to the third operation. Then the first electronic device detects a fourth operation on the second application, and displays a second user interface in response to the fourth operation. The second user interface includes a first input box. When the first window is displayed, the first electronic device detects a fifth operation, and displays the first content in the first input box in response to the fifth operation. The first electronic device detects a sixth operation on the second user interface, and sends the first content to a second electronic device in response to the sixth operation.

In this solution, the first electronic device may display the first window in the first region in response to an operation on the first content in the first application, where the first content is displayed in the first window, and then the first electronic device may display the first content in the input box of the second application in response to an operation on the first content in the first window, and then share the first content with a user of the second electronic device by using the second application, so that operations of sharing content in an application can be simplified, and content sharing experience of the user can be improved.

In a possible design, the second operation may include but is not limited to any one of the following operations: touching and holding with two fingers, holding with one hand, tapping with a knuckle, and tapping with a knuckle and drawing a closed pattern.

In a possible design, the first electronic device may display a third user interface in response to the second operation, where the third user interface includes a copy control; and when detecting a seventh operation performed on the copy control, the first electronic device may display the first window in the first region in response to the seventh operation.

In this solution, another manner of displaying the first window can be provided.

In a possible design, before detecting the fifth operation, the first electronic device may further stop displaying the first window in the first region. Then the first electronic device detects an eighth operation on the electronic device, and displays the first window in the first region in response to the eighth operation. The eighth operation includes any one of the following: a slide gesture in a first direction of the first region, a touch and hold gesture in the first region, and tapping a floating window when the floating window is displayed on the electronic device.

In this solution, when the first window is not used, display of the first window may be stopped, so that display of other content is not affected. Further, when display of the first window is stopped, display of the first window may be triggered again based on a user requirement.

In a possible design, a type of the first content is a picture, and a thumbnail corresponding to the picture is displayed in the first window.

In this solution, when a picture needs to be shared, the first content may be displayed in the first window based on a requirement. For example, when a size of a picture is less than or equal to a size of the first window, an original picture of the picture may be displayed. For another example, when a size of a picture is greater than a size of the first window, a thumbnail of the picture may be displayed.

In a possible design, when detecting a ninth operation performed on the thumbnail corresponding to the picture, the first electronic device may further display a preview window in response to the ninth operation. The picture is displayed in the preview window.

In this solution, when the picture is displayed in a form of the thumbnail in the first window, displaying the picture in the preview window can enable a user to view the picture corresponding to the thumbnail.

In a possible design, an area of the first region is less than that of a display region of a display screen.

In this solution, when the first region is displayed in the first window, the user may further view another region different from the first region, and when viewing the first window displayed in the first region, the user may further perform an operation on content displayed in the another region.

In a possible design, the first region is located on any-side edge of the display region of the display screen, or the first region includes a second region and a third region, the second region is located on a first-side edge of the display region of the display screen, and the third region is located on a second-side edge of the display region.

In this solution, another region in the first region can be in the middle of the display screen, so that user experience of viewing the another region or performing an operation on the another region can be improved.

In a possible design, the third user interface further includes a share control; and when detecting a tenth operation performed on the share control, the first electronic device may further display a fourth user interface in response to the tenth operation, where the fourth user interface includes a control of at least one application. When detecting an eleventh operation on a control of the second application, the first electronic device may further display a fifth user interface in response to the eleventh operation, where the fifth user interface includes a second input box. When detecting a twelfth operation performed on the second input box, the first electronic device displays the first content in the second input box in response to the twelfth operation. When detecting a thirteenth operation performed on the fifth user interface, the first electronic device sends the first content to the second electronic device in response to the thirteenth operation.

In this solution, the first electronic device can share the first content in the first application with the user of the second electronic device by using the second application.

According to a second aspect, an embodiment of this application provides an electronic device, including one or more processors and one or more memories.

The one or more memories are coupled to the one or more processors, the one or more memories are configured to store computer program code, the computer program code includes computer instructions, and when the one or more processors execute the computer instructions, the electronic device may perform the content sharing method in any one of the first aspect and the possible designs of the first aspect.

According to a third aspect, an embodiment of this application provides a computer storage medium, including computer instructions. When the computer instructions run on an electronic device, the electronic device may perform the content sharing method in any one of the first aspect and the possible designs of the first aspect.

According to a fourth aspect, an embodiment of this application provides a computer program product. When the computer program product runs on a computer, the computer may perform the content sharing method in any one of the first aspect and the possible designs of the first aspect.

In addition, for technical effects brought by any possible design manner in the second aspect to the fourth aspect, refer to the technical effects brought by different design manners in the first aspect. Details are not described herein again.

DESCRIPTION OF EMBODIMENTS

Figure 1:
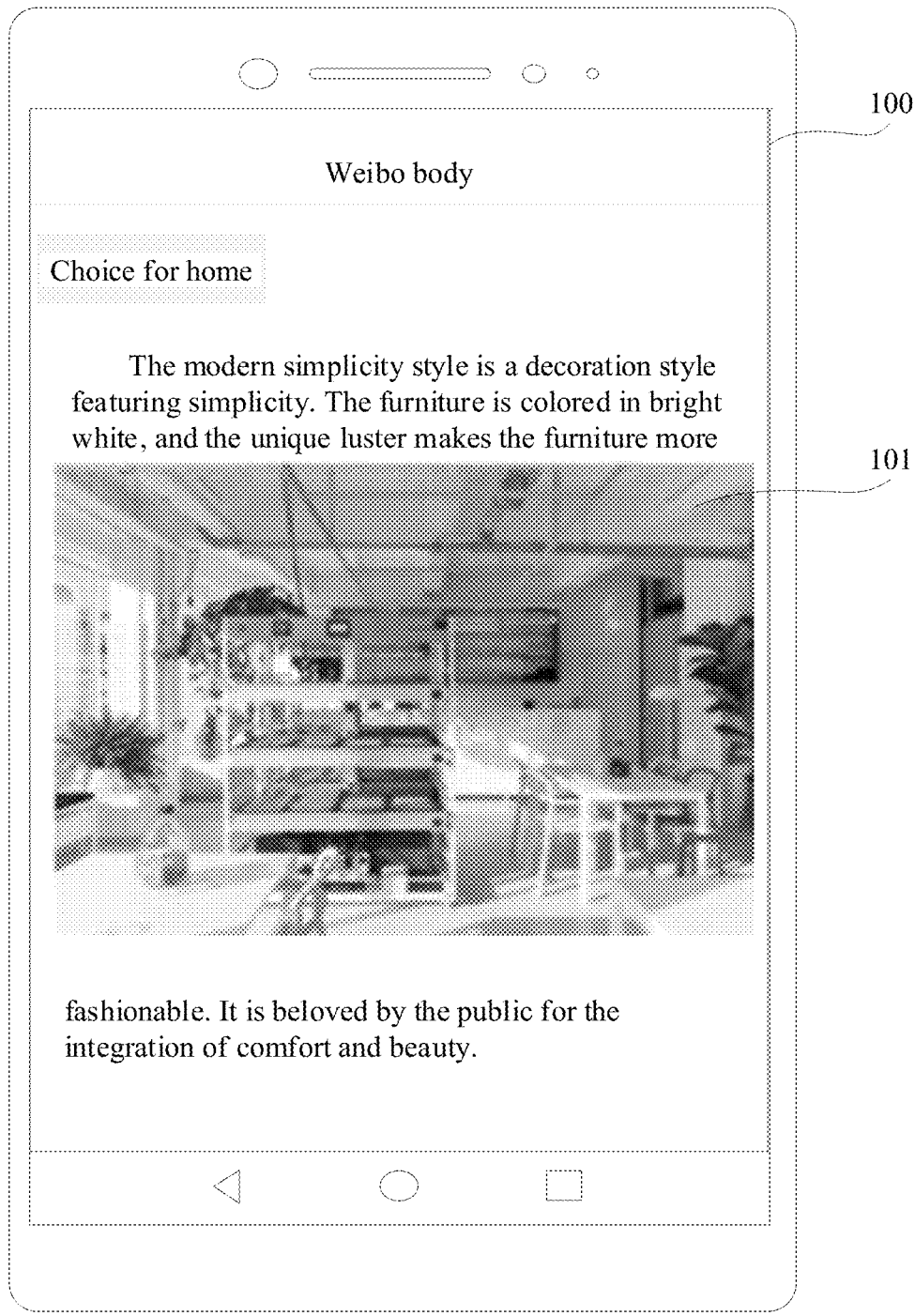
FIG. 1 (PRIOR ART) is a schematic diagram of an example of a group of interfaces.

To make the objectives, technical solutions, and advantages of this application clearer, the following further describes this application in detail with reference to the accompanying drawings. A specific operation method in a method embodiment may also be applied to an apparatus embodiment or a system embodiment. In the descriptions of this application, unless otherwise stated, "a plurality of" means two or more than two.

It should be noted that, the term "and/or" in this specification describes only an association relationship between associated objects and represents that three relationships may exist. For example, A and/or B may represent the following three cases: Only A exists, both A and B exist, and only B exists. In addition, unless otherwise specified, the character "/" in this specification generally indicates an "or" relationship between the associated objects. In addition, in the descriptions of the embodiments of this application, words such as "first" and "second" are used only for the purpose of distinguishing between descriptions, and cannot be understood as indicating or implying relative importance, or as indicating or implying a sequence.

The following embodiments of this application provide a content sharing method and an electronic device. When the electronic device displays an interface of a first application, where a text and a picture A are displayed in the interface of the first application, for example, if a user wants to share the picture A, the user may trigger an operation of a preset gesture in a region in which the picture A is located. The electronic device may display the picture A in a first region in the user interface in response to the operation. Then the user may drag the picture A in the first region to a second application to share the picture A with another user by using the second application. In this way, operations of sharing content by the user can be simplified, and user experience in a process of sharing content by the user can be improved.

In the following embodiments of this application, the first application may be any one of installed applications in the electronic device, and the second application may be a social application, for example, WeChat or QQ, that has a function of sharing content with another user.

The installed applications in the electronic device may include applications installed, by a user who uses the electronic device, in the electronic device based on a requirement of the user, for example, Weibo, WeChat (WeChat), Facebook (Facebook), Alipay, Skype, and a bank client application, and may also include applications installed, by default, in the electronic device that are used to implement basic functions, for example, Messages, Phone, Email, and Contacts. It should be understood that the foregoing describes only examples, the installed application in the electronic device may further include another possible client application, and this is not specifically limited.

In some scenarios, the first application and the second application may be a same application. For example, a WeChat interface that is being viewed by a user 1 includes the picture A, and the user may perform an operation of a preset gesture on the picture A, so that the picture A is displayed in a first region in the user interface, and then the user drags the picture A in the first region to WeChat to share the picture A with a user 2.

In some other scenarios, the first application and the second application may be different applications. For example, for a picture B in a Weibo interface that is being viewed by a user 1, the user may perform an operation of a preset gesture on the picture B, so that the picture B is displayed in a first region in the user interface, and then the user drags the picture B in the first region to WeChat to share the picture B with a user 2.

The following describes an electronic device, a graphical user interface (graphical user interface, GUI) used for such an electronic device, and an embodiment used for using such an electronic device. In some embodiments of this application, the electronic device may be a mobile phone, a tablet computer, a notebook computer, a wearable device (for example, a smart watch or smart glasses) that has a wireless communication function, or the like. The electronic device includes a component (for example, a processor, an application processor, an image processor, or another processor) that can implement a data processing function and a component (for example, a display screen) that can display a user interface. An example embodiment of the electronic device includes but is not limited to a device using iOS®, Android®, Microsoft®, or another operating system. The electronic device may be alternatively another portable device such as a laptop (laptop) computer with a touch-sensitive surface (for example, a touch panel). It should be further understood that, in some other embodiments of this application, the electronic device 01 may not be a portable electronic device, but is a desktop computer with a touch-sensitive surface (for example, a touch panel).

With reference to the accompanying drawings, a structure of the electronic device is further described.

Figure 2:
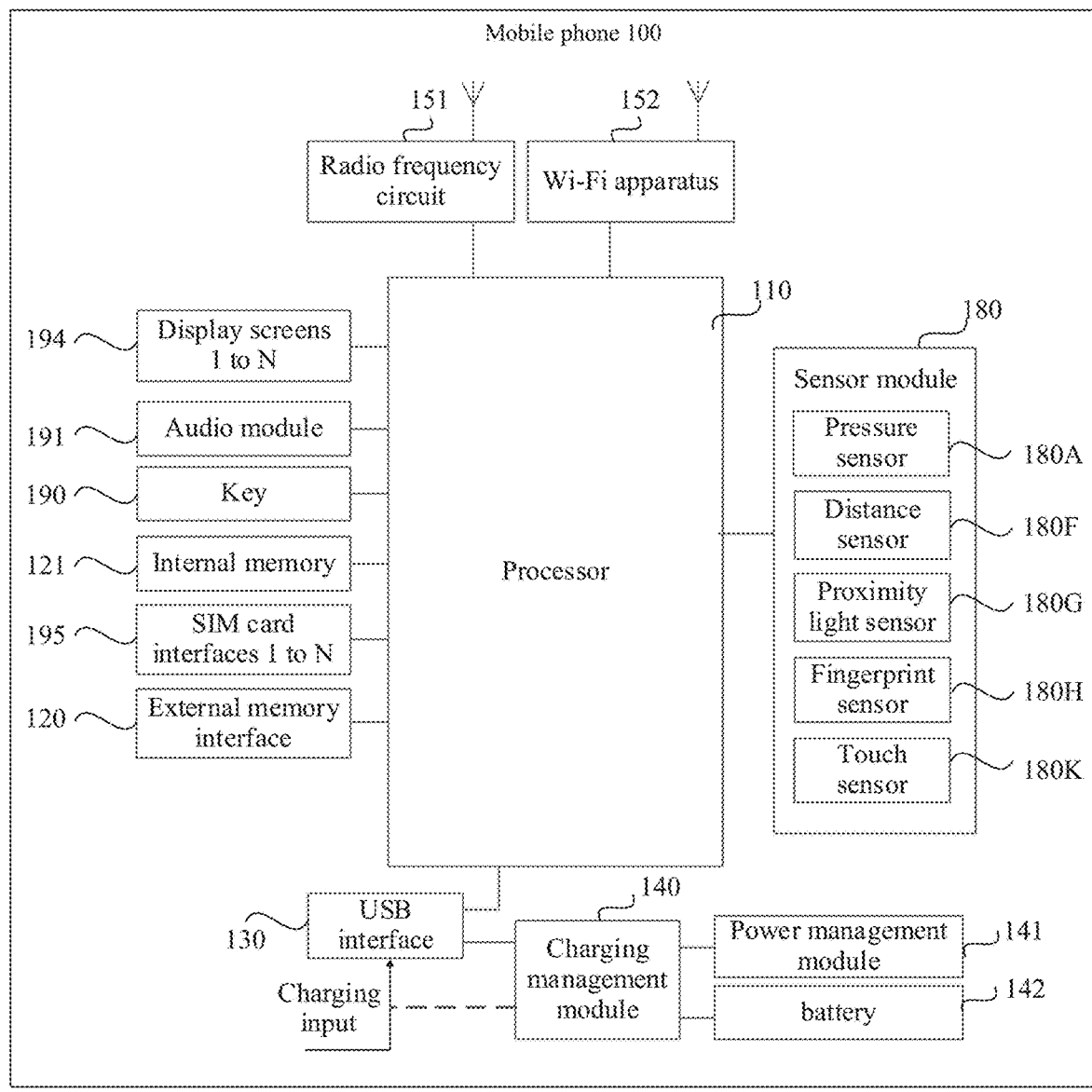
FIG. 2 is a schematic structural diagram of a mobile phone according to an embodiment of this application.

For a schematic diagram of a hardware structure of a mobile phone 100, refer to FIG. 2. FIG. 2 is only a schematic diagram of a hardware structure of an electronic device according to an embodiment of this application. On the basis of FIG. 2, another variant structure manner may exist. As shown in FIG. 2, the mobile phone 100 may include a processor 110, an external memory interface 120, an internal memory 121, a universal serial bus (universal serial bus, USB) interface 130, a charging management module 140, a power management module 141, a battery 142, an antenna 1, an antenna 2, a radio frequency circuit 151, a Wi-Fi apparatus 152, an audio module 191 (including a speaker, a telephone receiver, a microphone, a headset jack, and the like that are not shown in FIG. 2), a sensor module 180, a key 190, a display screen 194, a subscriber identity module (subscriber identity module, SIM) card interface 195, and the like. The sensor module 180 may include a pressure sensor 180A, a distance sensor 180F, a proximity light sensor 180G, a fingerprint sensor 180H, a touch sensor 180K, and the like (the mobile phone 100 may further include other sensors, for example, a temperature sensor, an ambient light sensor, and a gyroscope sensor, that are not shown in FIG. 2).

It may be understood that the structure shown in this embodiment of this application does not constitute a specific limitation on the mobile phone 100. In some other embodiments of this application, the mobile phone 100 may include more or fewer components than those shown in FIG. 2, or combine some components, or split some components, or have different component arrangements. The components shown in FIG. 2 may be implemented by using hardware, software, or a combination of software and hardware.

The following describes in detail the components of the mobile phone 100 shown in FIG. 2.

The processor 110 may include one or more processing units. For example, the processor 110 may include an application processor (application processor, AP), a modem processor, a graphics processing unit (graphics processing unit, GPU), an image signal processor (image signal processor, ISP), a controller, a memory, a video codec, a digital signal processor (digital signal processor, DSP), a baseband processor, and/or a neural-network processing unit (neural-network processing unit, NPU). Different processing units may be independent components, or may be integrated into one or more processors. The controller may be a nerve center and a command center of the mobile phone 100. The controller may generate an operation control signal based on instruction operation code and a timing signal, to complete instruction fetching and instruction execution control.

A memory may be further disposed in the processor 110, and is configured to store an instruction and data. In some embodiments, the memory in the processor 110 is a cache memory. The memory may store an instruction or data that is just used or used cyclically by the processor 110. If the processor 110 needs to use the instruction or the data again, the processor 110 may directly invoke the instruction or the data from the memory, to avoid repeated access and reduce a waiting time of the processor 110, thereby improving system efficiency.

In some embodiments, the processor 110 may include one or more interfaces. For example, the interface may include an inter-integrated circuit (inter-integrated circuit, I2C) interface, an inter-integrated circuit sound (inter-integrated circuit sound, I2S) interface, a pulse code modulation (pulse code modulation, PCM) interface, a universal asynchronous receiver/transmitter (universal asynchronous receiver/transmitter, UART) interface, a mobile industry processor interface (mobile industry processor interface, MIPI), a general-purpose input/output (general-purpose input/output, GPIO) interface, a subscriber identity module (subscriber identity module, SIM) interface, a universal serial bus (universal serial bus, USB) interface, and/or the like.

In this embodiment of this application, when detecting an operation of triggering saving of content in an interface of a first application by a user, the processor 110 may display the content in the interface of the first application in a first region in the user interface. The processor 110 may further drag content in the first region to a second application, and share the content with another user by using the second application. For a specific implementation in which the processor 110 displays the content in the interface of the first application in the first region in the user interface and drags the content in the first region to the second application for sharing, refer to related descriptions in subsequent embodiments. Details are not described herein again.

The internal memory 121 may be configured to store computer executable program code. The executable program code includes instructions. By running or executing the instructions stored in the internal memory 121, the processor 110 performs various function applications and data processing of the mobile phone 100. The internal memory 121 may include a program storage region and a data storage region. The program storage region may store an operating system, an application required by at least one function (for example, a voice play function or an image play function), and the like. The data storage region may store data (for example, audio data, an address book, a web page, a picture, or a text) created in a process of using the mobile phone 100. For example, the data storage region may further store a photo photographed by the user, an image obtained through composition based on a photo photographed by the user, or the like. In addition, the internal memory 121 may include a high-speed random access memory, and may further include a nonvolatile memory such as a magnetic disk storage component, a flash storage component, or another nonvolatile solid-state storage component. The internal memory 121 may further store various operating systems such as an iOS® operating system developed by Apple and an Android® operating system developed by Google.

The internal memory 121 may include a high-speed random access memory, and may further include a nonvolatile memory such as at least one magnetic disk storage component, a flash memory component, or a universal flash storage (universal flash storage, UFS).

The following describes functions of the sensor module 180.

The pressure sensor 180A is configured to sense a pressure signal, and may convert the pressure signal into an electrical signal. In some embodiments, the pressure sensor 180A may be disposed in the display screen 194.

The distance sensor 180F is configured to measure a distance. The mobile phone 100 may measure the distance by using infrared or a laser. In some embodiments, in a photographing scenario, the mobile phone 100 may measure a distance by using the distance sensor 180F, to implement fast focusing. In some other embodiments, the mobile phone 100 may further detect, by using the distance sensor 180F, whether a person or an object is approaching.

The proximity light sensor 180G may include, for example, a light emitting diode (LED) and an optical detector such as a photodiode. The light emitting diode may be an infrared light emitting diode. The mobile phone 100 emits infrared light by using the light emitting diode. The mobile phone 100 detects, by using the photodiode, reflected infrared light coming from a nearby object. When sufficient reflected light is detected, the mobile phone 100 may determine that there is an object near the mobile phone 100. When insufficient reflected light is detected, the mobile phone 100 may determine that there is no object near the mobile phone 100. The mobile phone 100 may detect, by using the proximity light sensor 180G, that the mobile phone 100 held by the user in hand is approaching an ear for a call. The proximity light sensor may turn off a power of the display screen when the mobile phone 100 moves to the ear, to automatically turn off the screen to save power. The proximity light sensor 180G may also be used in a leather case mode and a pocket mode for automatic unlocking and locking.

The fingerprint sensor 180H is configured to collect a fingerprint. The mobile phone 100 may implement fingerprint unlocking, application lock access, fingerprint photographing, and fingerprint-based call answering by using a collected fingerprint feature. In some examples, the fingerprint sensor may be configured on the back of the mobile phone 100 (for example, below a rear-facing camera), or the fingerprint sensor is configured on the front of the mobile phone 100 (for example, below a touchscreen). In some other examples, the fingerprint sensor may be configured in the touchscreen to implement a fingerprint recognition function. In other words, the fingerprint sensor may be integrated with the touchscreen to implement the fingerprint recognition function of the mobile phone 100. In this case, the fingerprint sensor may be configured in the touchscreen and may be a part of the touchscreen, or may be configured in the touchscreen in another manner. In addition, the fingerprint sensor may be alternatively implemented as a full panel fingerprint sensor. Therefore, the touchscreen may be considered as a panel on which a fingerprint can be collected at any location. In some embodiments, the fingerprint sensor may process the collected fingerprint (for example, perform verification on the collected fingerprint), and send a fingerprint processing result (for example, whether the fingerprint is verified) to the processor 110, so that the processor 110 performs corresponding processing based on the fingerprint processing result. In some other embodiments, the fingerprint sensor may further send the collected fingerprint to the processor 110, so that the processor 110 processes the fingerprint (for example, performs verification on the fingerprint). The fingerprint sensor in this embodiment of this application may use any type of sensing technology, including but not limited to an optical sensing technology, a capacitive sensing technology, a piezoelectric sensing technology, an ultrasonic sensing technology, or the like. In addition, for other sensors that may be further disposed in the mobile phone 100, for example, a gyroscope, a barometer, a hygrometer, a thermometer, a motion sensor, and an infrared sensor, details are not described herein.

The touch sensor 180K is also referred to as a "touch panel". The touch sensor 180K may be disposed in the display screen 194. The touch sensor 180K and the display screen 194 constitute the touchscreen. The touch sensor 180K is configured to detect a touch operation performed on or near the touch sensor 180K. The touch sensor 180K may transmit the detected touch operation to the application processor to determine a touch event type. Visual output related to the touch operation may be provided by using the display screen 194. In some other embodiments, the touch sensor 180K may be disposed on a surface of the mobile phone 100, and therefore is located at a location different from that of the display screen 194.

For example, when the display screen (for example, a touchscreen) displays an image, after detecting a touch operation (for example, a tap operation) on the image, the touch sensor 180K sends the touch operation to the processor 110, and the processor 110 determines location coordinates corresponding to the touch operation (for example, when the touchscreen is a capacitive touchscreen, the processor 110 determines, based on a capacitance change, the location coordinates corresponding to the touch operation), in other words, the user taps the location coordinates on the display screen, and an object corresponding to the location coordinates is an object on the image tapped by the user (alternatively, the touch sensor 180K can determine location coordinates corresponding to the touch operation, and sends the touch operation and the location coordinates to the processor 110, and the processor 110 does not need to determine the location coordinates corresponding to the touch operation).

The display screen 194 may be configured to display information entered by the user or information provided for the user and various graphical user interfaces. For example, the display screen 194 may display a picture, a text, a video, a web page, a file, or the like. The display screen 194 includes a display panel. The display panel may use a liquid crystal display (liquid crystal display, LCD), an organic light-emitting diode (organic light-emitting diode, OLED), an active-matrix organic light emitting diode (active-matrix organic light emitting diode, AMOLED), a flexible light-emitting diode (flex light-emitting diode, FLED), a mini-LED, a microLED, a micro-OLED, a quantum dot light emitting diode (quantum dot light emitting diode, QLED), or the like. In some embodiments, the mobile phone 100 may include one or N display screens 194, where N is a positive integer greater than 1.

In addition, the mobile phone 100 may implement an audio function such as music playing or recording by using the audio module 191 (the speaker, the telephone receiver, the microphone, and the headset jack), the processor 110, and the like. The audio module 191 may transmit an electrical signal converted from received audio data to the speaker, and the speaker converts the electrical signal into a sound signal for output. In addition, the microphone converts a collected sound signal into an electrical signal, the audio module receives the electrical signal and converts the electrical signal into audio data, and then outputs the audio data to the Wi-Fi apparatus 152, so that the audio data is sent to, for example, another terminal, or outputs the audio data to the internal memory 121 for further processing.

The radio frequency circuit 151 may be configured to receive and send radio signals in an information receiving and sending process or in a call process. Specifically, the radio frequency circuit 151 may receive downlink data of a base station for processing by the processor 110. In addition, the radio frequency circuit 151 may further send uplink data to the base station. Generally, the radio frequency circuit 151 includes but is not limited to an antenna, at least one amplifier, transceiver, coupler, low noise amplifier, duplexer, and the like. In addition, the radio frequency circuit 151 may further communicate with another device through wireless communication. The wireless communication may use any communication standard or protocol, including but not limited to a global system for mobile communications, a general packet radio service, code division multiple access, wideband code division multiple access, long term evolution, email, a short messaging service message service, and the like.

The Wi-Fi apparatus 152 is configured to provide, for the mobile phone 100, network access that complies with a standard protocol related to Wi-Fi. The mobile phone 100 may access a Wi-Fi access point by using the Wi-Fi apparatus 152, to help the user receive and send an email, browse a web page, access streaming media, and the like. The Wi-Fi apparatus 152 provides wireless broadband Internet access for the user. In some other embodiments, the Wi-Fi apparatus 152 may also be used as a Wi-Fi wireless access point, and may provide Wi-Fi network access for another terminal.

The mobile phone 100 may further include a peripheral interface, configured to provide various interfaces for external input/output devices (for example, a keyboard, a mouse, an external display, an external memory, and a subscriber identity module card). For example, the mobile phone 100 is connected to the mouse by using the universal serial bus (USB) interface 130, and is connected, by using a metal contact on a slot of the subscriber identity module card, to the SIM card provided by an operator. The peripheral interface may be configured to couple the external input/output peripheral device to the processor 110 and the internal memory 121.

The mobile phone 100 may further include the charging management module 140 (for example, the battery 142 and the power management module 141) that supplies power to the components. The battery 142 may be logically connected to the processor 110 by using the power management module 141, so that functions such as charging management, discharging management, and power consumption management are implemented by using the charging management module 140.

The mobile phone 100 may receive input of the key 190 to generate key signal input related to user setting and function control of the mobile phone 100. The SIM card interface 195 in the mobile phone 100 is configured to connect to a SIM card. The SIM card may be inserted into the SIM card interface 195 or removed from the SIM card interface 195, to implement contact with and separation from the mobile phone 100.

Although not shown in FIG. 2, the mobile phone 100 may further include a camera such as a front-facing camera or a rear-facing camera, may further include a motor, configured to generate a vibration prompt (for example, an incoming call vibration prompt), and may further include an indicator such as an indicator lamp, where the indicator is configured to indicate a charging status or a power change, or may be used to indicate a message, a missed call, a notification, or the like. The mobile phone 100 may further include a Bluetooth apparatus, a positioning apparatus, a flashlight, a micro projection apparatus, a near field communication (near field communication, NFC) apparatus, and the like. Details are not described herein.

All the following embodiments can be implemented in an electronic device (for example, the mobile phone 100 or a tablet computer) with the foregoing hardware structure. With reference to the accompanying drawings, the following embodiments use the mobile phone 100 as an example of the electronic device to describe in detail the content sharing method provided in the embodiments of this application.

The following describes some example user interfaces (user interface, UI) provided by the mobile phone 100. The term "user interface" in the specification, claims, and accompanying drawings of this application is a medium interface for interaction and information exchange between an application or an operating system and a user, and the interface implements conversion between an internal form of information and an acceptable form of the user. A common representation form of the user interface is a graphical user interface (graphic user interface, GUI). The GUI is a user interface that is displayed in a graphical manner and that is related to a computer operation. The GUI may be an interface element such as an icon, a window, or a control displayed on a display screen of the electronic device. The control may include a visible interface element such as an icon, a button, a menu, a tab, a text box, a dialog box, a status bar, a navigation bar, or a widget.

Figure 3A:
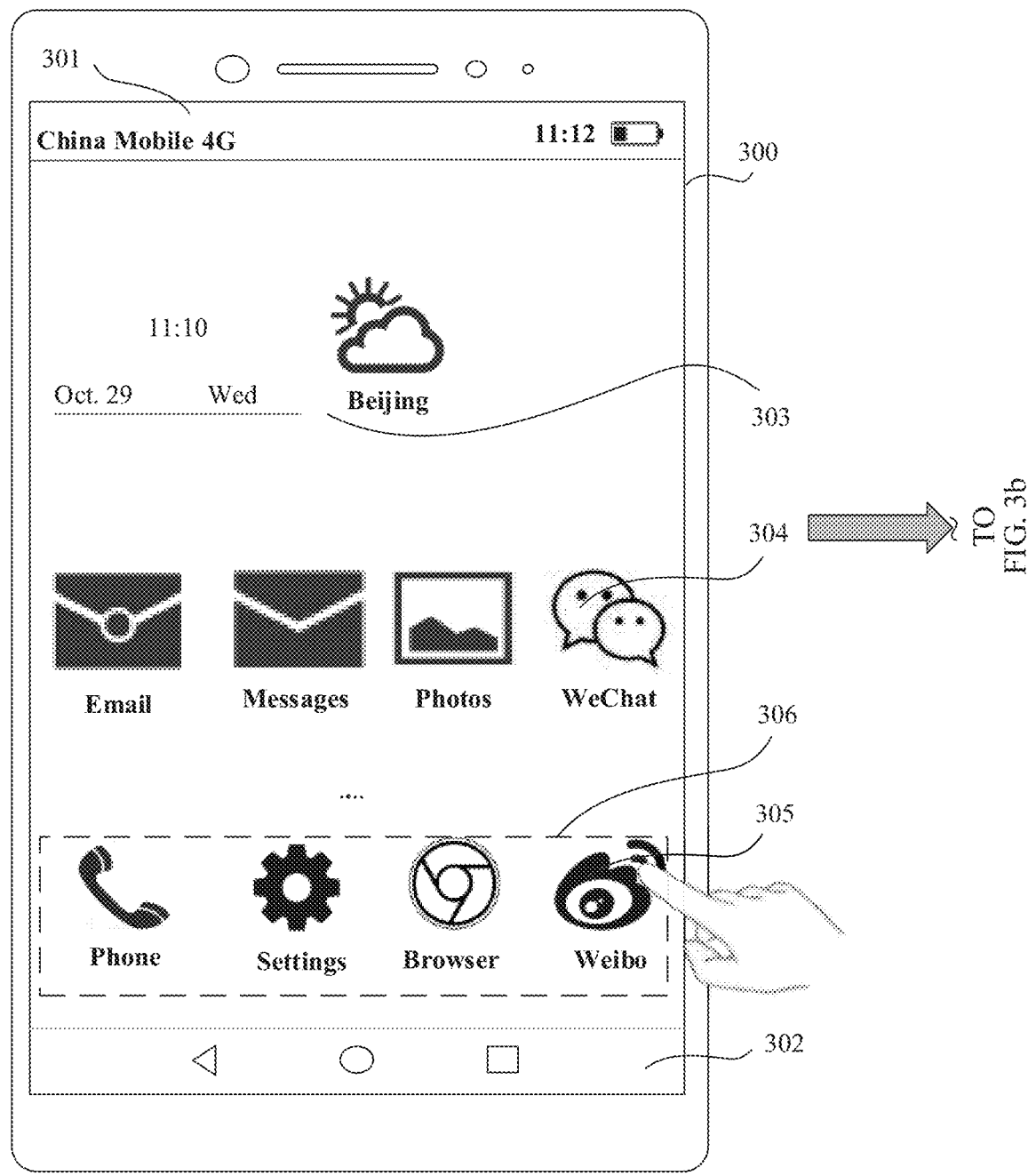
FIGS. 3a to 3h are a schematic diagram of a group of interfaces according to an embodiment of this application.

FIG. 3a illustrates a user interface 300 displayed on the display screen 194 of the mobile phone 100.

As shown in FIG. 3a, the user interface 300 is a home screen of the electronic device. The user interface 300 may include a status bar 301, a navigation bar 302 that can be hidden, a time and weather widget (widget) 303, and icons of various applications, for example, a WeChat icon 304 and a Weibo icon 305. The status bar 301 includes an operator name (for example, China Mobile), a mobile network (for example, 4G), a time, remaining power, and the like. The navigation bar 302 may include a back (back) button icon, a home (home) button icon, and a forward button icon. In addition, it may be understood that, in some embodiments, the status bar 301 may further include a Bluetooth icon, a Wi-Fi icon, the mobile network (for example, 4G), an alarm clock icon, an icon of an external device, and the like. It may be further understood that, in some other embodiments, the user interface 300 shown in FIG. 3a may further include a dock bar 306, and the dock bar may include a common application icon and the like. After detecting a touch event of a finger of a user (or a stylus or the like) for an application icon, the processor 110 opens, in response to the touch event, a user interface of an application corresponding to the application icon, and displays the user interface of the application on the display screen 194.

In an example, when the display screen 194 of the mobile phone 100 currently displays the user interface 300 shown in FIG. 3a, when the processor 110 detects an operation performed by the user on the Weibo icon 305, a user interface 310 of the Weibo application is displayed on the display screen 194 in response to the operation. For example, the operation performed by the user on the Weibo icon 305 may be an operation of tapping or touching the Weibo icon 305 by the user, or may be a touch operation performed by the user above the Weibo icon 305, and this is not limited herein.

In some other embodiments, the mobile phone 100 may further include a home button. The home button may be a physical button, or may be a virtual button. The home button is used to return a graphical user interface (GUI) displayed on a touchscreen to an interface of the home screen based on an operation of the user, so that the user can easily view the home screen and perform an operation on a control (for example, an icon) on the home screen at any time. The operation may be specifically pressing the home button by the user, may be consecutively pressing the home button twice in a short time by the user, or may be touching and holding the home button by the user. In some other embodiments of this application, a fingerprint sensor may be further integrated into the home button, so that when the user presses the home button, the electronic device can perform fingerprint collection, to confirm a user identity. In some other embodiments, the home button may further include a fingerprint-on-screen sensor. In an on state of the display screen, light emitted by the display screen illuminates fingerprint ridges, light reflected on the fingerprint ridges is captured by the fingerprint-on-screen sensor to form a fingerprint image, and the fingerprint image is compared with a prestored fingerprint image. In a scenario of unlocking the screen using a fingerprint, if matching succeeds, the electronic device is unlocked. A comparison process may be that a feature of the fingerprint image is extracted for comparison with a prestored feature template, and when a similarity exceeds a specific threshold, it indicates that the matching succeeds.

It may be understood that FIG. 3a only illustrates the user interface on the electronic device 100, and does not constitute a limitation on this embodiment of this application.

The following embodiments use an example in which content in a display interface of a first application is shared to describe in detail a process of sharing content with another user by using a second application.

In some embodiments of this application, when a user Lily of the mobile phone 100 uses the first application, for example, if Lily expects to share a first picture in the display interface of the first application to a user Jacky when viewing the first picture, Lily may perform an operation of a preset gesture in a user interface in which the first picture is displayed, to trigger a screen recognition function of the mobile phone 100 to recognize the first picture in the user interface, so that the first picture is displayed in a region on the display screen of the mobile phone 100, and the user of the mobile phone 100 can share the picture with another user.

Figure 3B:
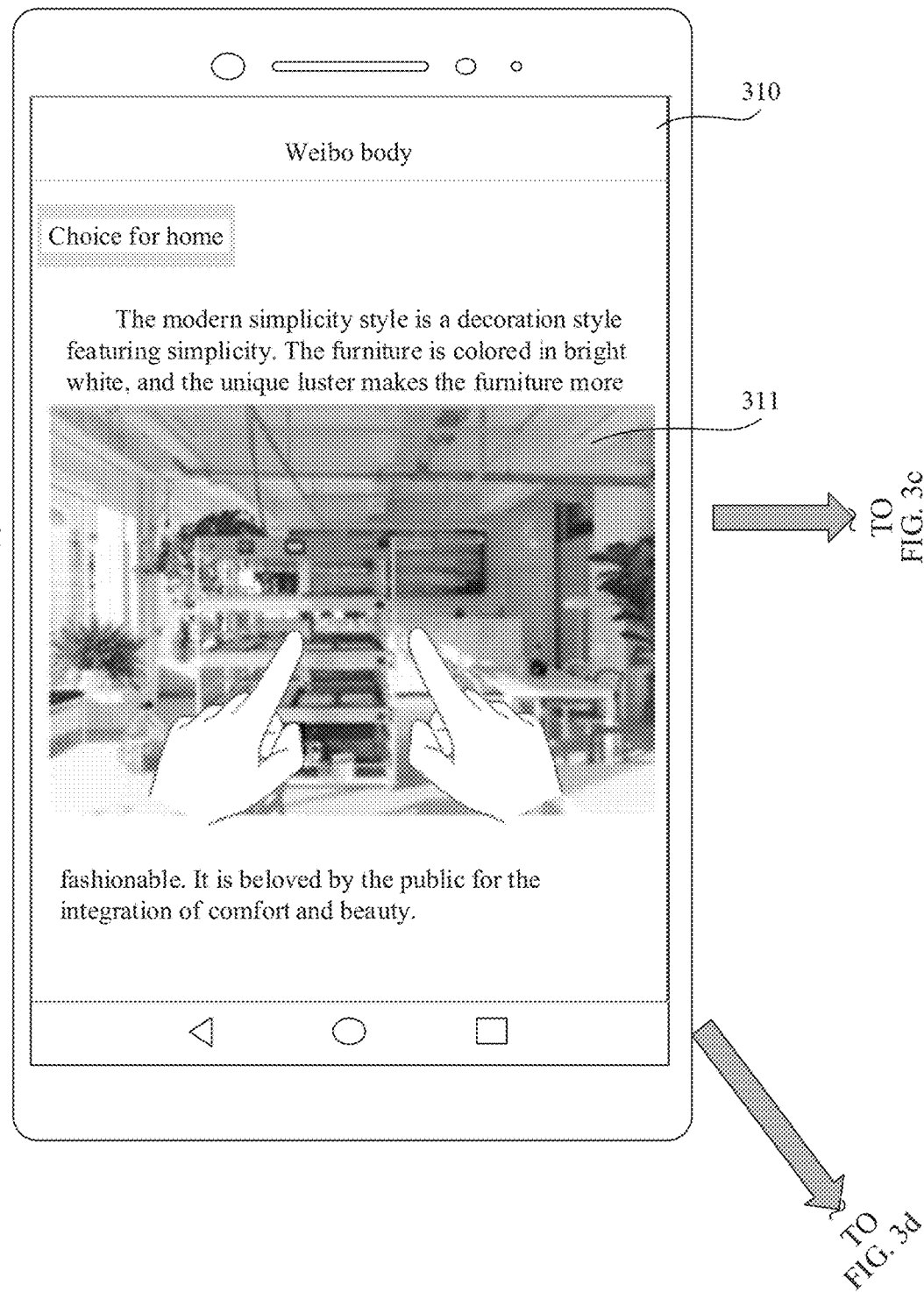
Figure 6A:
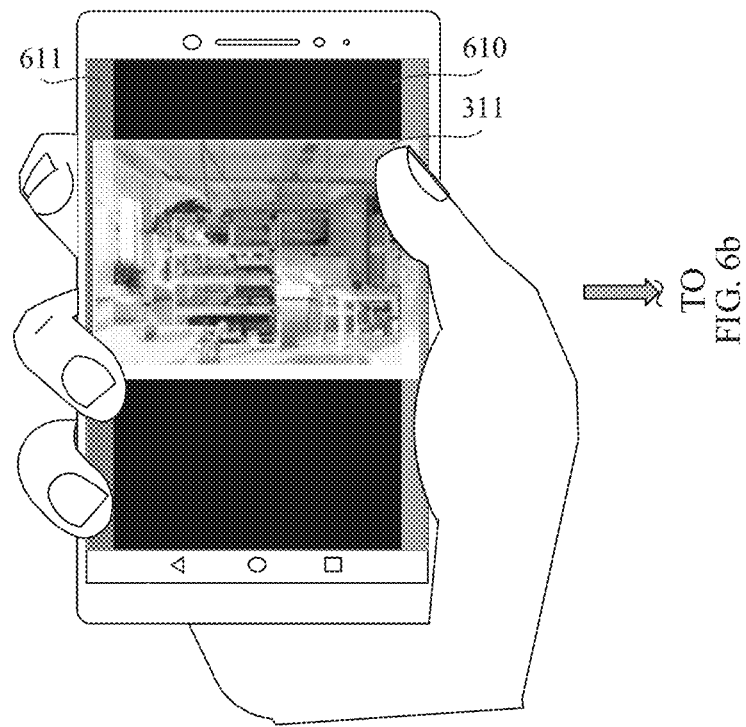
FIGS. 6a and 6b are a schematic diagram of another group of interfaces according to an embodiment of this application.

For example, the preset gesture may be a two-finger press gesture shown in FIG. 3b, or may be a one-hand hold gesture shown in FIG. 6a. It should be understood that preset gestures that may be used for different types of mobile phones may be different. For example, a mobile phone with a flat display screen may trigger a screen recognition function through two-finger pressing. For another example, a mobile phone with a curved screen or a foldable screen may trigger a screen recognition function by using a two-finger press gesture, or may trigger a screen recognition function by using a one-hand hold gesture.

The following embodiments describe an example in which the first application is Weibo and the second application is WeChat.

FIGS. 3a to 3h illustrate user interfaces for implementing a picture sharing process on the electronic device 100.

Refer to 3a. When detecting an operation (for example, tapping) performed on the Weibo icon 305, the mobile phone 100 displays the user interface 310 of a Weibo body shown in FIG. 3b in response to the operation. The user interface 310 includes a text and a picture 311 embedded in the text. An operation corresponding to a preset gesture may be directly performed on the user interface 310 of the Weibo body shown in FIG. 3b to implement a screen recognition function corresponding to the preset gesture. When detecting an operation (for example, two-finger pressing) performed on the user interface 310 shown in FIG. 3b, the mobile phone 100 may display a user interface 320 shown in 3c in the figure in response to the operation, or may display a user interface 330 shown in FIG. 3d in response to the operation.

Figure 3C:
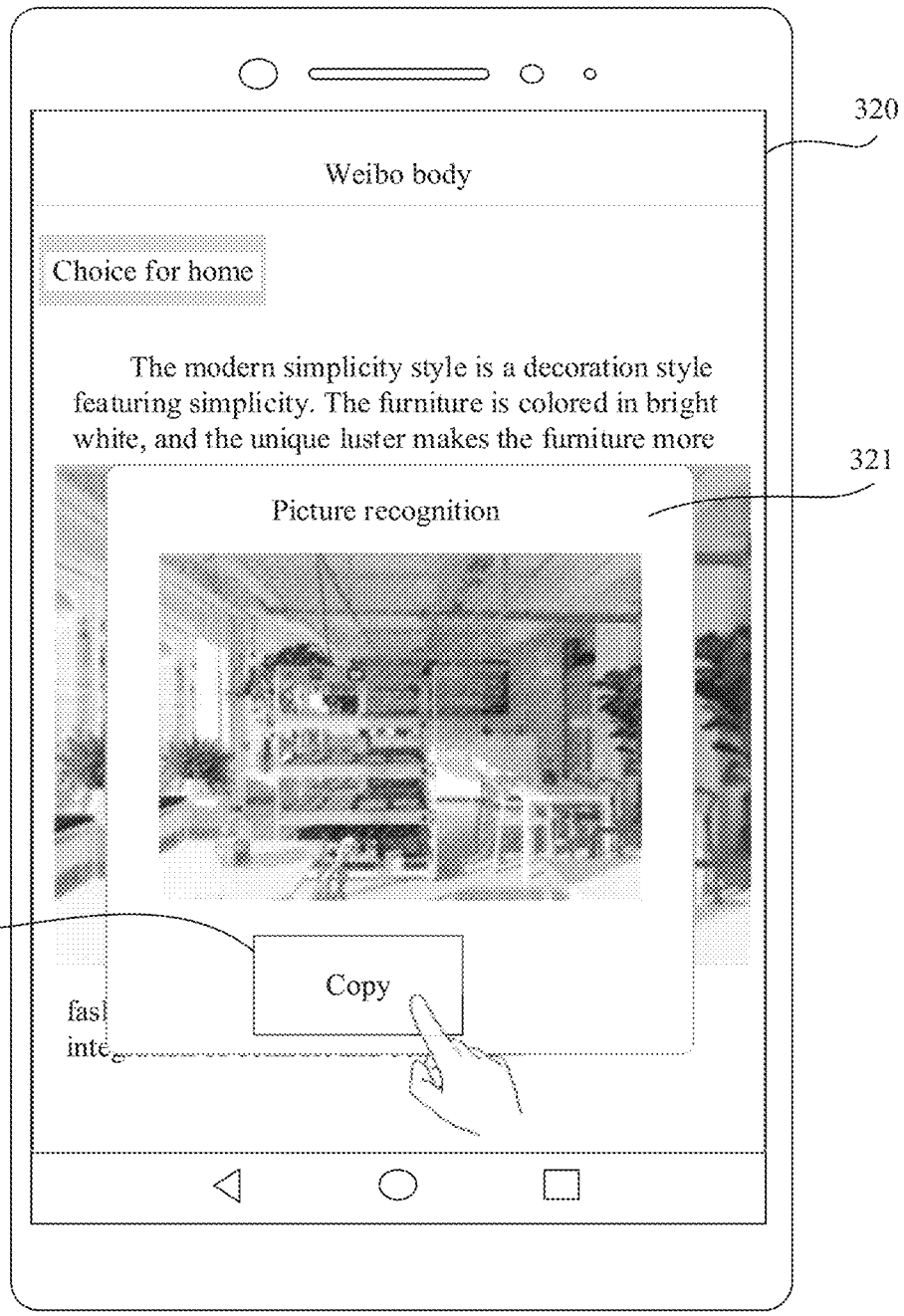

The user interface 320 shown in FIG. 3c may include a Weibo body of the picture 311 and a picture recognition window 321. The picture recognition window 321 may be suspended in an application interface including the Weibo body of the picture 311. The picture recognition window 321 may include the picture 311 and a copy control 322. For example, the user Lily of the mobile phone 100 needs to share the picture 311 with the user Jacky of another mobile phone. In this case, Lily may perform an operation on the copy control 322 (refer to a tapping operation in FIG. 3c) to display a user interface 330 shown in FIG. 3d. A shortcut bar 331 is displayed in the user interface 330, and a thumbnail 332 corresponding to the picture 311 is displayed in the shortcut bar 331.

Optionally, when the mobile phone 100 displays the user interface 310 shown in FIG. 3b, the picture 311 in the user interface 310 may be tapped to display the picture 311 in full screen on the display screen of the mobile phone 100. When detecting an operation (for example, tapping) performed on the picture 311 in the user interface 310, the mobile phone 100 displays a user interface 360 shown in FIG. 3e in response to the operation. The user interface 360 includes the picture 311. In some embodiments, when detecting an operation of a preset gesture (for example, two-finger pressing) performed on the user interface 360, the mobile phone 100 displays a user interface 370 shown in FIG. 3h in response to the operation. The user interface 370 includes the shortcut bar 331, and the thumbnail 332 corresponding to the picture 311 is displayed in the shortcut bar 331.

In some other embodiments, when detecting an operation of a preset gesture (for example, two-finger pressing) performed on the user interface 360, the mobile phone 100 displays a user interface including the picture 311 and a picture recognition window in response to the operation. The picture recognition window may be suspended on the picture 311. For the picture recognition window, refer to the picture recognition window 321 shown in FIG. 3c. To be specific, the picture recognition window includes the picture 311 and the copy control 322.

Figure 3D:
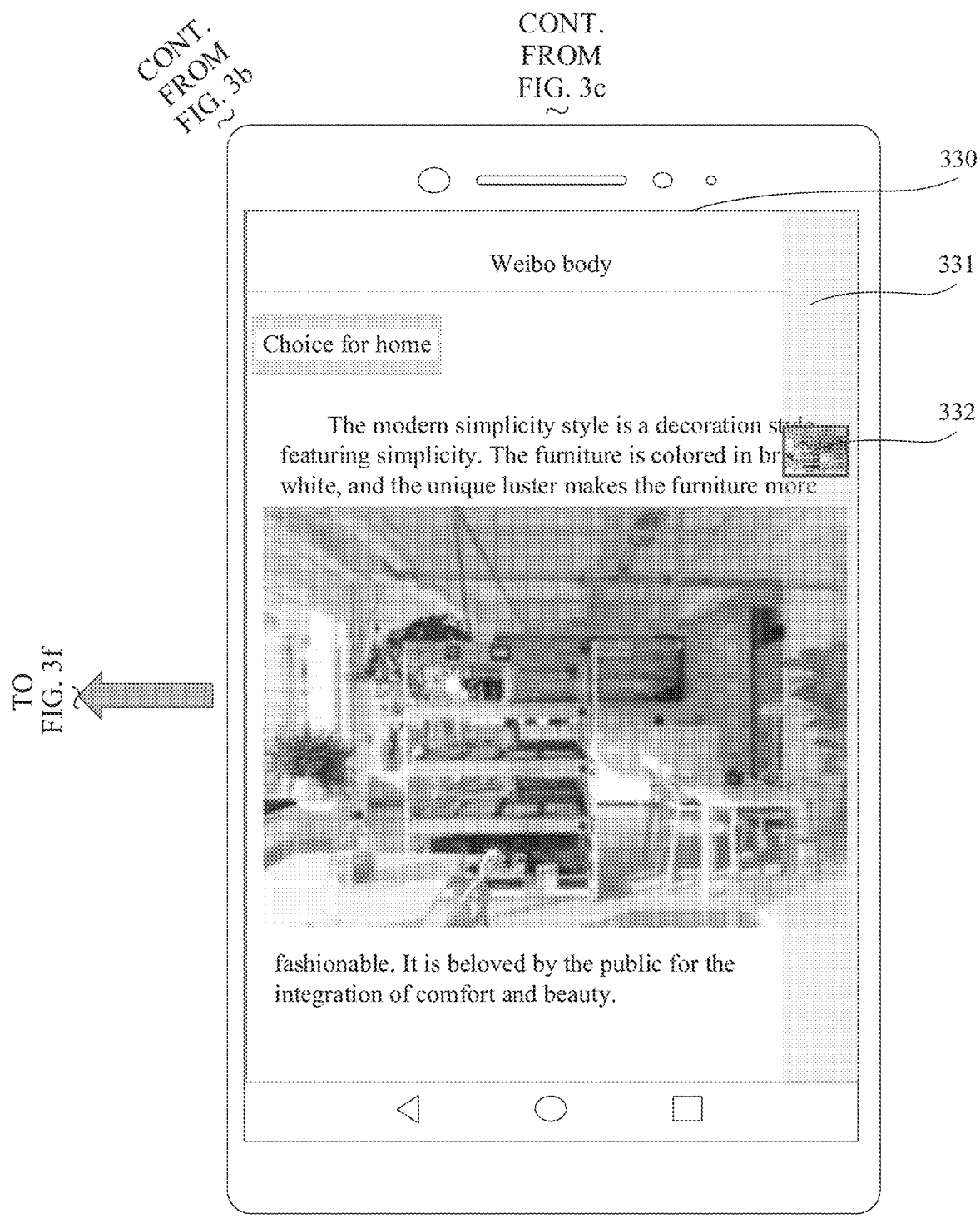
Figure 3E:
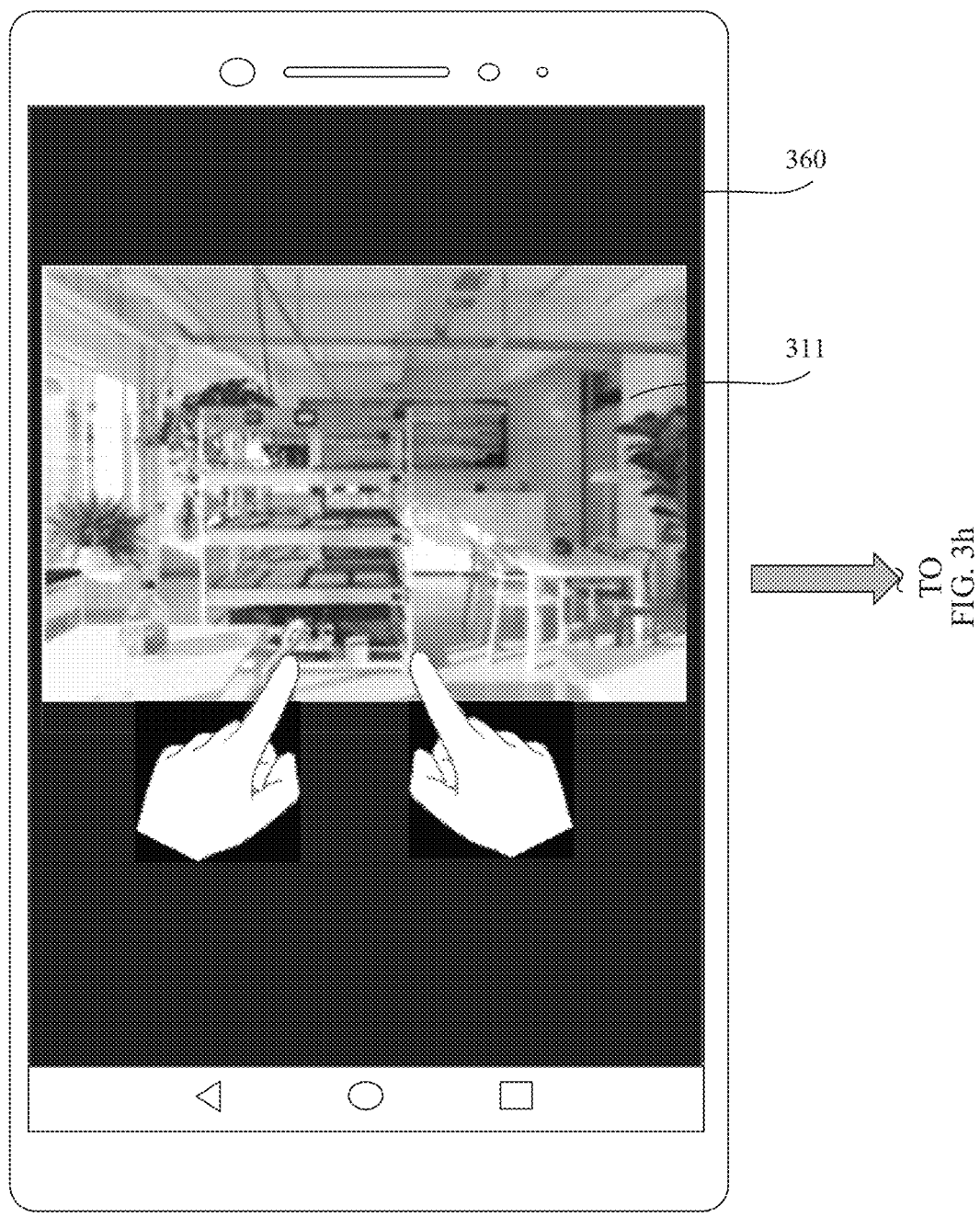
Figure 3F:
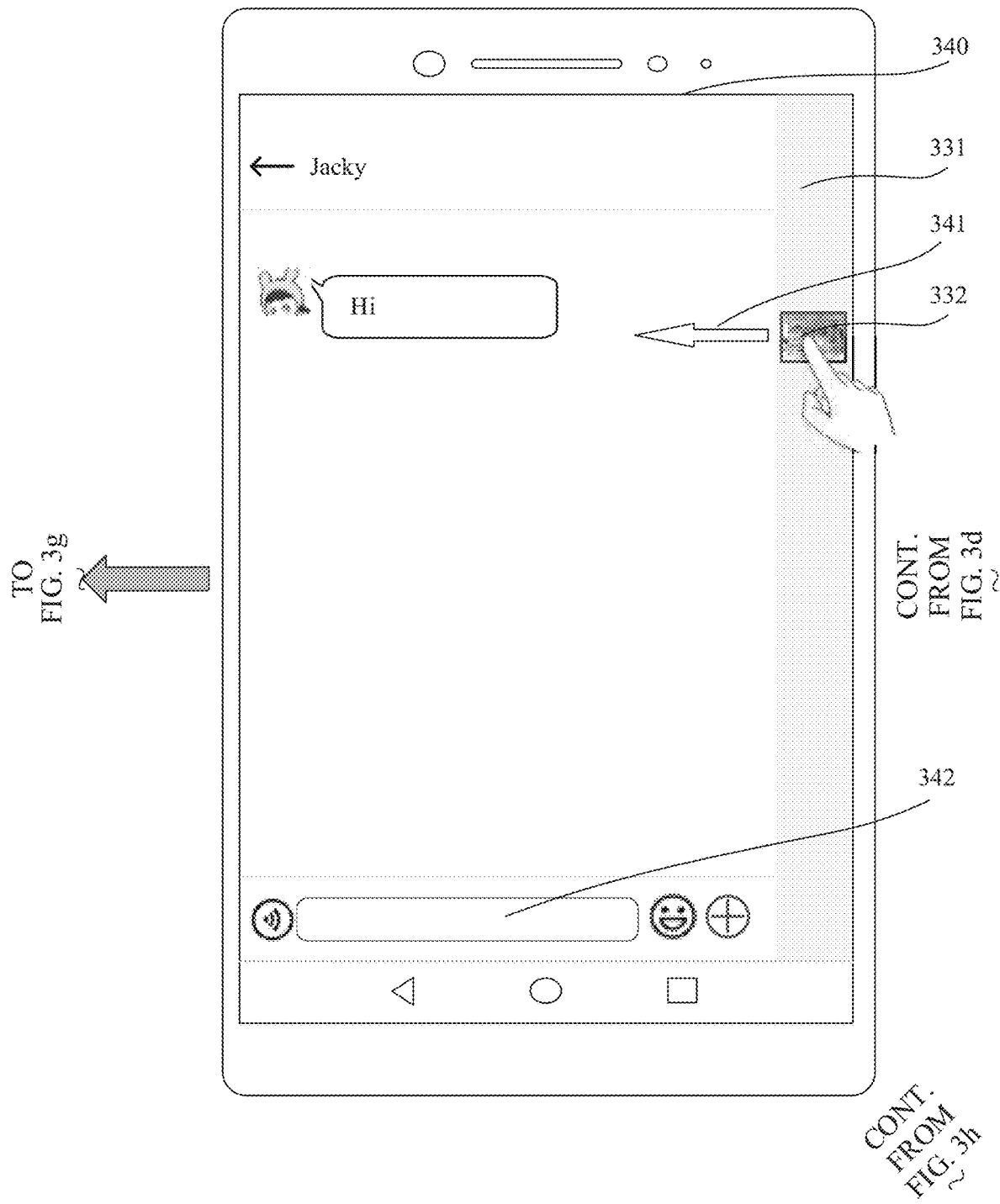
Figure 3G:
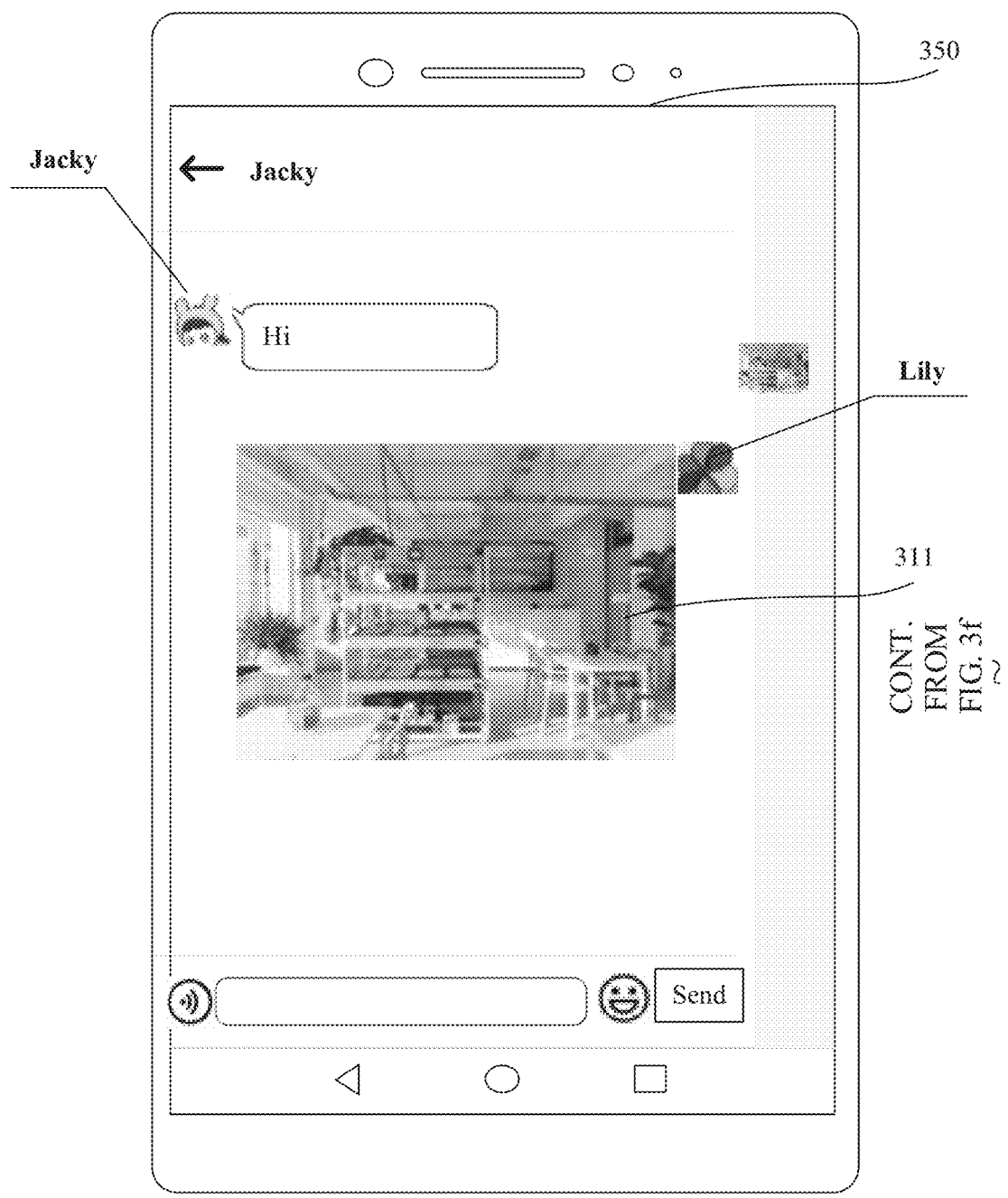
Figure 3H:
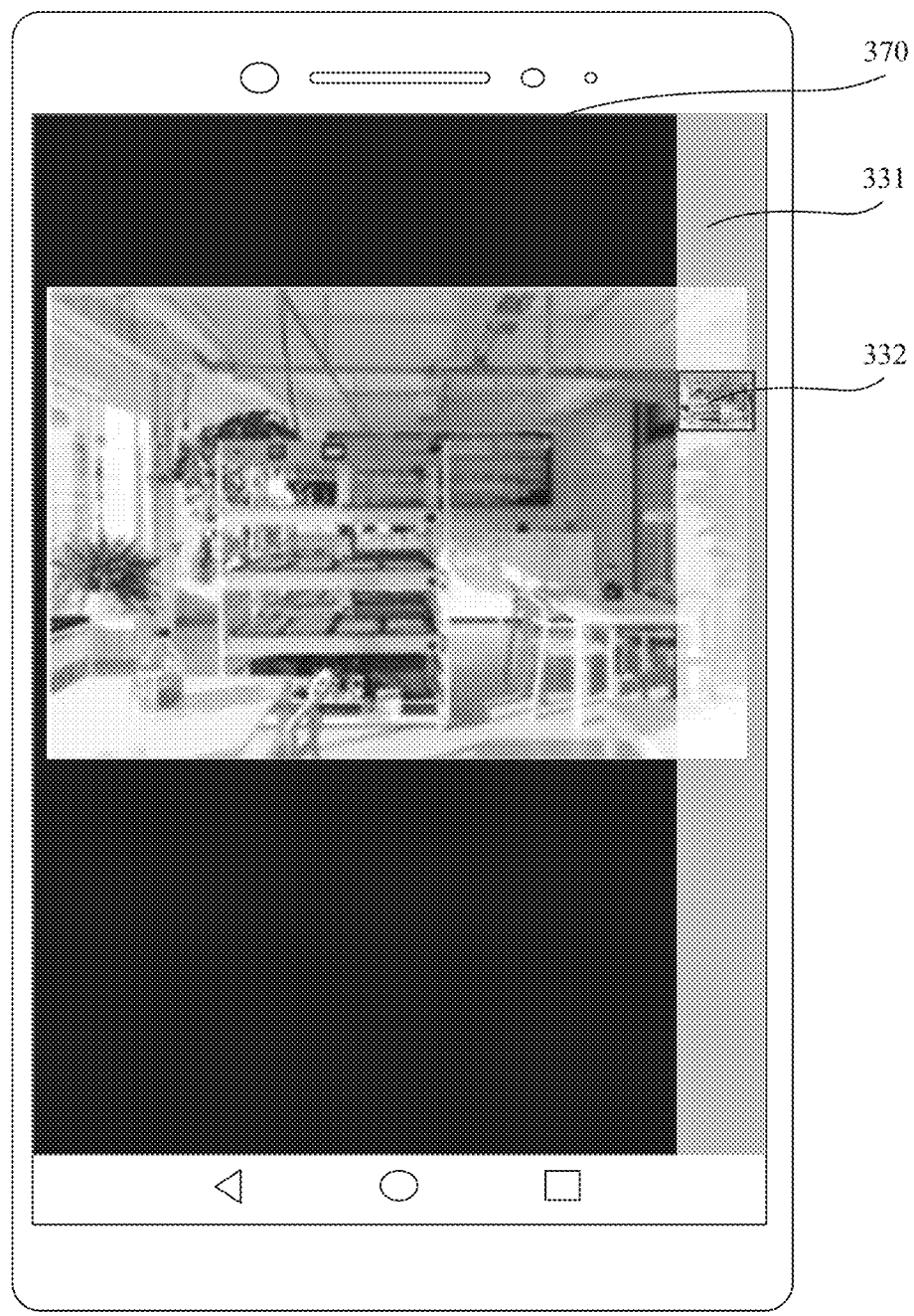

For the user interface 370 shown in FIG. 3h, where the user interface 370 includes the shortcut bar 331, and the thumbnail 332 corresponding to the picture 311 is displayed in the shortcut bar 331, Lily may perform an operation (for example, tapping) on the copy control 322 to display the user interface 370 shown in FIG. 3h. The picture 311 and the shortcut bar 331 are displayed in the user interface 370, and the thumbnail 332 corresponding to the picture 311 is displayed in the shortcut bar 331.

In this embodiment, the screen recognition function is triggered through two-finger pressing. The following uses 3b and FIG. 3c as examples to describe an implementation process of the screen recognition function.

The user interface 310 shown in FIG. 3b is used as an example. When the user presses, with two fingers, a region in which the picture 311 is located on the display screen of the mobile phone 100, the mobile phone 100 may automatically take a screenshot of the user interface 310 in the background to obtain a screenshot file, and obtain, from the screenshot file through clipping, content corresponding to the region pressed with two fingers. As shown in FIG. 3b, the region in which the picture 311 is located is pressed with two fingers, and the mobile phone obtains the picture 311 from the screenshot file through clipping, and displays the picture recognition window 321 in FIG. 3c on the display screen of the mobile phone 100. The screenshot file generated by taking a screenshot may be saved in the internal memory 121. After the picture 311 in the screenshot file is obtained through clipping, the mobile phone 100 automatically deletes the screenshot file from the internal memory 121. In this way, memory of the mobile phone can be reduced.

In some other embodiments, the mobile phone 100 may search, in the background based on the picture 311 obtained through clipping, for pictures that match content of the picture 311 obtained through clipping, for example, search for an original picture of the picture 311, or for another example, search for a picture that has higher definition than the picture 311 obtained through clipping, and then may select a picture from the found pictures and display the picture in the picture recognition window 321, for example, display a picture with higher definition, so that definition of the shared picture can be improved. Certainly, a plurality of found pictures may be alternatively displayed, so that the user selects a required picture.

In this embodiment of this application, in addition to pressing, with two fingers, the region in which the picture 311 is located to implement background screenshot-taking and obtaining the picture 311 in the screenshot file through clipping, a knuckle may be used to tap hard or double-tap the screen to take a screenshot of the full screen or tap, draw a closed pattern, and obtain selected screen region content through clipping, or a knuckle may be used to tap hard and then a letter S may be drawn to take a screenshot through scrolling, and then the picture 311 may be obtained from the screenshot file through clipping.

In some embodiments, the shortcut bar may be located in any region of the display screen, for example, displayed on a left-side edge of the display screen, an upper-side edge of the display screen, or a region in the middle of the display screen, and this is not limited herein. In the user interface 330 shown in FIG. 3d, only an example in which the shortcut bar 331 is displayed on a right-side edge of the display screen is described, and the picture 311 may be displayed in the shortcut bar 331 in a form of a thumbnail (marked as 332 shown in FIG. 3d). For another example, shortcut bars are displayed on two sides of the display screen of the mobile phone 100, and pictures or texts may be displayed on both sides of the shortcut bar.

When the shortcut bar is displayed on the display screen of the mobile phone 100, an operation may be performed on other content on the display screen. For example, a different application may be displayed through switching. For example, switching is performed from the Weibo application in the user interface 330 shown in FIG. 3d to the WeChat application in the user interface 340 shown in FIG. 3f, to simultaneously display the WeChat application and the shortcut bar 331 in the user interface 340. For another example, a different interface of a same application may be displayed through switching.

In some other examples, the shortcut bar may be always displayed on the display screen, or may be hidden immediately when not being used, or may be hidden after a period of time when an operation on the shortcut bar stops, and display of the shortcut bar is triggered when the shortcut bar needs to be used. In this way, the shortcut bar is hidden when not being used, so that other content displayed on the display screen of the mobile phone 100 may not be blocked, and therefore another function of the mobile phone 100 is normally used by the user. In addition, a display area of the shortcut bar in the user interface is not limited. To minimize impact on display of other content, the shortcut bar 331 may be disposed at an edge location of the display screen, so that the area is as small as possible.

In an example in which the user Lily of the mobile phone 100 needs to share a picture with the user Jacky of another mobile phone, Lily may directly share, with Jacky by using a social application, the picture in the shortcut bar 331 shown in FIG. 3d or the shortcut bar 331 shown in FIG. 3h. For example, the social application is the WeChat application. If WeChat is enabled, the user interface 340 shown in FIG. 3f for chatting with Jacky is entered, or if the WeChat application in the mobile phone is not enabled, Lily may enable the WeChat application in the mobile phone 100. When detecting an operation performed on the WeChat icon 304 shown in FIG. 3a, the mobile phone 100 enables WeChat. After some operations are performed, the user interface 340 shown in FIG. 3f for chatting with Jacky is entered. Lily may drag the thumbnail 332 in the shortcut bar 331 to a chat region of the user interface 340 for chatting with Jacky in the WeChat application, to send the picture 311 to Jacky.

When detecting an operation performed on the thumbnail 332 (for example, a finger continuously presses and drags the thumbnail 332), the mobile phone 100 drags the picture 311 to the end of a finger drag track in response to the operation. For example, as shown in FIG. 3f, a finger of Lily continuously presses the thumbnail 332 on the touchscreen, and drags the thumbnail 332 to the chat region along an arrow 341, or drags the thumbnail 332 to a chat input box 342. When detecting that the finger leaves the touchscreen, the mobile phone 100 sends the picture 311 corresponding to the thumbnail 332 to the mobile phone used by Jacky. After the sending succeeds, the mobile phone 100 displays a user interface 350 shown in FIG. 3g. In the user interface 350 shown in FIG. 3g, a message on the right (the picture 311) is sent by Lily by using the mobile phone 100, and a message on the left is received by the mobile phone 100 of Lily.

Figure 4A:
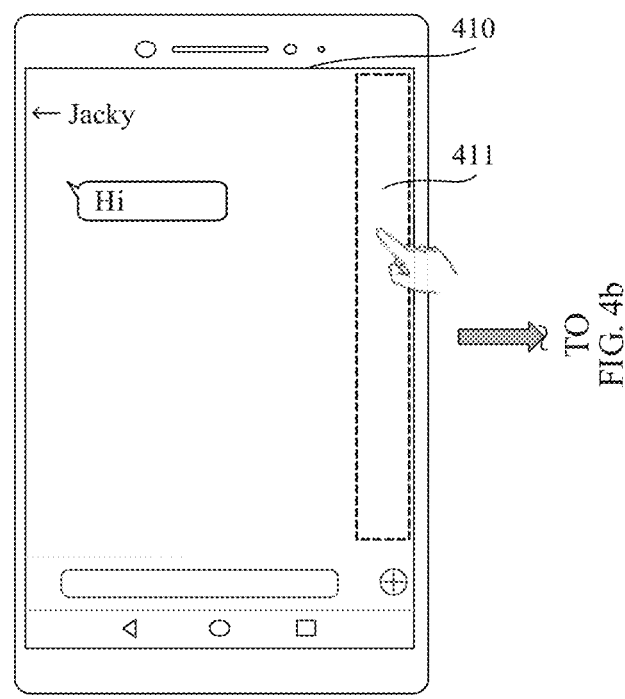
FIGS. 4a to 4c are a schematic diagram of another group of interfaces according to an embodiment of this application.
Figure 4B:
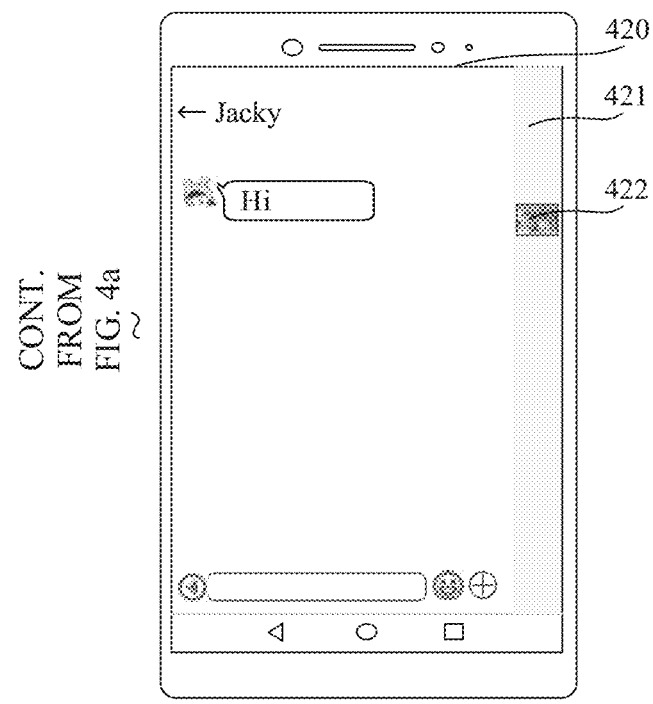
Figure 4C:
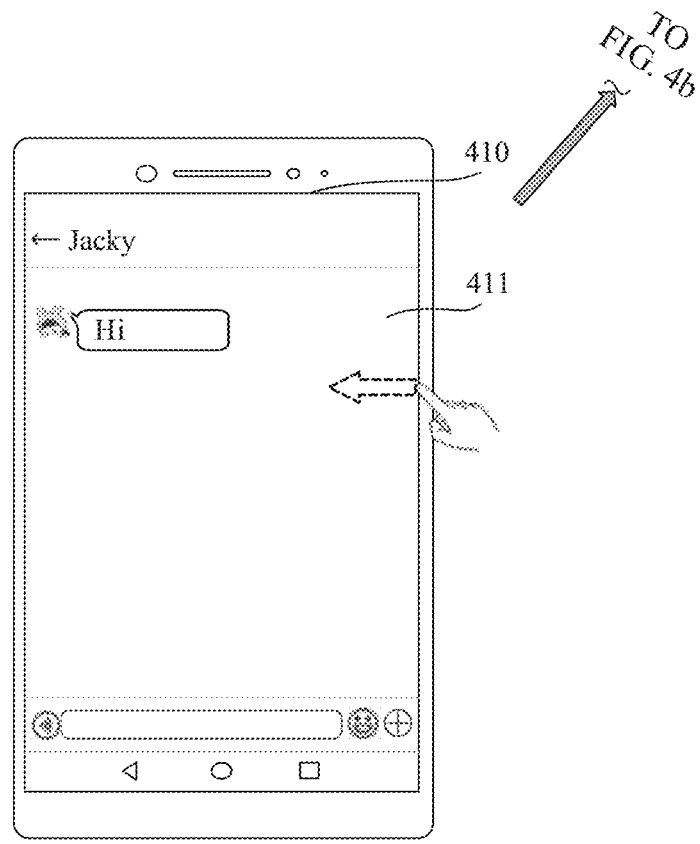
Figure 5A:
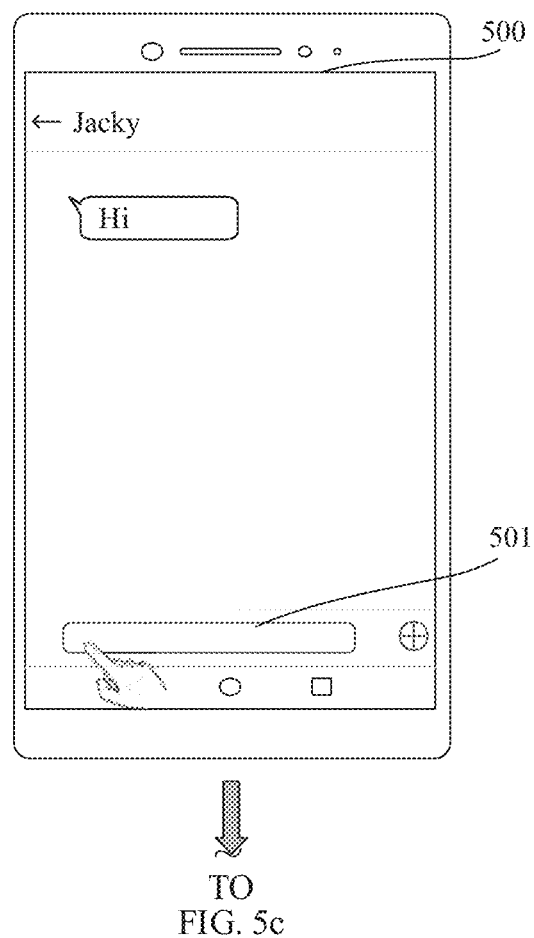
FIGS. 5a to 5d are a schematic diagram of another group of interfaces according to an embodiment of this application.
Figures 5B, 5D:
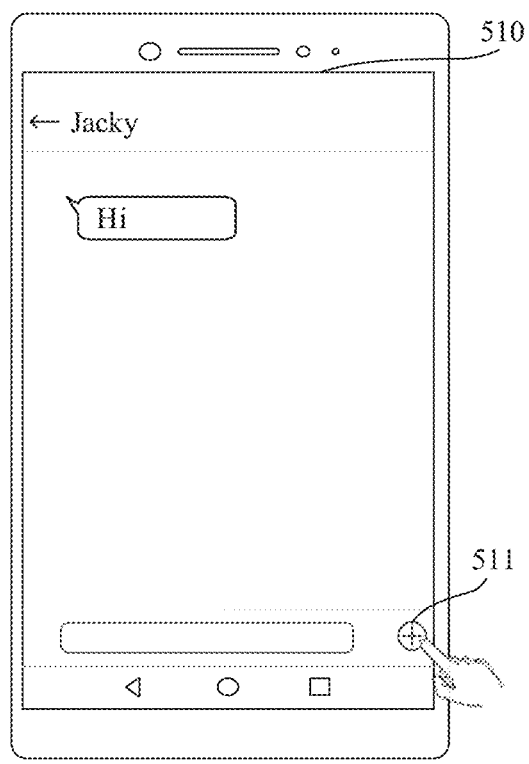
Figure 5C:
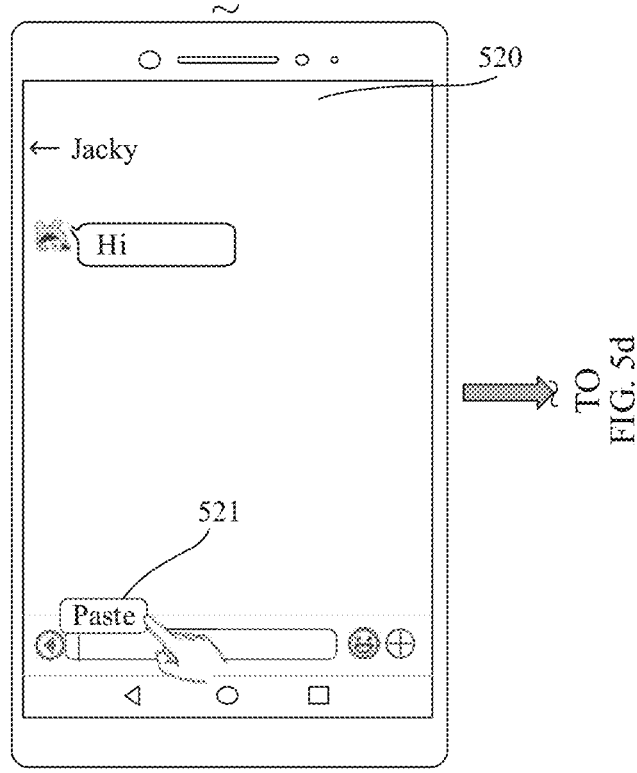
Figure 5D:
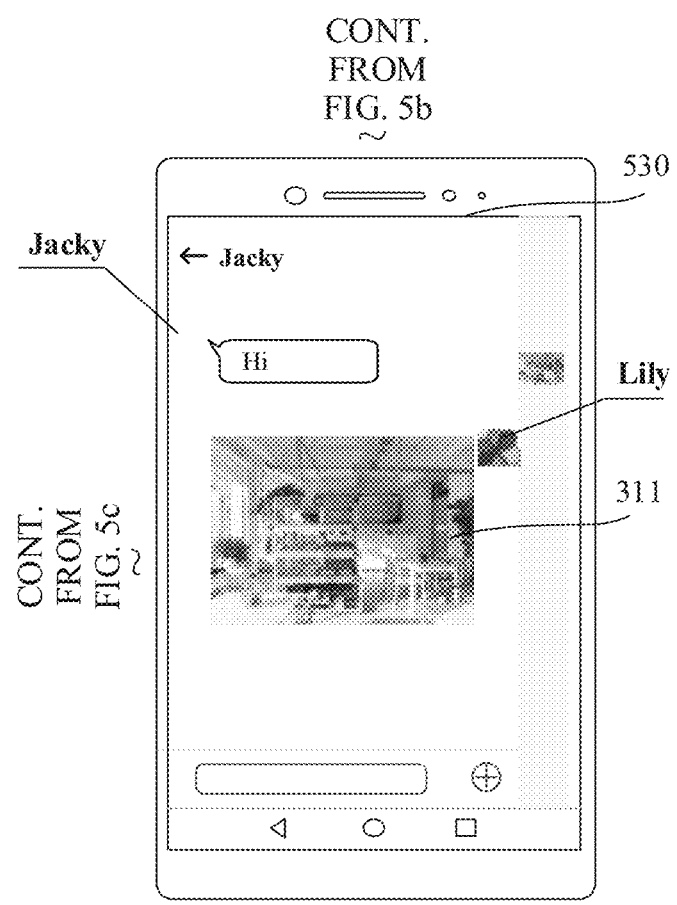

The foregoing embodiment shown in FIGS. 3a to 3h describes an example in which a picture is shared when the shortcut bar is displayed on the display screen. In some other embodiments, the shortcut bar may be hidden when not being used, and display of the shortcut bar is triggered when the user needs to share a picture in the shortcut bar. With reference to FIGS. 4a to 4c, the following describes in detail how to share a picture with another user when the shortcut bar is hidden.

When the shortcut bar is hidden, the user Lily of the mobile phone 100 may touch and hold a region in which the shortcut bar is located to trigger display of the shortcut bar. For example, the shortcut bar is hidden on the right-side edge of the display screen of the mobile phone 100. A dashed-line box 411 shown in FIG. 4a represents the region in which the shortcut bar is located. The mobile phone displays a chat interface 410 between the user Lily and the user Jacky shown in FIG. 4a. When detecting an operation (for example, touching and holding of a finger) performed on a region 411 in which a shortcut bar is located, the mobile phone 100 displays a shortcut bar 421 shown in FIG. 4b in response to the operation. The shortcut bar 421 includes a thumbnail 422. Lily may drag the thumbnail 422 in the shortcut bar 421 to send the picture 311 corresponding to the thumbnail 422 to Jacky.

In this embodiment of this application, it is not necessarily the case shown in FIGS. 4a to 4c in which the mobile phone 100 detects the operation (for example, touching and holding of a finger) performed on the region 411 in which the shortcut bar is located to expand and display content in the shortcut bar. In this embodiment of this application, the mobile phone 100 may expand and display the content in the shortcut bar in another manner. For example, the user may view the content in the shortcut bar by invoking the shortcut bar through sliding. Refer to FIG. 4c. When detecting an operation of sliding left from a right-side edge, the mobile phone 100 displays the shortcut bar 421 shown in FIG. 4b in response to the operation. The shortcut bar 421 includes the thumbnail 422. Lily may drag the thumbnail 422 in the shortcut bar 421 to send the picture 311 corresponding to the thumbnail 422 to Jacky.

In an example, before the copy control 322 in FIG. 3c needs to be tapped, display of the shortcut bar may be triggered by using the operation shown in 4b or FIG. 4c. When detecting an operation performed on the copy control 322, the mobile phone 100 displays the picture 311 in the shortcut bar 331.

In this embodiment of this application, when the shortcut bar is invoked through sliding to view content saved in the shortcut bar, a sliding direction is not limited in this application.

After a first picture is displayed in the shortcut bar, when the user Lily of the mobile phone 100 needs to share the first picture with Jacky, the user Lily may not directly perform an operation on the shortcut bar, but may directly invoke the first picture in the shortcut bar in a social application to share the first picture with another user. Refer to FIGS. 5a to 5d. In some examples, in a chat interface 500 between the user Lily and the user Jacky shown in FIG. 5a, Lily may send the picture 311 in the shortcut bar to Jacky by using a chat input box (for example, a chat input box 501 shown in FIG. 5a) of a chat interface of WeChat. For example, when detecting an operation (for example, touching and holding) performed on the chat input box 501, the mobile phone 100 displays a paste control 521 shown in FIG. 5c in response to the operation. When detecting an operation (for example, tapping) performed on the paste control 521, the mobile phone displays a user interface 530 shown in FIG. 5d in response to the operation. In some other examples, Lily may send the picture 311 in the shortcut bar to Jacky by using an add symbol (for example, a control marked as 511 shown in FIG. 5b) in the chat interface of WeChat, to display the user interface shown in FIG. 5d.

In the foregoing UI example shown in FIGS. 3a to 3h, an example in which a preset gesture is two-finger pressing is described. In this embodiment of this application, when the mobile phone 100 is a mobile phone with a foldable screen or a curved screen, the preset gesture may be a one-hand hold gesture, that is, the preset gesture shown in FIG. 3c may be replaced with the one-hand hold gesture shown in FIG. 6a.

Figure 6B:
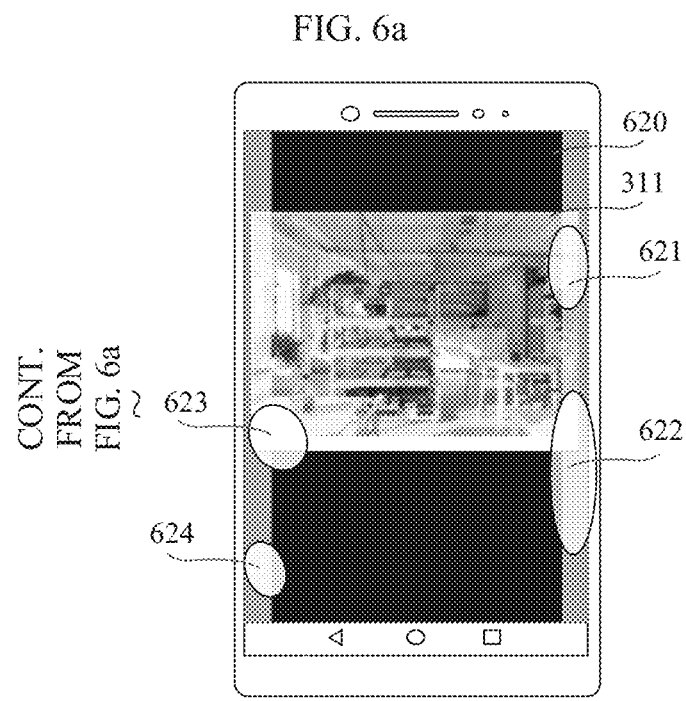

For example, the mobile phone 100 is a mobile phone with a curved screen. Refer to FIG. 6a. When the user holds the mobile phone 100 with one hand, the mobile phone may detect, through force touch and a TP on a side, a pressure change and an area change when a finger is in contact with the screen. As shown in FIG. 6b, contact shapes when a finger of the user touches the display screen are elliptical boxes 601, 602, 603, and 604 shown in FIG. 6b. When detected pressure and a detected area meet specific conditions, a screen recognition function is triggered, and the picture recognition window 321 shown in FIG. 3c is displayed, or the first picture is displayed in the shortcut bar, and the user interface 330 shown in FIG. 3d may be displayed. For the user interface 330 and a subsequent sharing process, refer to the related descriptions in FIGS. 3a to 3h. For an implementation process of the screen recognition function, refer to the foregoing related descriptions. Details are not described herein again.

When a picture is displayed in a form of a thumbnail in the shortcut bar, or when content of a picture in the shortcut bar cannot be clearly viewed or recognized, an operation (for example, tapping or touching and holding) may be performed on the shortcut bar or the thumbnail in the shortcut bar to enlarge content in the shortcut bar, so that the user can clearly view the picture in the shortcut bar, and accurately select a picture that the user wants to share.

FIGS. 7a to 7d illustrate some embodiments of enlargement, implemented on the mobile phone 100, of a picture saved in the shortcut bar 331.

Refer to 7a. A user interface 710 includes the shortcut bar 331, and the shortcut bar 331 includes the thumbnail 332 corresponding to the picture 311 and a thumbnail 711 corresponding to a picture 731.

In some embodiments, an operation (for example, touching and holding) may be performed on a thumbnail in the shortcut bar to display a complete picture corresponding to the thumbnail. For example, when detecting an operation (for example, touching and holding) performed on the thumbnail 332, the mobile phone 100 displays a user interface 720 shown in FIG. 7b in response to the operation. The user interface 720 includes a preview window 721 of the picture 311 corresponding to the thumbnail 332. When detecting an operation (for example, touching and holding) performed on the thumbnail 711, the mobile phone 100 displays a user interface 740 shown in FIG. 7d in response to the operation. The user interface 740 includes a preview window 741 of the picture 732 corresponding to the thumbnail 711.

Figure 7A:
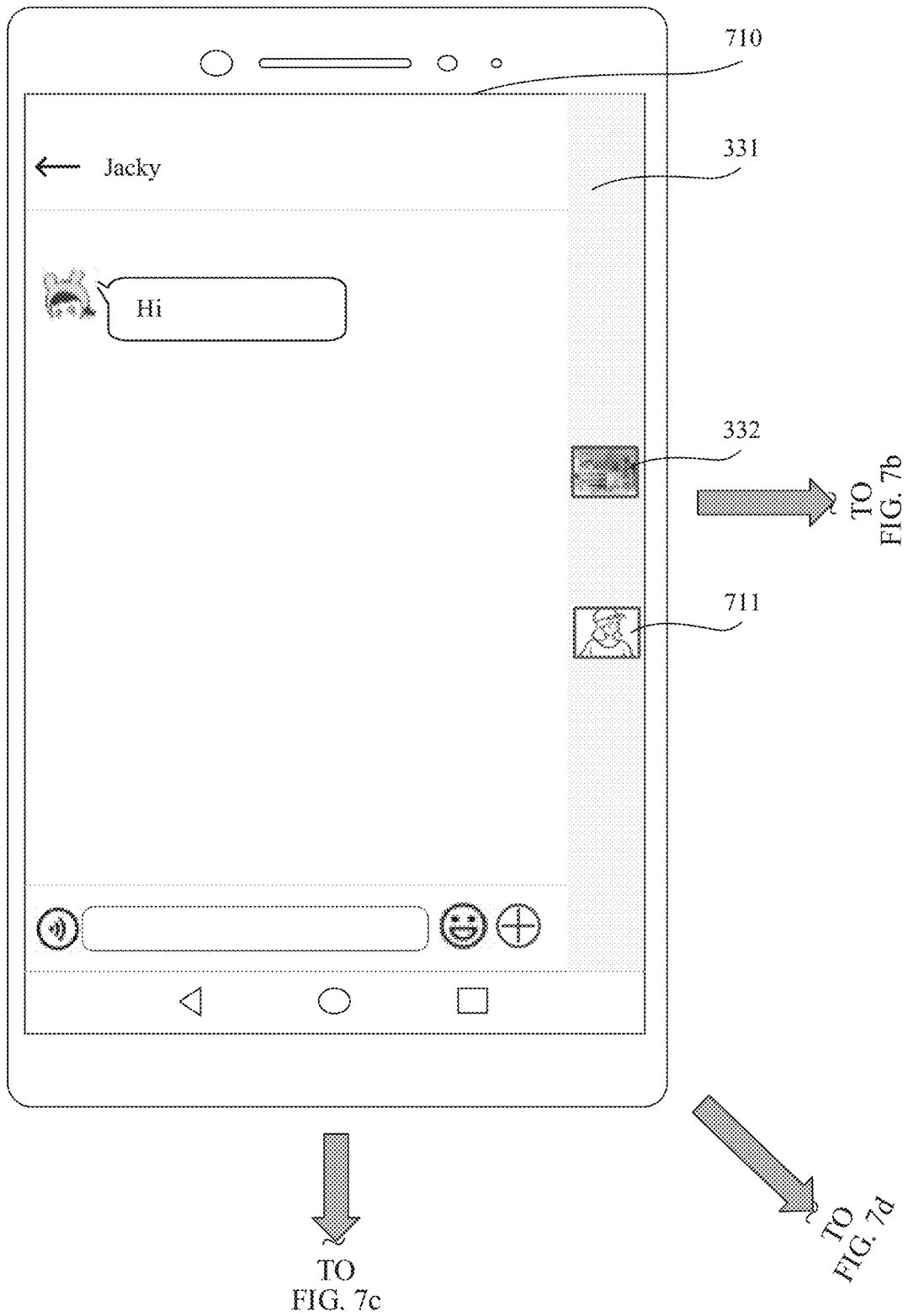
FIGS. 7a to 7d are a schematic diagram of another group of interfaces according to an embodiment of this application.
Figure 7B:
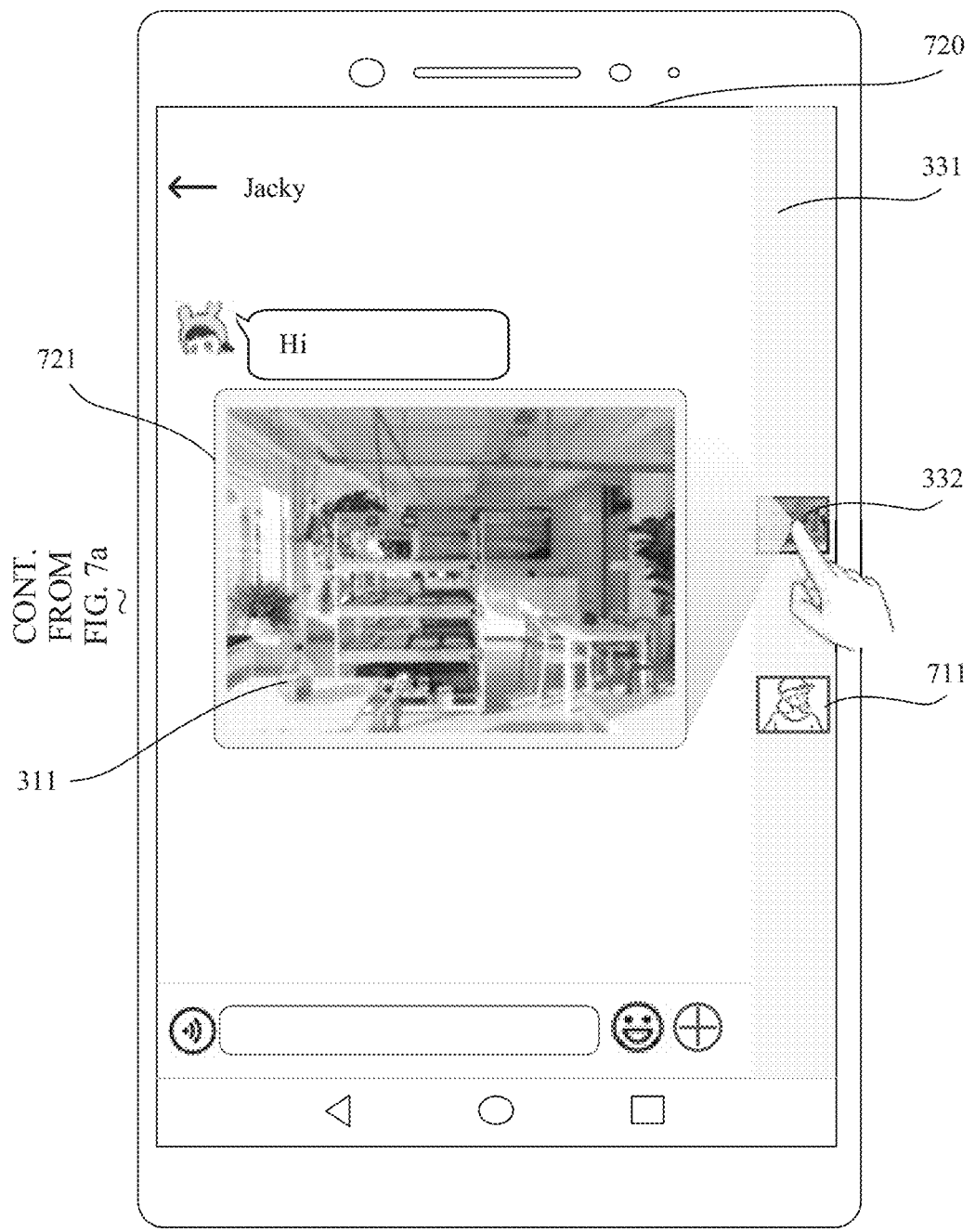

When the user Lily of the mobile phone 100 needs to share a picture in the shortcut bar 331, the user Lily may touch and hold the thumbnail 332 or 711 shown in FIG. 7a. In an example of the thumbnail 332. Lily may touch and hold the thumbnail 332 with a finger to enlarge the picture 311 corresponding to the thumbnail 332 for display, and drag the thumbnail 332 to a chat region of the WeChat application. When the finger leaves the thumbnail 332, Lily sends the picture 311 corresponding to the thumbnail 332 to Jacky. In the process of dragging the thumbnail 332, the enlarged picture 311 may be always displayed, or the enlarged picture 311 may not be displayed. This is not limited herein.

In some other embodiments, an operation (for example, touching and holding) may be performed on any location of a shortcut bar to display complete pictures corresponding to all thumbnails included in the shortcut bar. For example, when detecting an operation (for example, touching and holding) performed on the shortcut bar, the mobile phone 100 displays a user interface 730 shown in FIG. 7c in response to the operation. The user interface 730 includes the shortcut bar 331 and a preview window 731, the picture 311 corresponding to the thumbnail 332 is displayed in the shortcut bar 331, and the picture 732 corresponding to the thumbnail 711 and the picture 311 corresponding to the thumbnail 332 are displayed in the preview window 731.

Refer to 7c. When a picture in the shortcut bar 331 needs to be shared, in an example of sharing the picture 732 corresponding to the thumbnail 711, any location of the shortcut bar 331 may be touched and held to display the preview window 731, and a finger may be moved to the preview window 731 to select a to-be-shared picture. For example, when detecting a one-finger touching and holding operation performed on the shortcut bar 331, the mobile phone 100 displays the preview window 731. When detecting that the finger moves to the picture 311 in the preview window 731 and leaves the display screen, the mobile phone 100 sends the picture 311 to Jacky.

In this embodiment, if there are many thumbnails in a shortcut bar, a quantity of pictures that can be completely displayed in a preview window is limited, and pictures corresponding to all thumbnails may be unable to be displayed in the preview window at once, an operation (for example, sliding upward or downward) may be performed on the preview window to display a preset quantity of pictures in the preview window through scrolling.

Figure 8A:
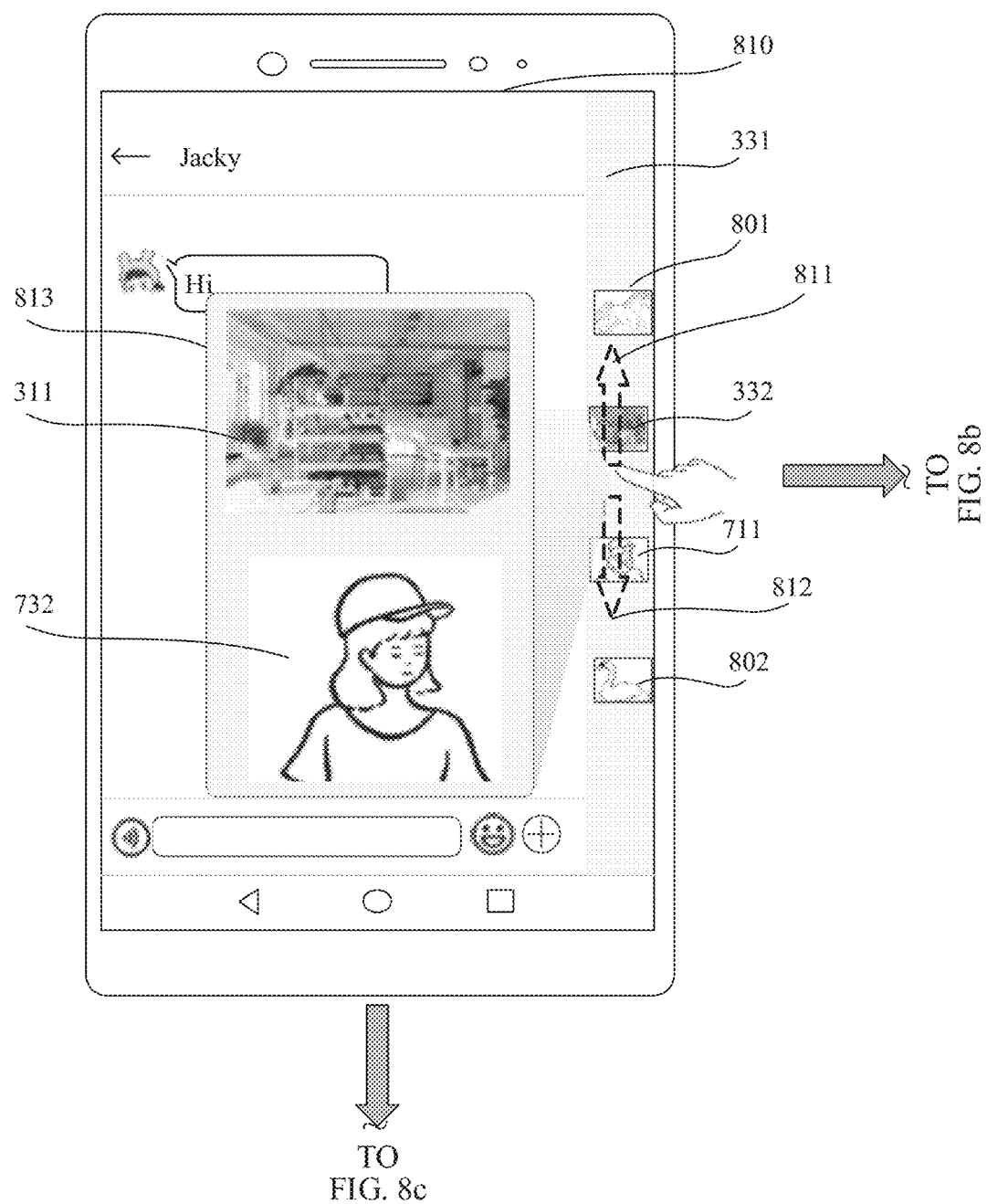
FIGS. 8a to 8c are a schematic diagram of another group of interfaces according to an embodiment of this application.
Figure 8B:
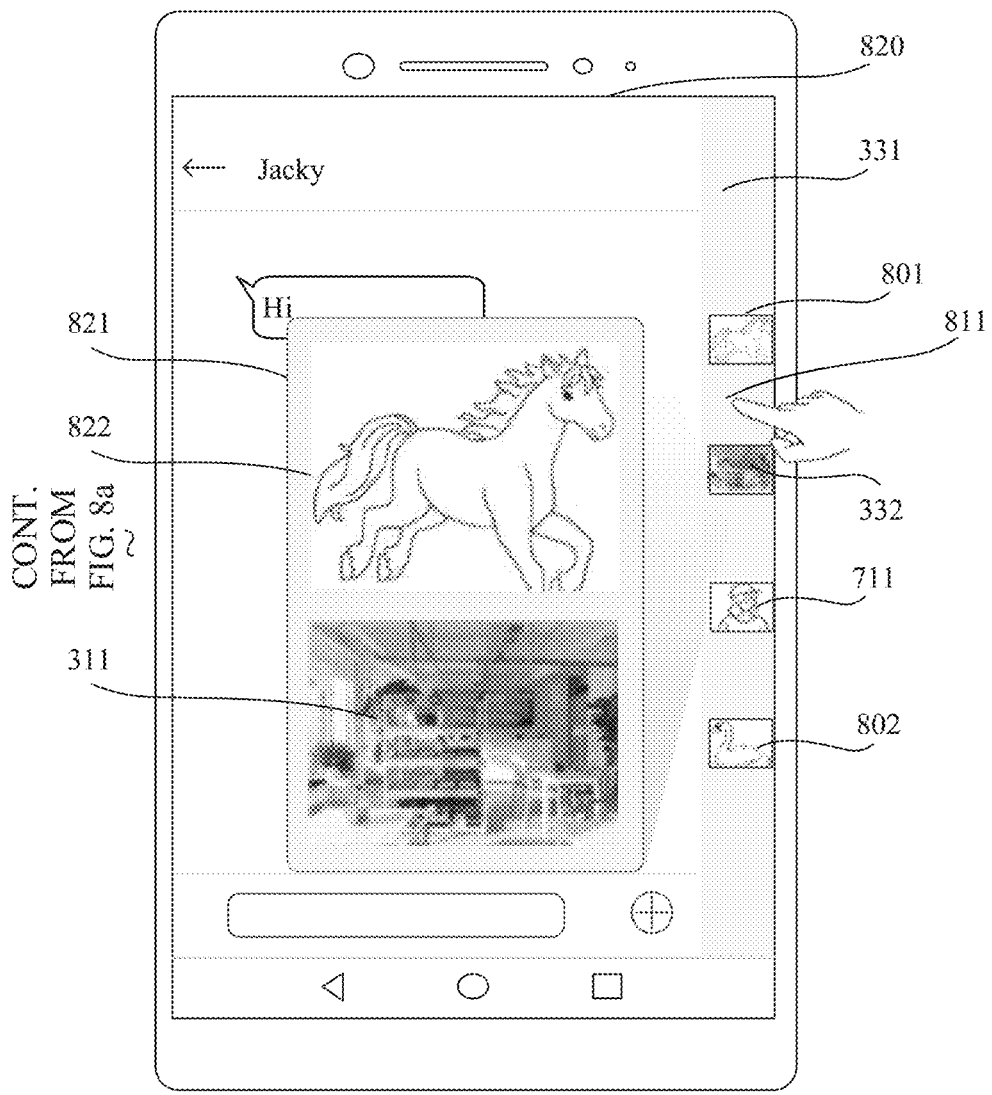
Figure 8C:
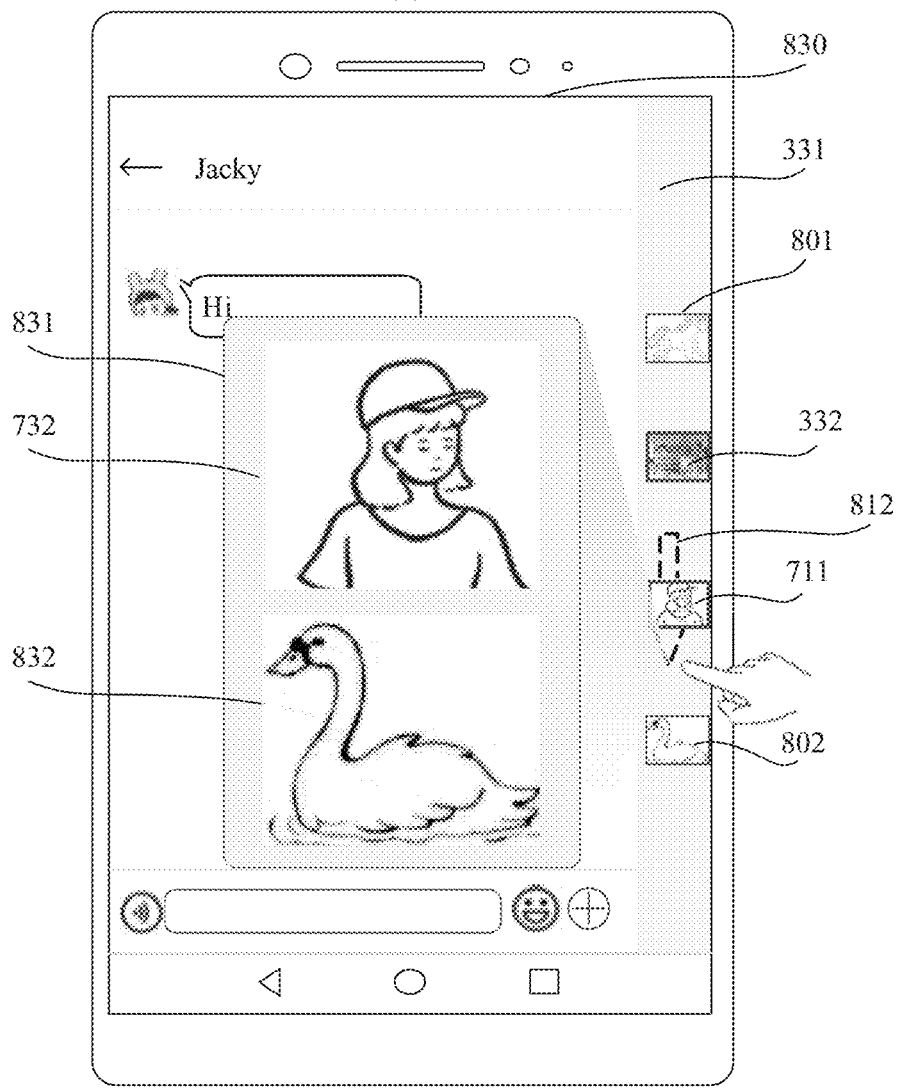

FIGS. 8a to 8c illustrate some embodiments of scrolling display, implemented on the mobile phone 100, of enlarged pictures in a preview window corresponding to a shortcut bar.

Refer to 8a. A user interface 810 includes the shortcut bar 331 and a thumbnail 801, the thumbnail 332, the thumbnail 711, and a thumbnail 802 that are included in the shortcut bar 331.

In some examples, when detecting an operation (for example, touching and holding) performed on a location region between the thumbnail 332 and the thumbnail 711, the mobile phone 100 displays a preview window 813 in response to the operation. In an example in which two pictures can be displayed in the preview window 813, the preview window 813 includes the picture 311 corresponding to the thumbnail 332 and the picture 732 corresponding to the thumbnail 711.

In some other examples, if another picture needs to be displayed in a preview window, for example, a picture corresponding to a thumbnail above the thumbnail 332 in the shortcut bar needs to be displayed, a linger may slide the shortcut bar upward, so that the another picture is displayed by scrolling up the preview window. For example, when detecting an upward sliding operation (in a direction of a dashed-line arrow 811) that is performed on the shortcut bar 331 and that is performed in a location region between the thumbnail 332 and the thumbnail 801, the mobile phone 100 displays a preview window 821 in a user interface 820 shown in FIG. 8b in response to the operation. The preview window 821 includes the picture 311 corresponding to the thumbnail 332 and a picture 822 corresponding to the thumbnail 801.

In some other examples, if another picture needs to be displayed in a preview window, for example, a picture corresponding to a thumbnail below the thumbnail 711 in the shortcut bar needs to be displayed, a finger may slide the shortcut bar downward, so that the another picture is displayed by scrolling down the preview window. For example, when detecting a downward sliding operation (in a direction of a dashed-line arrow 812) that is performed on the shortcut bar 331 and that is performed in a location region between the thumbnail 711 and the thumbnail 802, the mobile phone 100 displays a preview window 831 in a user interface 830 shown in FIG. 8c in response to the operation. The preview window 831 includes the picture 732 corresponding to the thumbnail 711 and a picture 832 corresponding to the thumbnail 802.

When the user of the mobile phone 100 needs to share a picture in the preview window shown in FIGS. 7a to 7d or in FIGS. 8a to 8c with another user, the user may directly drag the selected picture to a chat interface region in the preview window, or drag the selected picture to a chat input box, and then release a finger, and the mobile phone sends the selected picture. In some other embodiments, a dragged picture may be completely displayed in a process of dragging a thumbnail in a shortcut bar.

Figure 7C:
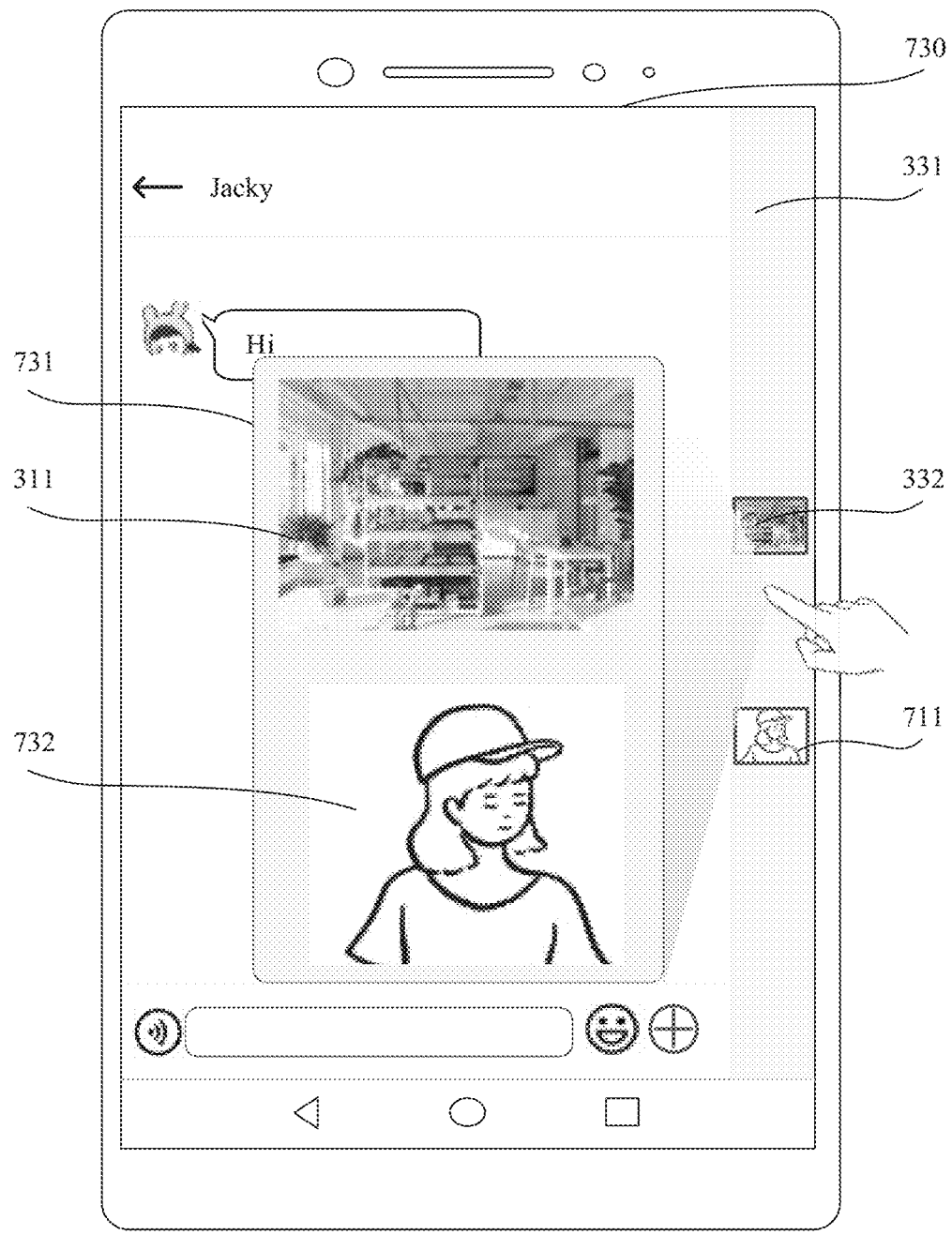
Figure 7D:
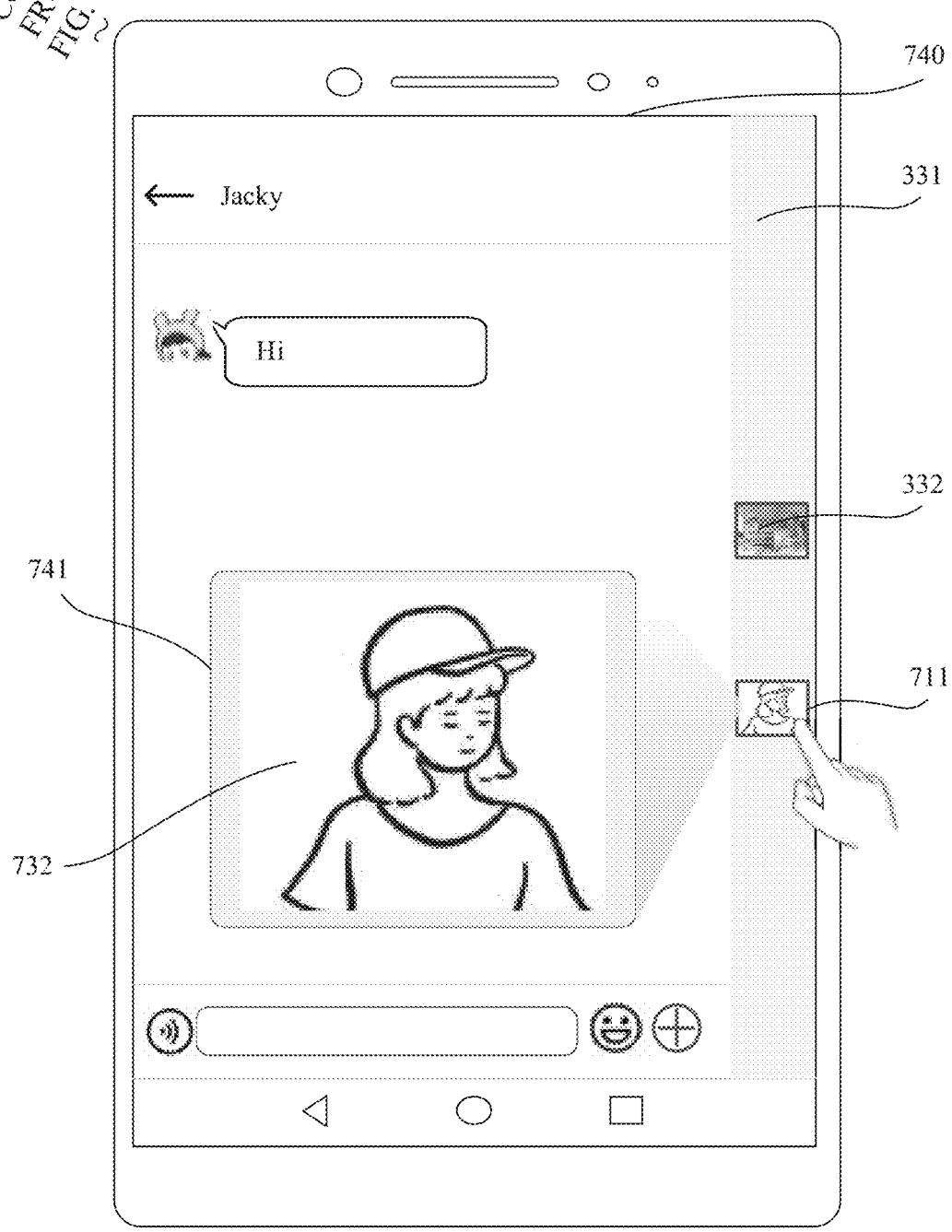

When a plurality of pictures are displayed in a preview window, for example, the preview window 731 shown in FIG. 7c, the preview window 813 shown in FIG. 8a, the preview window 821 shown in FIG. 8b, and the preview window 831 shown in FIG. 8c, one or more pictures may be selected from the preview window and sent to another user.

FIG. 8c is used as an example. When detecting that a finger of the user moves to a location between the thumbnail 711 and the thumbnail 802, the mobile phone 100 displays the preview window 831, and when detecting that the finger moves from the location to a chat region or a chat input box of WeChat (the finger does not leave the display screen of the mobile phone in a moving process), the mobile phone 100 sends the picture 732 and the picture 832 in the preview window 831 to another user when the finger leaves the display screen of the mobile phone.

In addition, the preview windows shown in FIGS. 7a to 7d and in FIGS. 8a to 8c may also be closed by performing an operation on shortcut bars. For example, as shown in FIG. 8c, when detecting that a finger of the user moves to a location between the thumbnail 711 and the thumbnail 802, the mobile phone 100 displays the preview window 831, and when detecting an operation (for example, tapping) performed on a location between the thumbnail 711 and the thumbnail 802, the mobile phone 100 closes the preview window 831, that is, the mobile phone 100 does not display the preview window 831.

In the foregoing embodiment, an original picture or a thumbnail may be displayed in the shortcut bar. For example, whether an original picture or a thumbnail is to be displayed in the shortcut bar may be determined based on a size of a picture. For example, when a size of a picture is relatively small, an original picture of the picture may be displayed in the shortcut bar; or when a size of a picture is relatively large, a thumbnail of the picture may be displayed in the shortcut bar.

In this embodiment of this application, an example in which content saved in the shortcut bars shown in FIGS. 3a to 8c is a picture is described. In this embodiment of this application, a text may be alternatively saved in the shortcut bar, and the user may alternatively drag the text saved in the shortcut bar to an editable region of a social application (for example, the chat input box 501 of WeChat shown in FIG. 5a), and send the text to another user.

In the foregoing embodiment, the shortcut bar may have another representation form, for example, a floating window or a clipboard.

For example, a floating window is displayed on the mobile phone 100. A shape of the floating window may be a circle, a rectangle, or another shape, and this is not limited herein.

FIGS. 9a to 9f illustrate an implementation in which a floating window 901 on the mobile phone 100 enters a preview interface to share the first picture with another user.

Figure 9A:
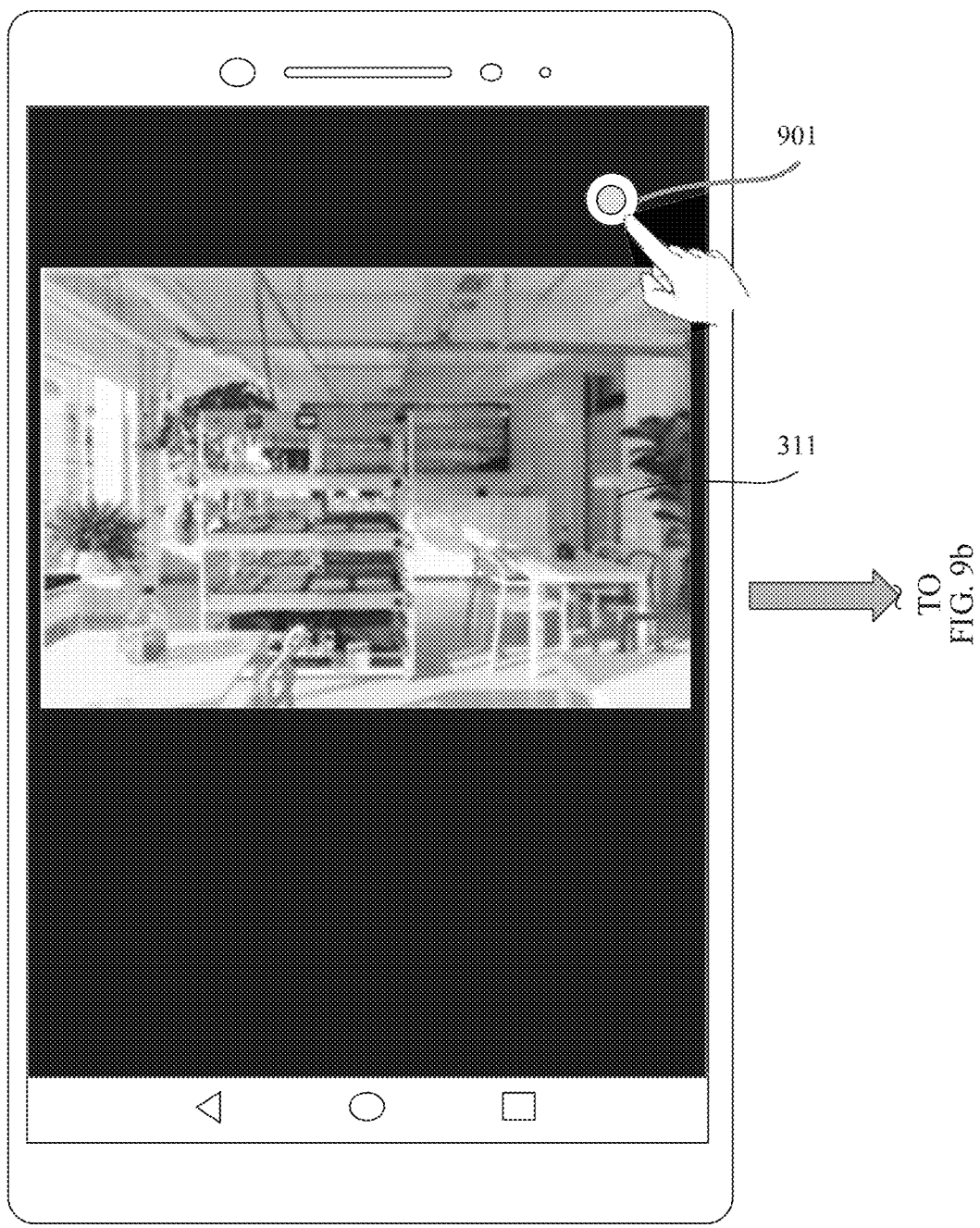
FIGS. 9a to 9f are a schematic diagram of another group of interfaces according to an embodiment of this application.

When detecting an operation performed on the copy control 322 shown in FIG. 3c, the mobile phone 100 saves the picture 311 in a floating window such as the floating window 901 shown in FIG. 9a in response to the operation on the copy control 322. The floating window 901 may be suspended in a display interface of any application, for example, an application display interface including the first picture in the Weibo application shown in FIG. 9a or a chat interface 920 of WeChat shown in FIG. 9b.

When the user Lily of the mobile phone 100 needs to view or use the first picture, the user Lily may enter, by using the floating window 901, a preview interface in which a picture is displayed, to perform an operation on the first picture in the preview interface.

The following describes embodiments of displaying interfaces for sharing the first picture with another user by using WeChat in the mobile phone 100 in two different scenarios.

Scenario 1: Refer to FIGS. 9a to 9c, 9e, and 9f. When the mobile phone 100 displays a display interface of a non-WeChat application, the user enters, by using the floating window 901, a preview interface in which a picture is displayed, selects the first picture, and shares the first picture with another user by using the WeChat application.

Figure 9B:
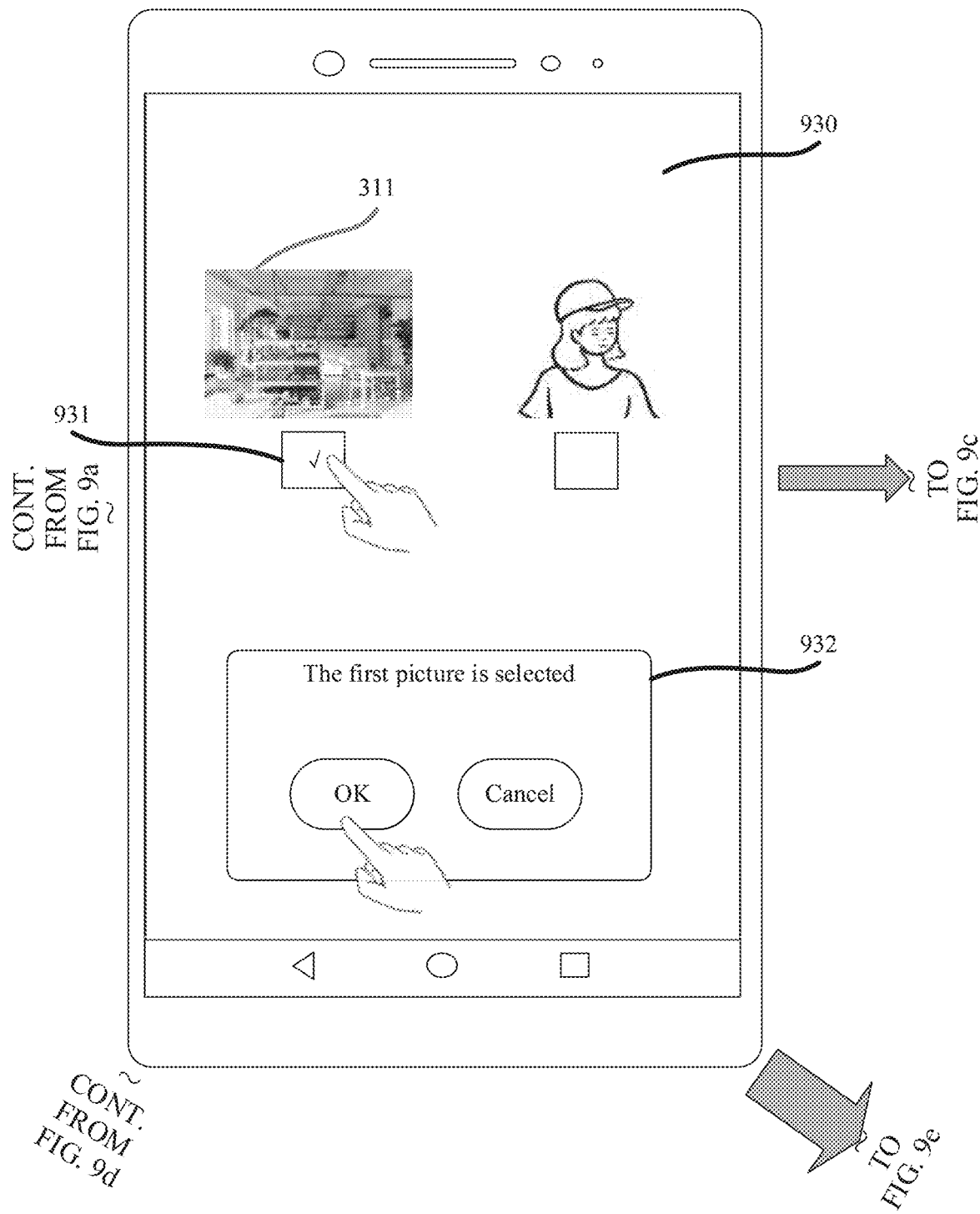

When the mobile phone 100 is displaying a display interface of the Weibo application shown in FIG. 9a, when detecting an operation (for example, tapping or touching and holding) performed on the floating window 901, the mobile phone 100 displays a preview interface 930 shown in FIG. 9b in response to the operation. The preview interface 930 may include the picture 311. When detecting an operation (for example, touching and holding) performed on the picture 311, the mobile phone 100 displays, in response to the operation, a control 940 shown in FIG. 9c for selecting a sharing application. The control 940 may include social applications capable of sharing, and the social applications specifically include but are not limited to WeChat, QQ, Email, Messages. Moments, and the like.

Optionally, the preview interface 930 may further include a candidate box 931. The candidate box 931 may be located in a region near an associated picture. For example, the candidate box 931 displayed in FIG. 9b is located in a region below the picture 311. The picture 311 associated with the candidate box 931 may be selected by selecting the candidate box 931. When detecting an operation (for example, tapping) performed on the candidate box 931, the mobile phone 100 displays, in response to the operation, the control 940 shown in FIG. 9c for selecting an application, or prompt information 932 displaying "The first picture is selected" and two controls "OK" and "Cancel". The user may tap the "OK" control to trigger the mobile phone 100 to display the control 940 shown in FIG. 9c, or the user may tap the "Cancel" control to trigger selection of the first picture to be cancelled, and may select another picture in the user interface 930 for sharing.

Figure 9C:
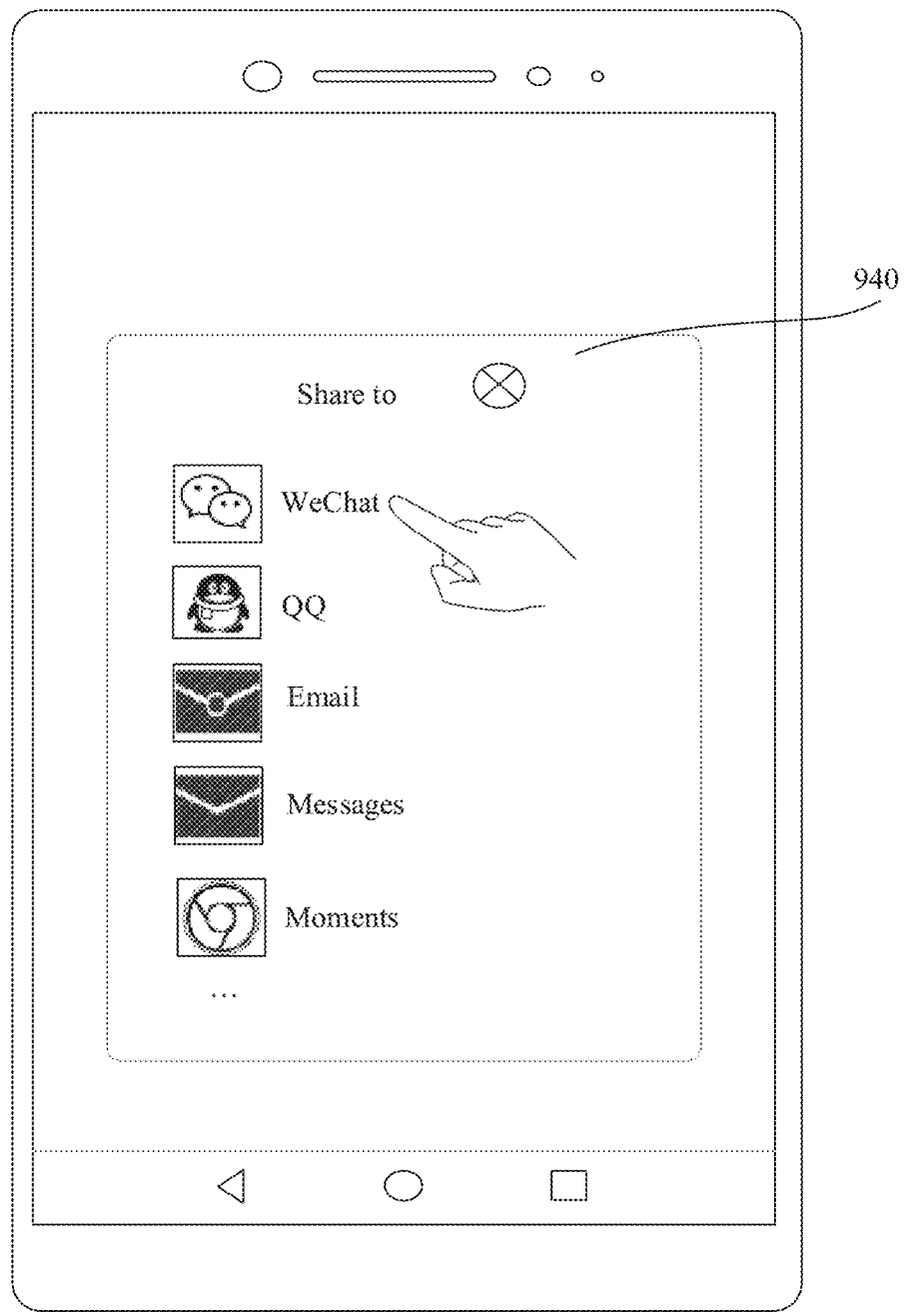
Figure 9D:
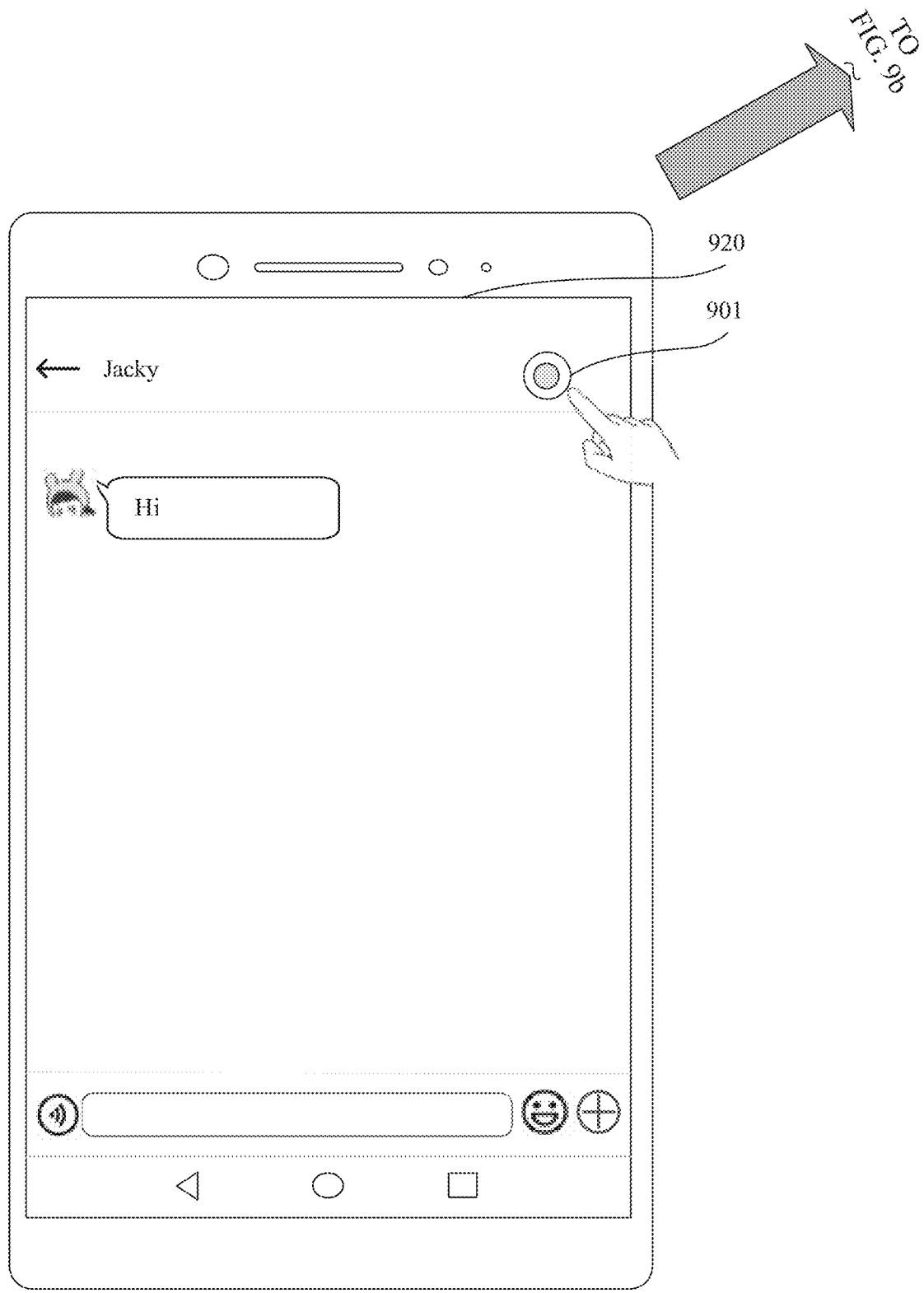
Figure 9E:
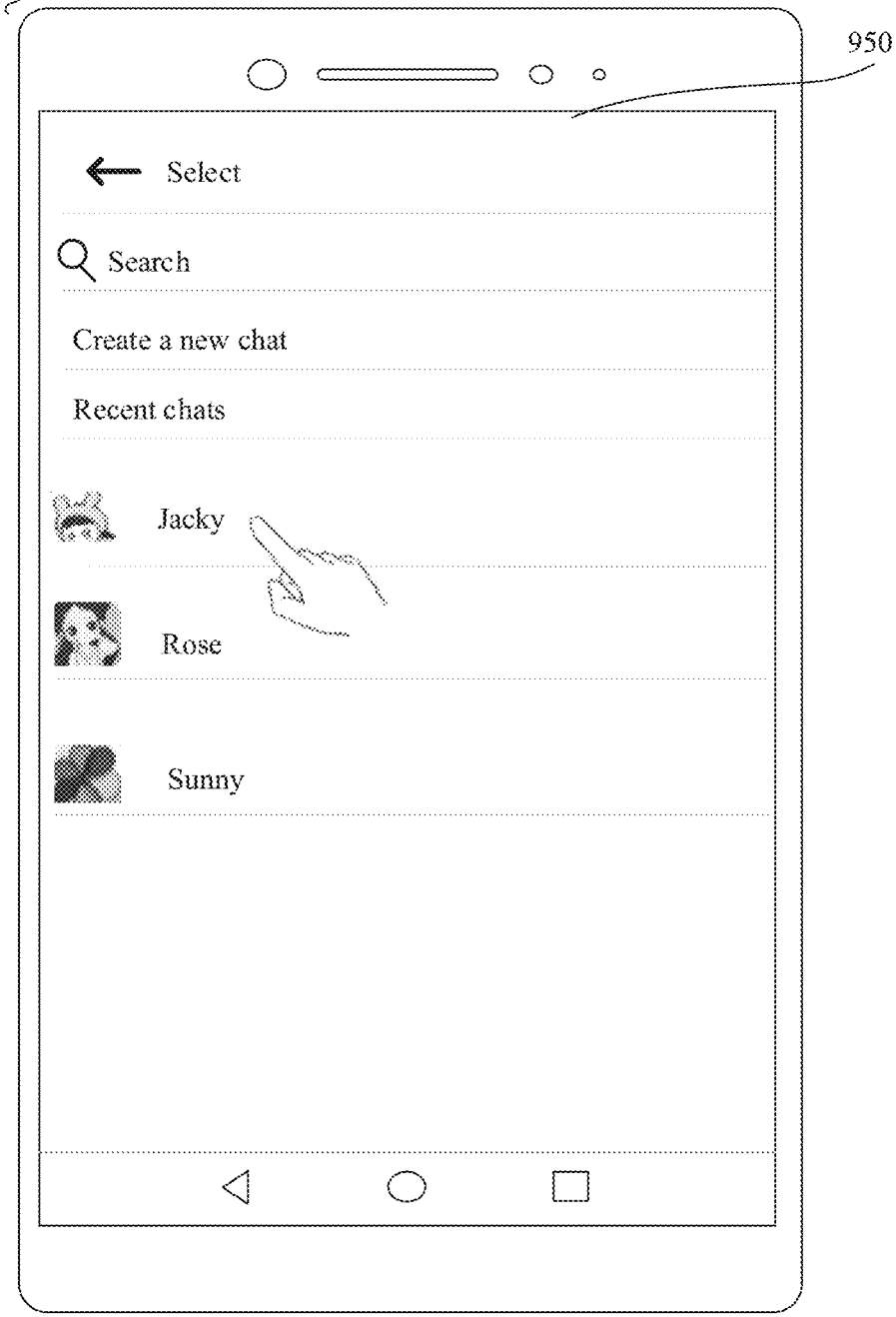
Figure 9F:
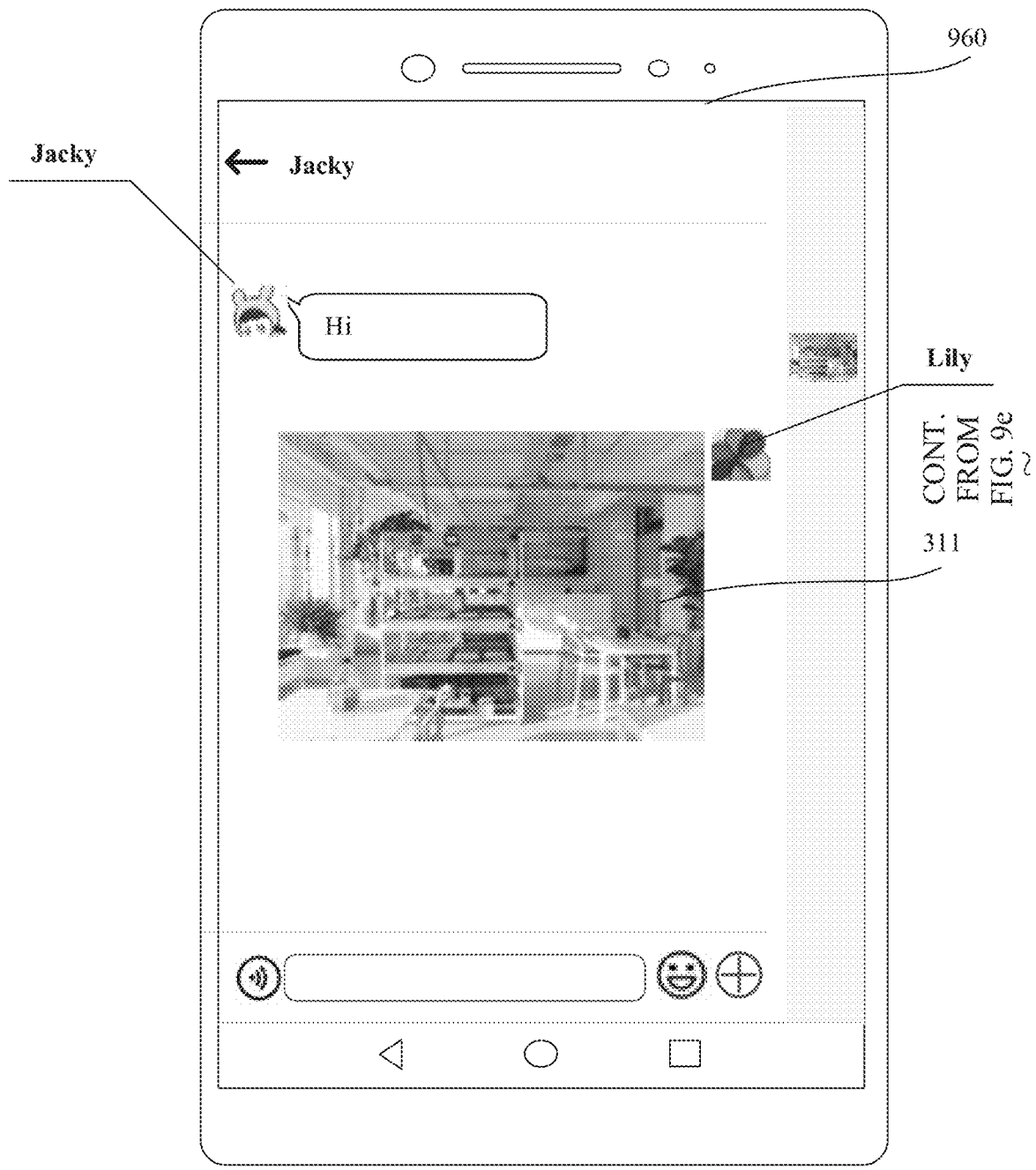

As shown in FIG. 9c, when detecting an operation of triggering a WeChat icon in the control 940, the mobile phone 100 displays a user interface 950 shown in FIG. 9e in response to the operation. The user Lily may select one or more users from users such as Jacky. Rose, and Sunny in recent chats, and share the first picture with the one or more users, or may create a new chat, select another user from an address book, and share the first picture with the another user. For example, if the user Lily chooses to share the first picture with Jacky, the mobile phone 100 displays a user interface 960 shown in FIG. 9f In the user interface 960, a message (the picture 311) on the right is sent by Lily by using the mobile phone 100, and a message on the left is sent by Jacky by using another mobile phone.

Scenario 2: Refer to FIGS. 9d, 9b, 9e, and 9f. When the mobile phone 100 displays a display interface of a non-WeChat application, the user enters, by using the floating window 901, a preview interface in which a picture is displayed, selects the first picture, and shares the first picture with another user by using the WeChat application.

When the mobile phone 100 is displaying a display interface of the WeChat application shown in FIG. 9d, when detecting an operation (for example, tapping or touching and holding) performed on the floating window 901, the mobile phone 100 displays a preview interface 930 shown in FIG. 9b in response to the operation. The preview interface 930 may include the picture 311. When detecting an operation (for example, touching and holding) performed on the picture 311, the mobile phone 100 displays a user interface 950 shown in FIG. 9e in response to the operation. The user Lily may select one or more users from users such as Jacky, Rose, and Sunny in recent chats, and share the first picture with the one or more users, or may create a new chat, select another user from an address book, and share the first picture with the another user. For example, if the user Lily chooses to share the first picture with Jacky, the mobile phone 100 displays a user interface 960 shown in FIG. 9f. In the user interface 960, a message (the picture 311) on the right is sent by Lily by using the mobile phone 100, and a message on the left is sent by Jacky by using another mobile phone.

Optionally, the preview interface 930 may further include a candidate box 931. The candidate box 931 may be located in a region near an associated picture. For example, the candidate box 931 displayed in FIG. 9b is located in a region below the picture 311. The picture 311 associated with the candidate box 931 may be selected by selecting the candidate box 931. When detecting an operation (for example, tapping) performed on the candidate box 931, the mobile phone 100 displays the user interface 950 shown in FIG. 9e in response to the operation. In some other examples, when detecting an operation (for example, tapping) performed on the candidate box 931, the mobile phone 100 displays prompt information 932 displaying "The first picture is selected" and two controls "OK" and "Cancel" in response to the operation. The user may tap the "OK" control to trigger the mobile phone 100 to display the user interface 950 shown in FIG. 9e, or the user may tap the "Cancel" control to trigger selection of the first picture to be cancelled, and may select another picture in the user interface 930 for sharing In the foregoing two scenarios, an operation may be performed on the floating window to enter the user interface 930, shown in FIG. 9b, in which a picture is displayed, or an operation (for example, tapping) may be performed on the floating window to display the shortcut bar in the foregoing embodiment, for example, the shortcut bar 331 shown in FIG. 3f.

For example, when the mobile phone 100 is displaying the display interface of the Weibo application shown in FIG. 9a, when detecting an operation (for example, tapping or touching and holding) performed on the floating window 901, the mobile phone 100 displays the user interface 330 shown in FIG. 3d in response to the operation. The user interface 330 may include the shortcut bar 331, and the shortcut bar 331 includes the thumbnail (marked as 332 in FIG. 3d) corresponding to the picture 311.

For example, when the mobile phone 100 is displaying the display interface of the WeChat application shown in FIG. 9d, when detecting an operation (for example, tapping or touching and holding) performed on the floating window 901, the mobile phone 100 displays the user interface 340 shown in FIG. 3f in response to the operation. The user interface 340 may include the shortcut bar 331, and the shortcut bar 331 includes the thumbnail (marked as 332 in FIG. 3f) corresponding to the picture 311. For a subsequent process of selecting a picture from the shortcut bar for sharing, refer to the related descriptions in FIG. 3a to 3h. Details are not described herein again.

The following embodiments use an example in which a picture is displayed in a clipboard to describe in detail an implementation for sharing content saved in the clipboard.

FIGS. 10a to 10d illustrate user interfaces for performing an operation on content in a clipboard on the mobile phone 100.

Figure 10A:
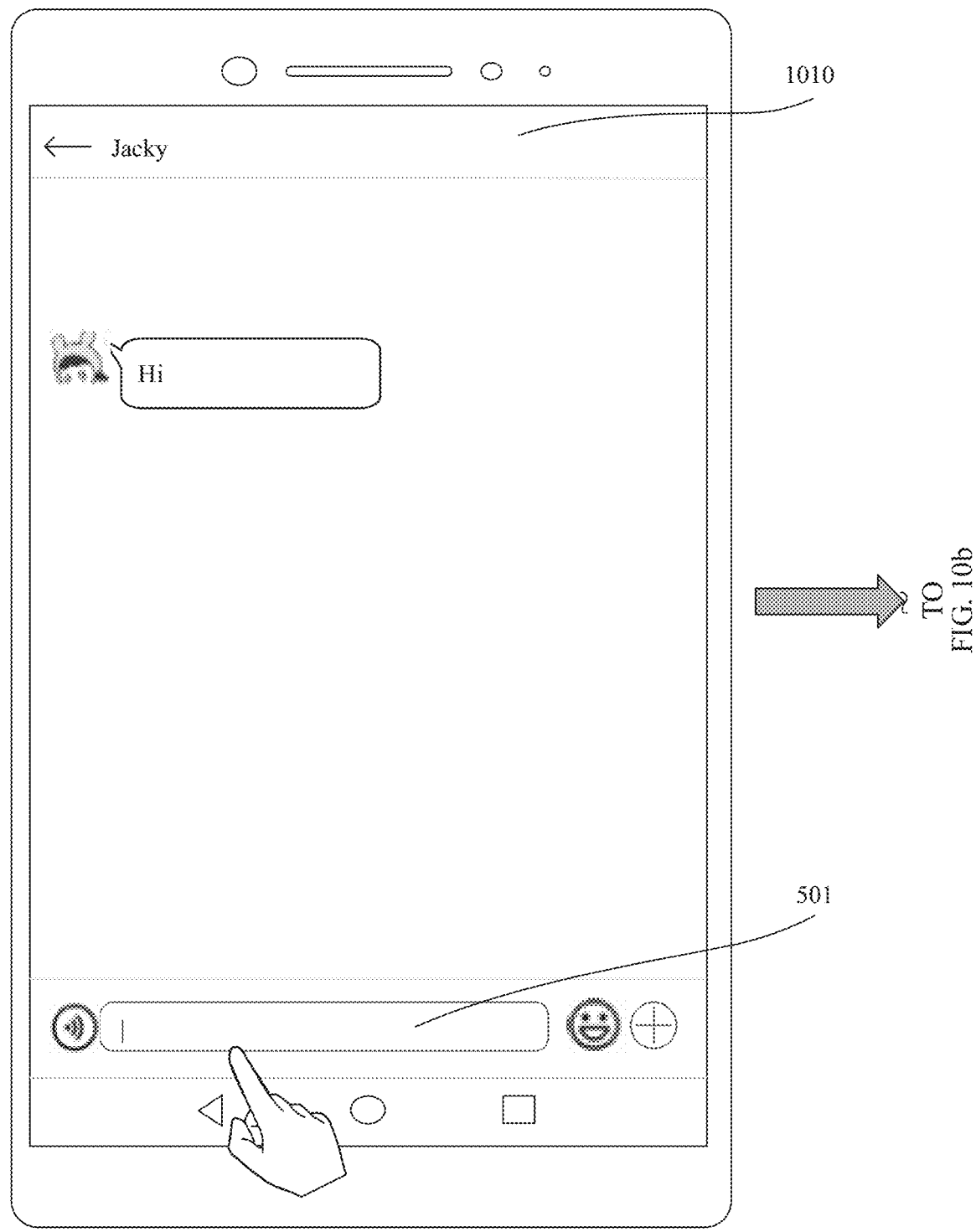
FIGS. 10a to 10d are a schematic diagram of another group of interfaces according to an embodiment of this application.

As shown in FIG. 10a, a user interface 1010 displayed on the mobile phone 100 is a chat interface of WeChat for chatting between the user Lily of the mobile phone 100 and the user Jacky of another device. The chat interface includes the chat input box 501. Lily may enter a text, a picture, and the like in the chat input box 501 and send the text, the picture, and the like in the chat input box 501 to Jacky. The user may perform an operation on the chat input box 501 to enable a clipboard in an input method application.

Figure 10B:
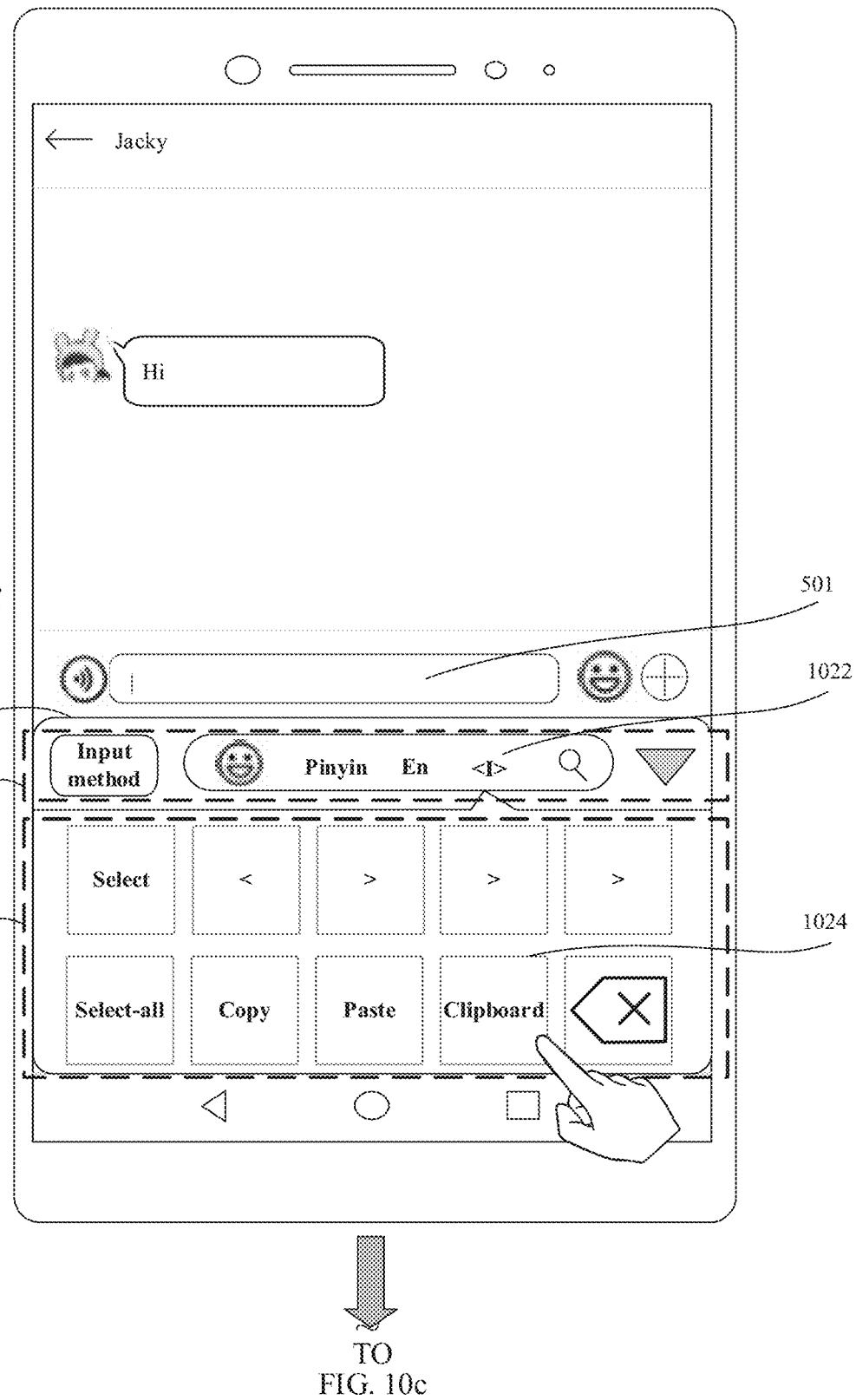
Figure 10C:
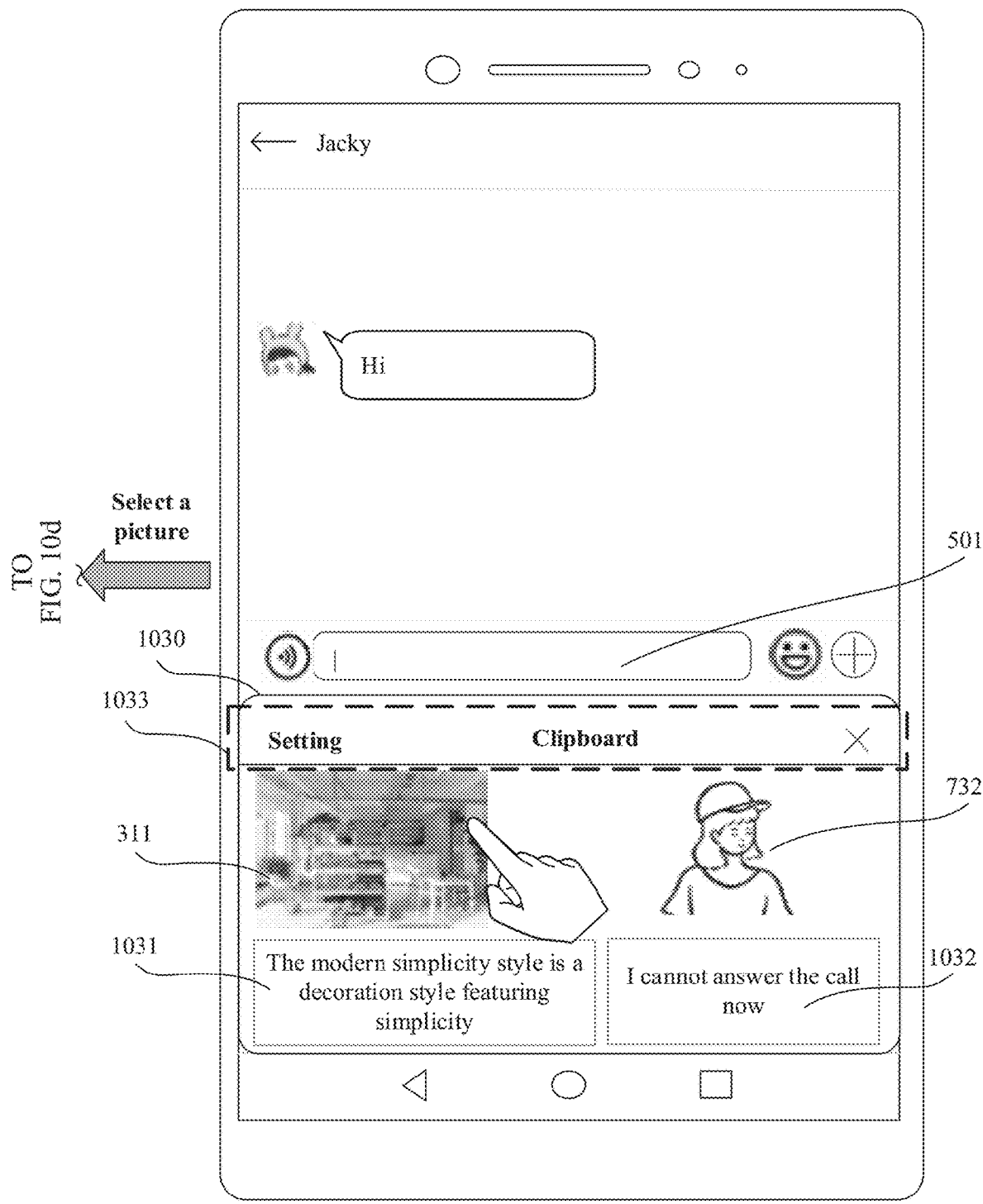
Figure 10D:
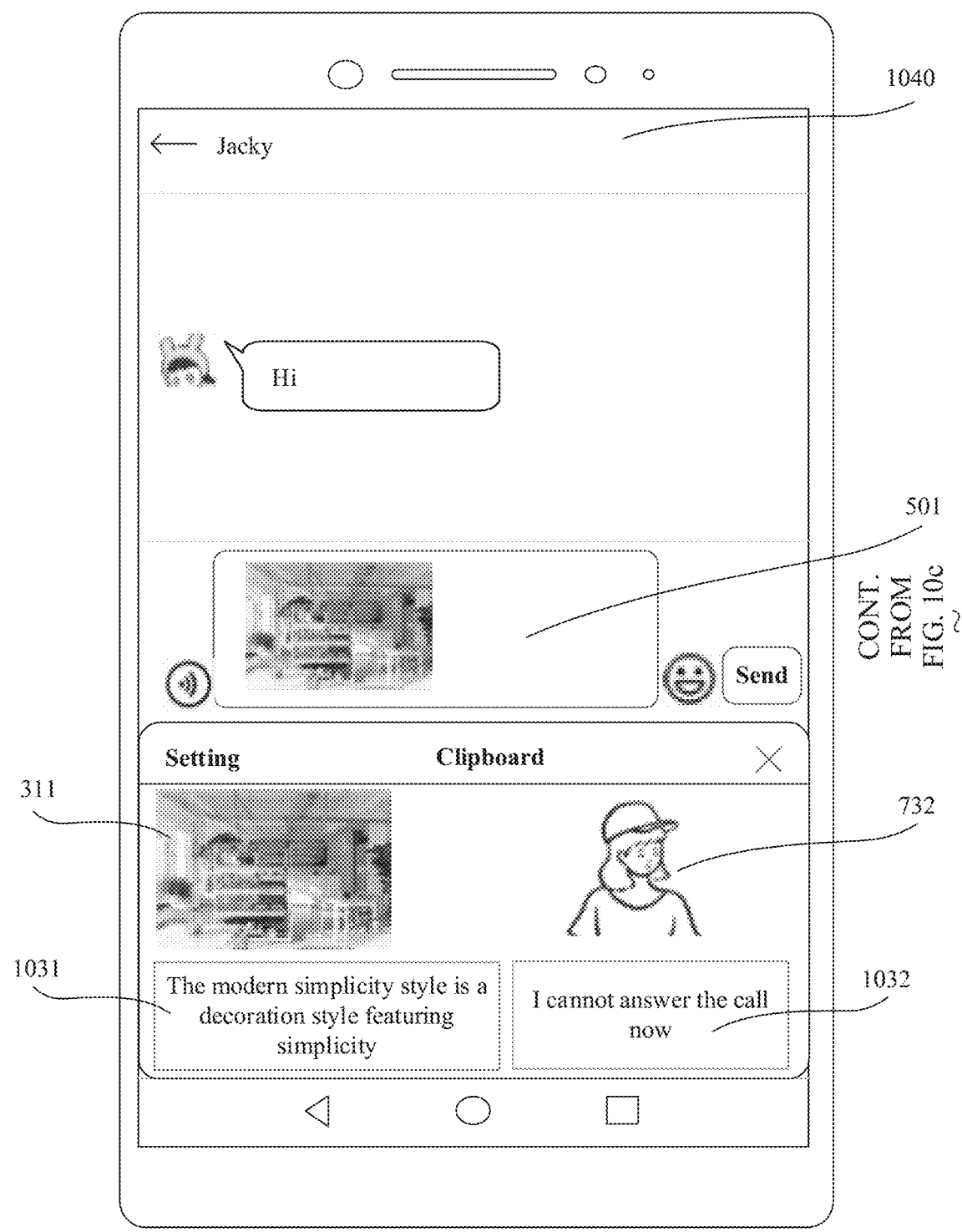

For example, when detecting an operation (for example, tapping) performed on the chat input box 501, the mobile phone 100 displays a window 1020 shown in FIG. 10b in response to the operation. The window 1020 may include a function region 1021. In the function region 1021, a function control 1022 of the clipboard is displayed, and a control with another function (for example, an input method function, pinyin, an English keyboard, search, or drop-down) may be further displayed. When the mobile phone 100 detects an operation on the function control 1022 (for example, a touch operation on the function control 1022) in the window 1020, the mobile phone 100 may display, in response to the operation, a function region 1023 including a clipboard control 1024. The function region 1023 further includes another function control that can perform an operation on content entered in the chat input box 501, for example, "select", "move left" (for example, a symbol "<"), "move right" (for example, a symbol ">"), "move up" (for example, a symbol "^"), "move down" (for example, a symbol "v"), "select-all", "copy", "paste", and "delete". When detecting an operation (for example, tapping) performed on the control 1024, the mobile phone 100 displays a window 1030 shown in FIG. 10c in response to the operation. The window 1030 may include a picture, and may also include a text, for example, the picture 311, the picture 732, a text 1031 (for example, "The modern simplicity style is a decoration style featuring simplicity"), and a text 1032 (for example, "I cannot answer the call now"). The window 1030 may further include a function region 1033, and the function region 1033 may include a setting control and a disable control (for example, a symbol "x") of the clipboard.

The user Lily may select content (a picture or a text) from the window 1030 and send the content to Jacky. For example, when detecting an operation (tapping) performed on the picture 311 in the window 1030, the mobile phone 100 pastes the picture 311 into the chat input box 501 shown in FIG. 10d in response to the operation. Then the mobile phone 100 may send the picture 311 to Jacky in response to an operation of tapping a sending button by the user. For a user interface displayed by the mobile phone 100 after the picture 311 is sent, refer to the user interface 350 shown in FIG. 3g. Details are not described herein again.

Figure 11A:
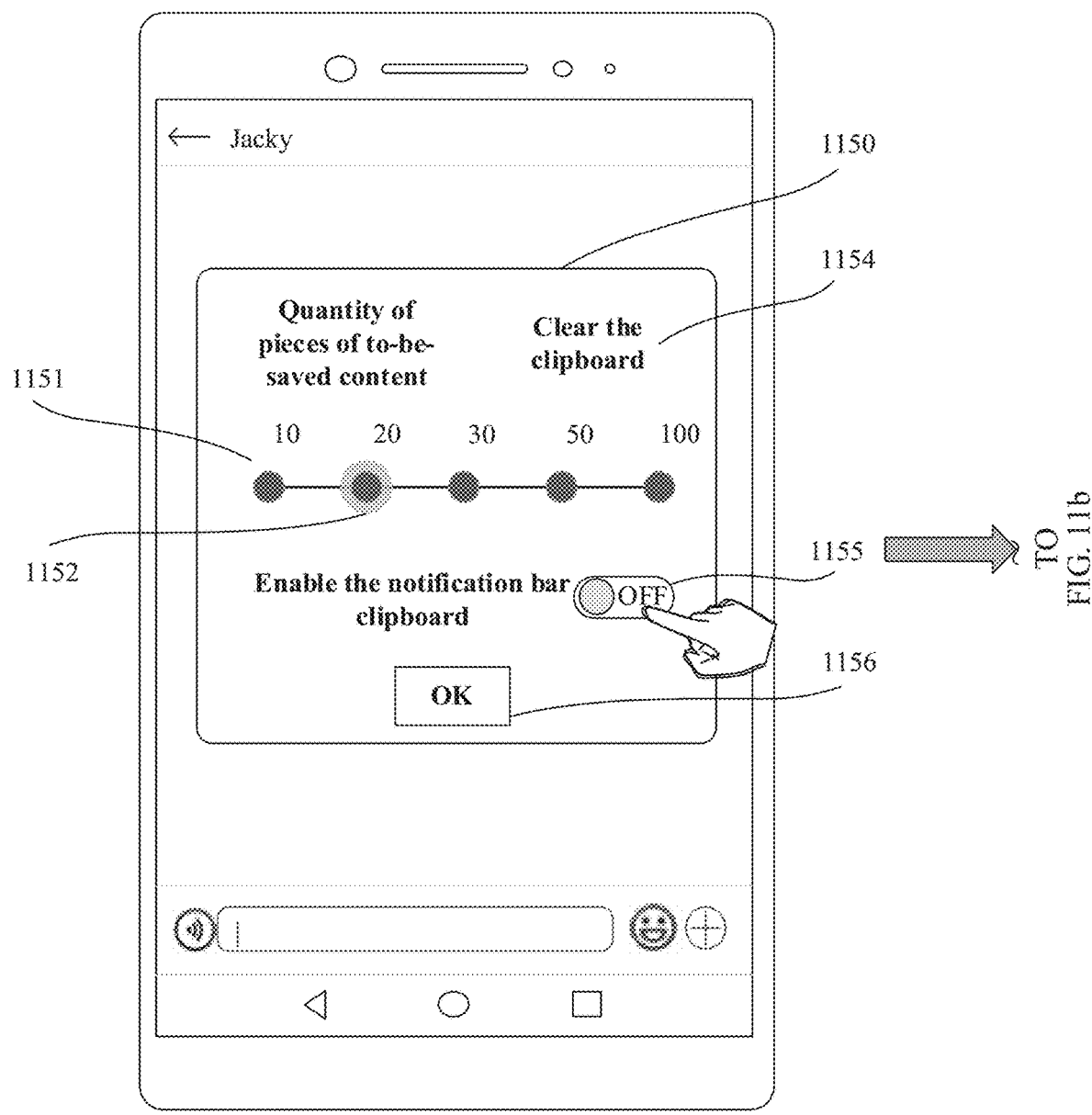
FIGS. 11a and 11b are a schematic diagram of another group of interfaces according to an embodiment of this application.
Figure 11B:
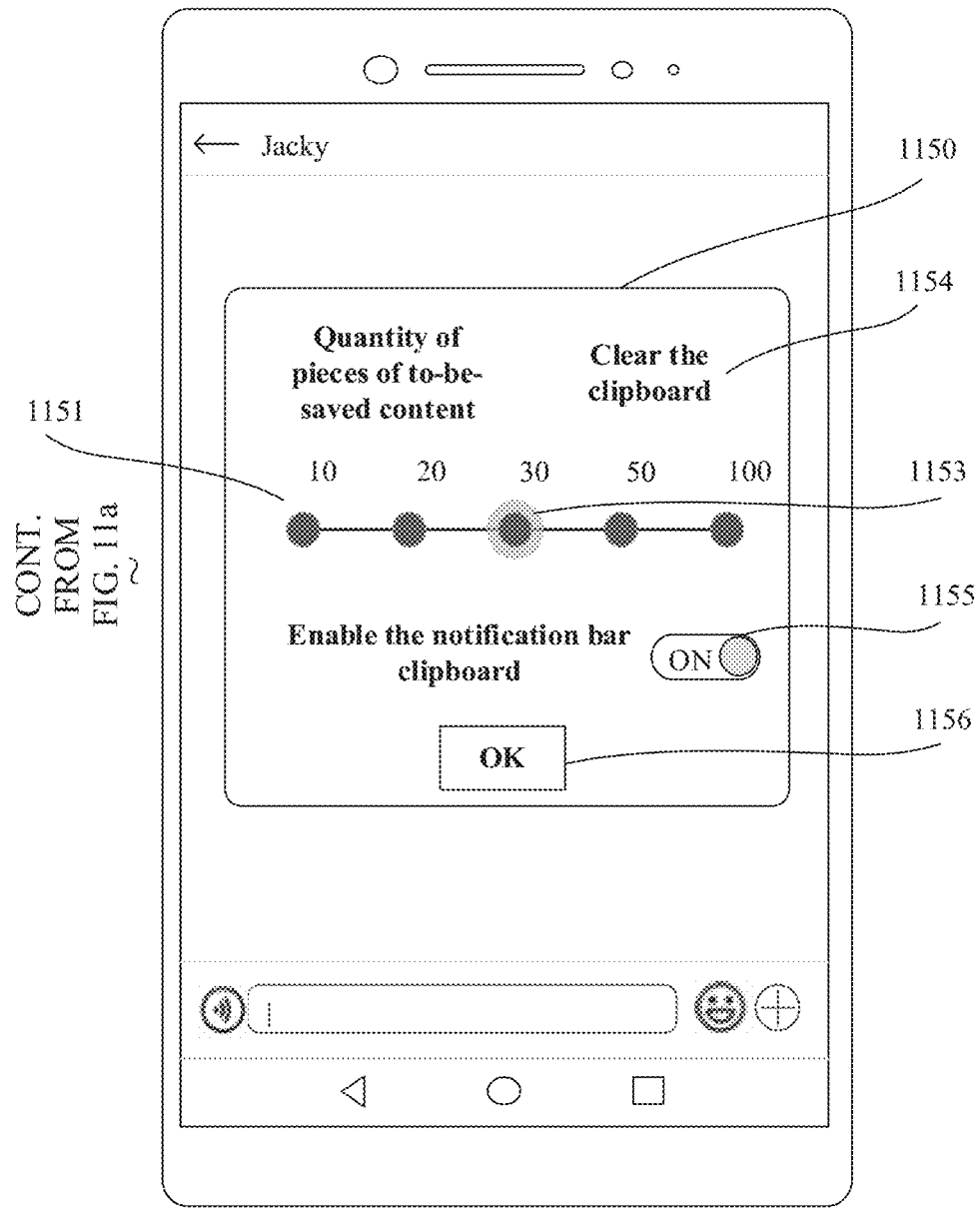

The user Lily may also manage content saved in the clipboard. Refer to the function region 1033 shown in FIG. 10c. When detecting an operation (for example, tapping) performed on the setting control in the function region 1033, the mobile phone 100 displays a window 1150 shown in FIG. 11a in response to the operation. A function control 1151 for a quantity of pieces of to-be-saved content may be displayed in the window 1150. The function control 1151 may have a plurality of options for the quantity of pieces of to-be-saved content, for example, 10, 20, 30, 50, and 100. The user may set, in the function control 1151, the quantity of pieces of content to be saved in the clipboard. For example, the quantity is set to an option 1152 in FIG. 11a, that is, the quantity of pieces of to-be-saved content is 20. If the user expects that 30 pieces can be saved, the user may tap an option 1153 to display the highlighted option 1153 shown in FIG. 11b, in other words, the quantity of pieces of to-be-saved content is 30.

The window 1150 may further include a function control 1154 for clearing the clipboard. For example, when detecting an operation (for example, tapping) performed on the function control 1154, the mobile phone 100 clears, in response to the operation, content saved in the clipboard. In this way, all content in the clipboard can be deleted at once.

Refer to 11a. The window 1150 may further include an on/off control 1155 of a notification bar clipboard, and the on/off control 1155 shows that the notification bar clipboard is in an off state (OFF). When detecting an operation (for example, tapping) performed on the on/off control 1155, the mobile phone 100 enables the notification bar clipboard in response to the operation, to display the on/off control 1155 in an on state (ON) shown in FIG. 11b. After the notification bar clipboard is enabled, a clipboard 1211 is displayed in a notification bar in FIG. 12b. In addition, an operation may also be performed on the on/off control 1155 in the on state (ON) shown in FIG. 11b, to disable the notification bar clipboard.

After the user manages the clipboard, for example, performs any one or more of setting the quantity of pieces of to-be-saved content, clearing the clipboard, and enabling or disabling the notification bar clipboard, the user may tap an "OK" control 1156 to save the settings performed by the user.

FIGS. 12a to 12d illustrate another operation of enabling a clipboard on the mobile phone 100.

Figure 12A:
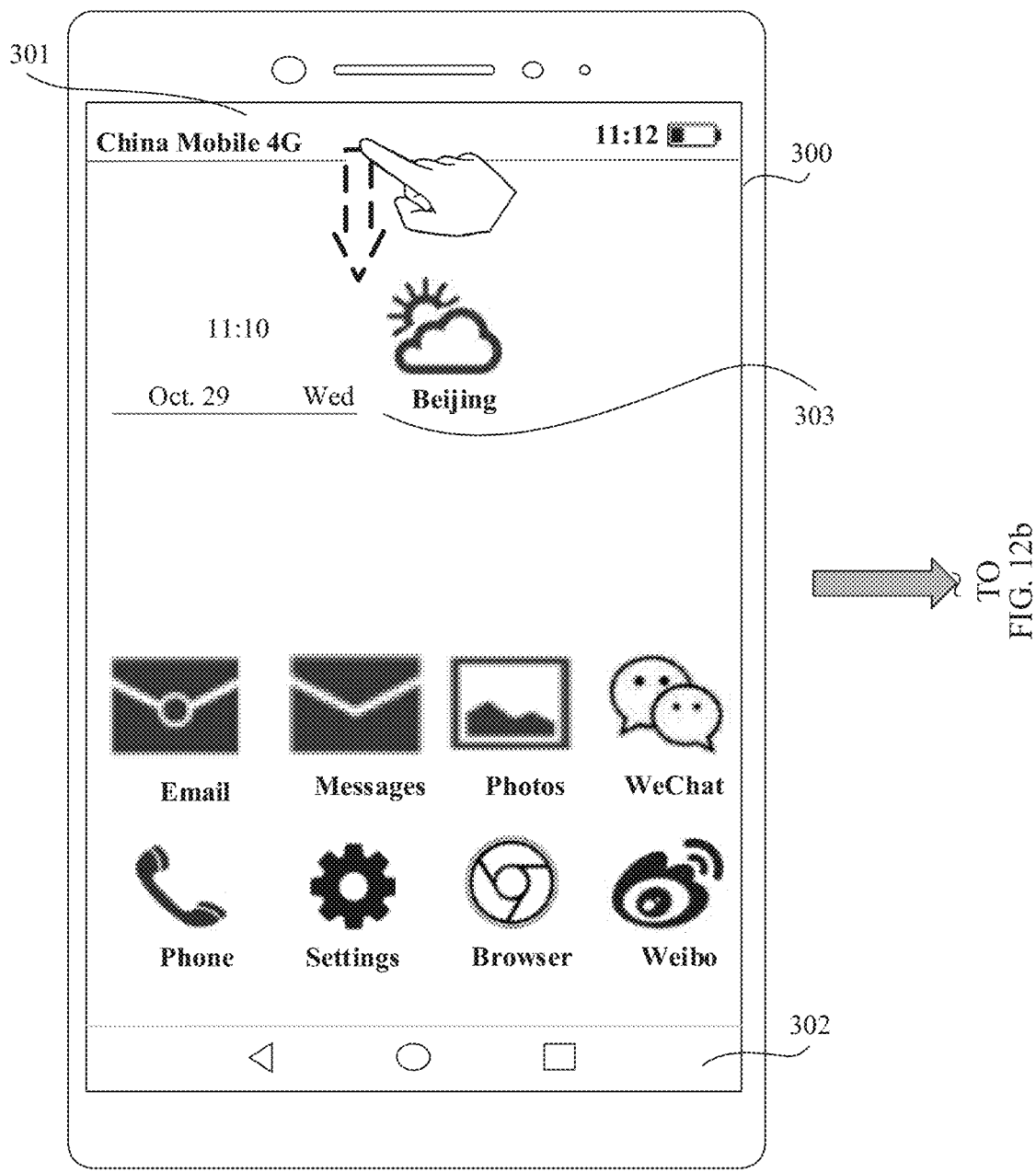
FIGS. 12a to 12d are a schematic diagram of another group of interfaces according to an embodiment of this application.
Figure 12B:
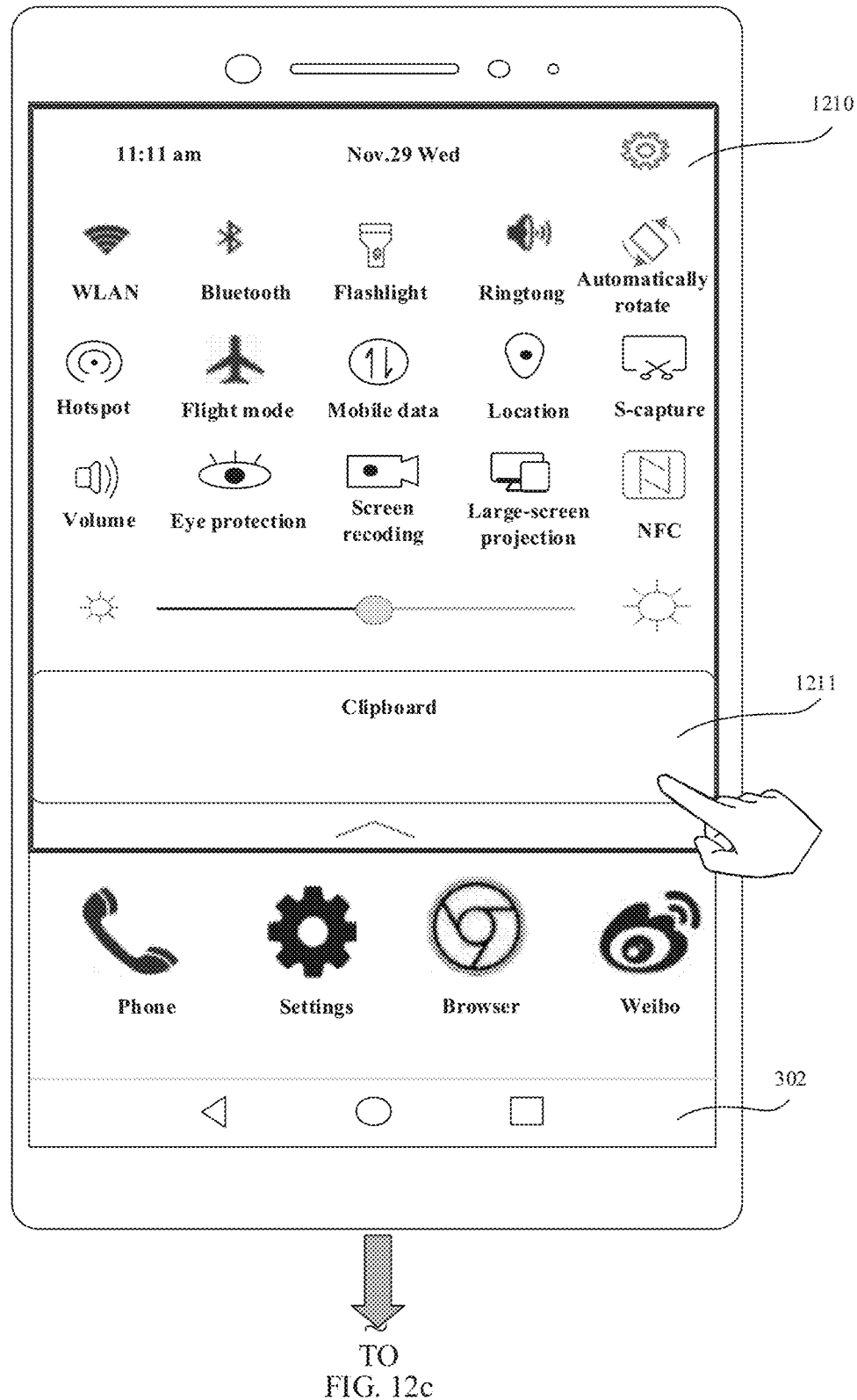

As shown in FIG. 12a, when detecting a downward slide gesture performed on the status bar 301, the mobile phone 100 may display a window 1210 in the user interface 300 in response to the gesture. As shown in FIG. 12b, in the window 1210, the notification bar clipboard 1211 may be displayed, and on/off controls of other functions (for example, a WLAN, Bluetooth, a flashlight, a ringtone, and automatic rotation) may be further displayed. When the mobile phone 100 detects an operation performed on the notification bar clipboard 1211 (for example, a touch operation on the notification bar clipboard 1211), the mobile phone 100 may enable the clipboard in response to the operation.

In other words, the user of the mobile phone 100 may make a downward slide gesture at the status bar 301 to open the window 1210, and may tap the notification bar clipboard 1211 of the clipboard in the window 1210 to conveniently enable the clipboard.

In this embodiment of this application, after the clipboard is enabled by using the operations shown in FIGS. 12a and 12b, an application in the mobile phone 100 may save, in the clipboard, a text or a picture in the application. For example, refer to 3c. When detecting an operation performed on the copy control 322, the mobile phone 100 saves the picture 311 in the clipboard.

When the user needs to view or use content (a picture or a text) in the clipboard, the user may enter the clipboard from the notification bar clipboard 1211. For example, when detecting an operation performed on the notification bar clipboard 1211, the mobile phone 100 may display a window 1220 shown in FIG. 12c. Saved content, for example, the picture 311, the picture 732, and a text 1221, may be displayed in the window 1220.

Figure 12C:
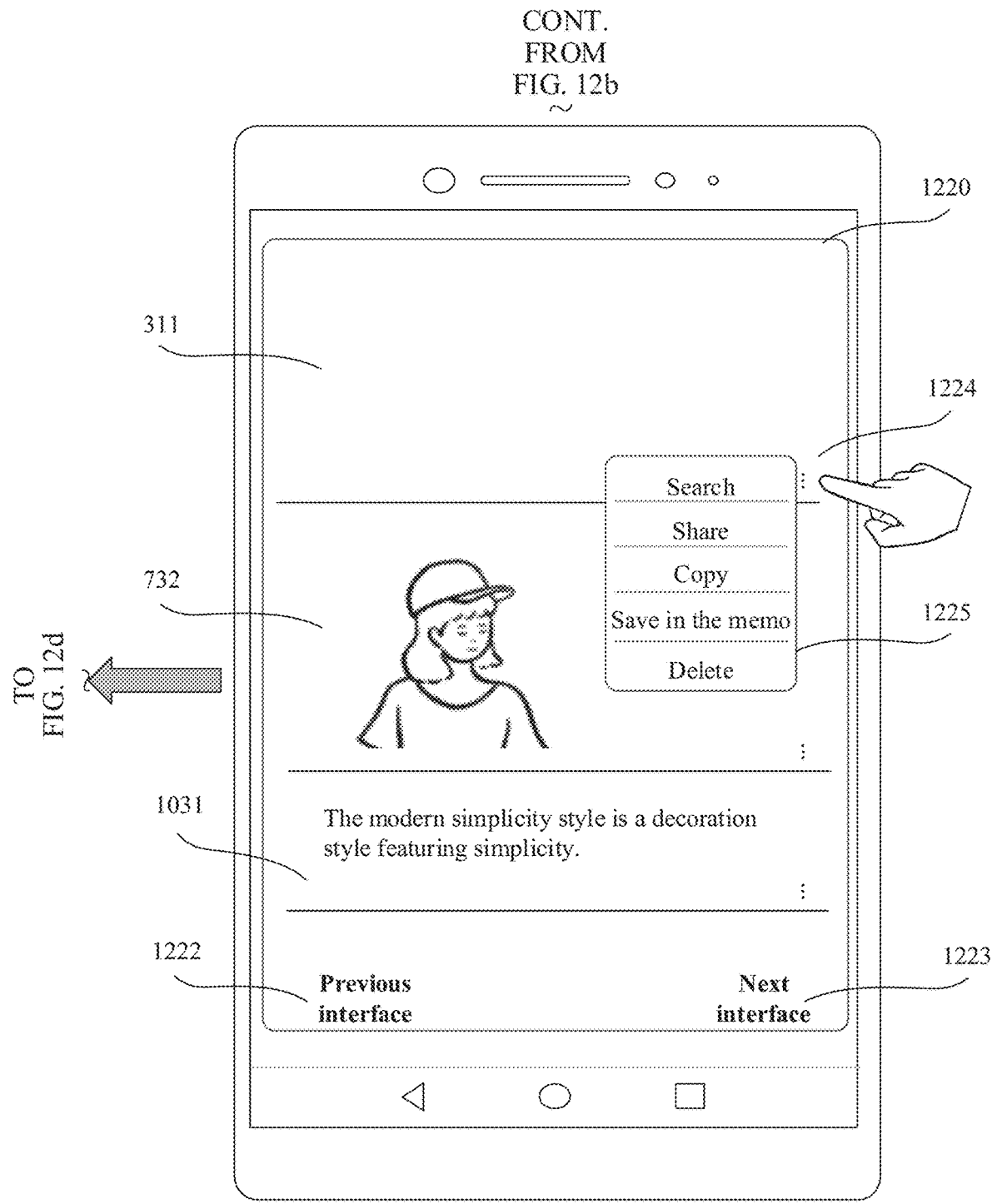
Figure 12D:
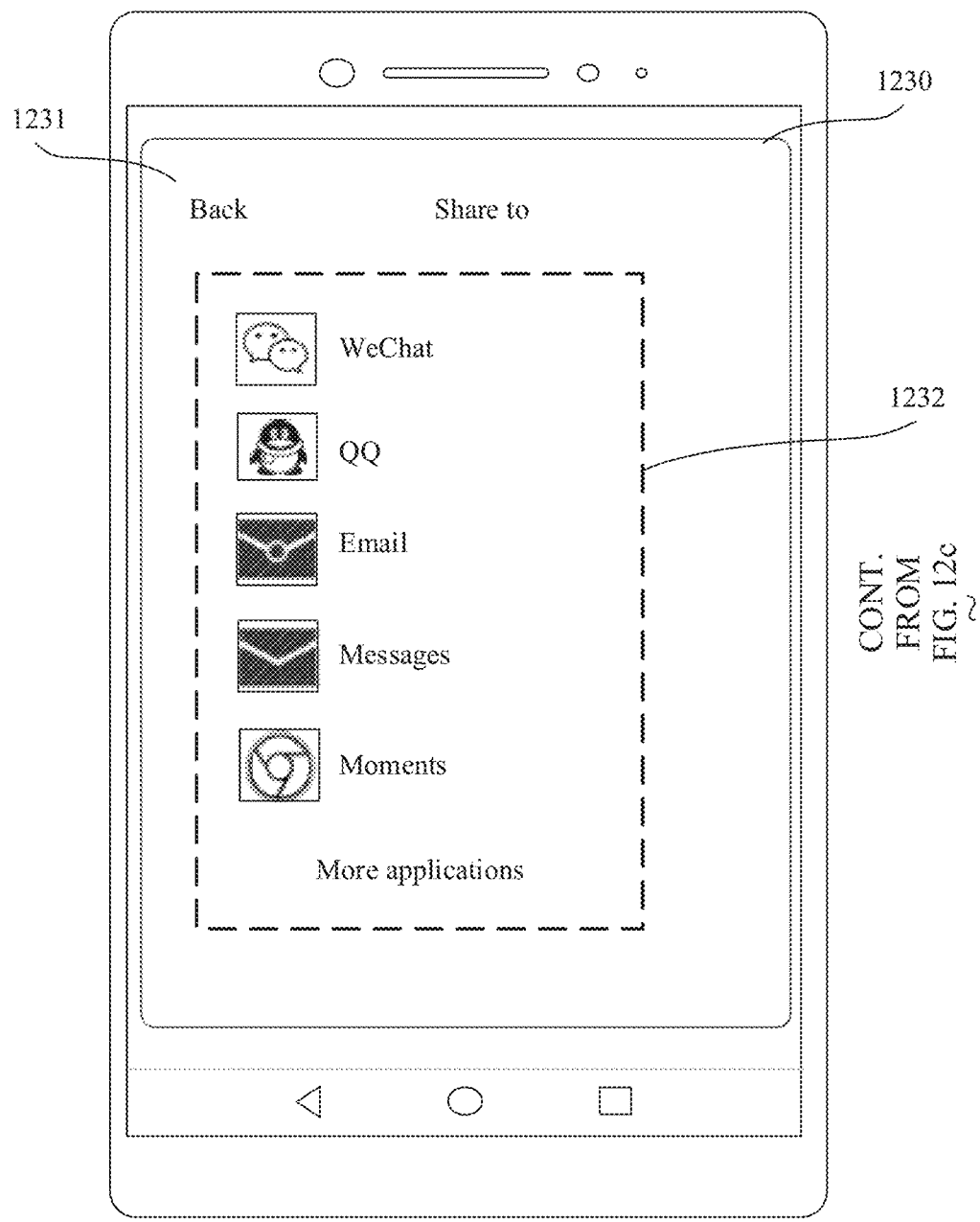

Content that can be displayed in the window 1220 is limited. When the clipboard includes much content, the user may view the content by page. As shown in FIG. 12c, the window 1220 may further include a control 1222 and a control 1223. The control 1222 is used to monitor an operation of returning to a previous interface, and the control 1223 is used to monitor an operation of entering a next interface. Optionally, the window 1220 may further include a control 1224, used to monitor an operation of deleting selected content in the clipboard.

A setting control corresponding to each piece of content (for example, the setting control 1224 corresponding to the picture 311 shown in FIG. 12c) may be further displayed in the window 1220. For example, when detecting an operation (for example, tapping) performed on the setting control 1224, the mobile phone 100 displays a window 1225 in response to the operation. The window 1225 includes a plurality of function controls, for example, controls of functions of searching, sharing, copying, saving in the memo, and deleting. For example, when detecting an operation performed on the share control, the mobile phone 100 displays a window 1230 shown in FIG. 12d in response to the operation. A plurality of social applications 1232 such as WeChat, QQ, Email, Messages, and Moments may be displayed in the window 1230. For example, when the user chooses to share by using WeChat, the mobile phone 100 displays the user interface 950 shown in FIG. 9e, and then the user selects a user and shares the picture 311 with the user. The window 1230 may further include a back button 1231, which may be used to return to a previous interface. The previous interface may be a user interface that is shown in FIG. 12c and in which the window 1225 is displayed.

The following provides an example of sharing content in a clipboard with another user in a social application (for example, the WeChat application).

Figure 13:
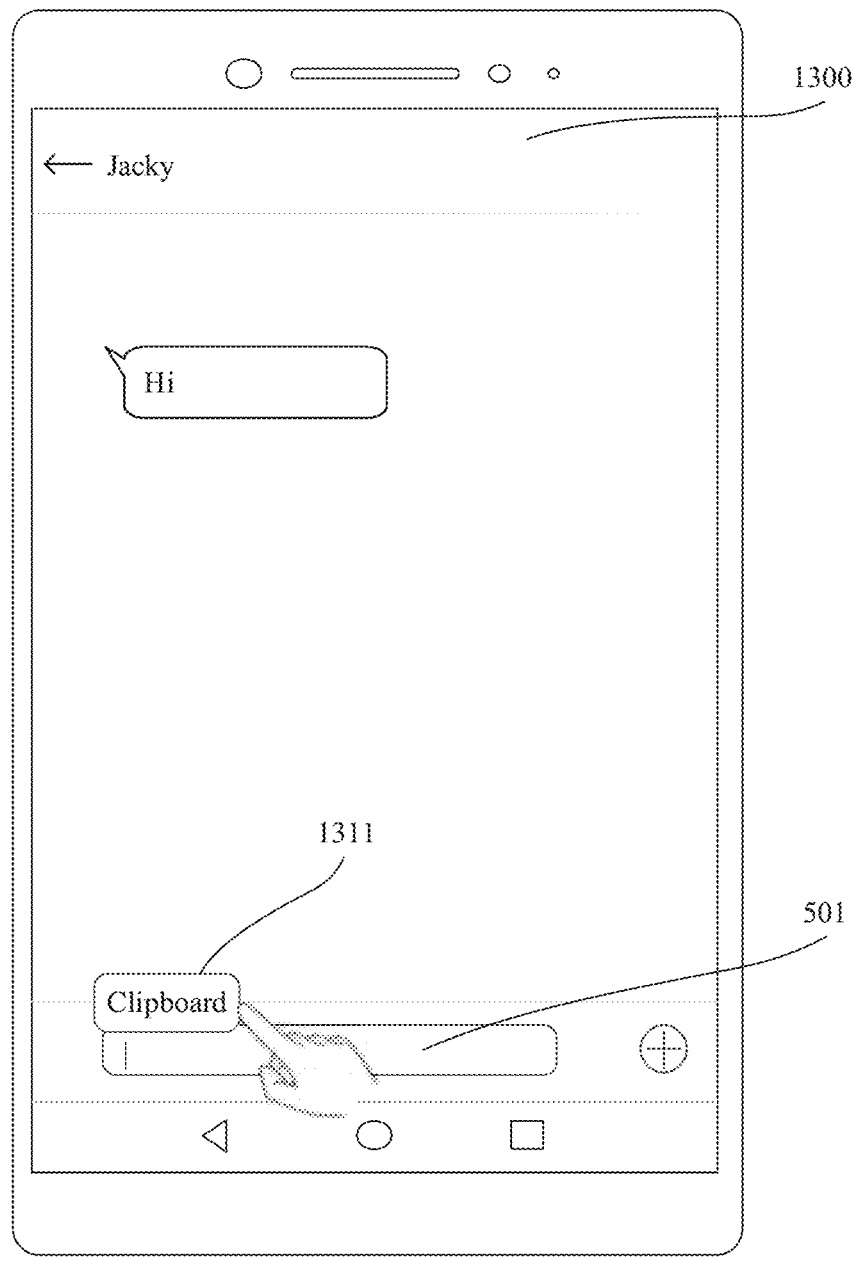
FIG. 13 is a schematic diagram of another group of interfaces according to an embodiment of this application.

Refer to FIG. 13. The mobile phone 100 displays a user interface 1300. The user interface 1300 includes the chat input box 501. When detecting an operation (for example, touching and holding) performed on the chat input box 501, the mobile phone 100 displays a clipboard control 1231. When detecting an operation (for example, tapping) performed on the clipboard control 1231, the mobile phone 100 displays the window 1030 shown in FIG. 10c. The user Lily of the mobile phone 100 may select, from the window 1030, content that needs to be shared, for example, select the picture 311, and send the picture 311 to another user. For related content, refer to the descriptions of 10c and FIG. 10d. Details are not described herein again.

The shortcut bar and the clipboard may be used separately or in combination. For example, when a text is copied and saved in the clipboard, a picture may be saved in the shortcut bar. For another example, when the clipboard is used to save a picture, a text may be copied and saved in the shortcut bar. For another example, same content (a picture and/or a picture) is saved in both the clipboard and the shortcut bar.

In the foregoing embodiments, after content that needs to be shared is obtained by using the screen recognition function, the picture that needs to be shared may be displayed in a region in a user interface, and then the picture is selected from the region by using the second application for sharing. In some other embodiments, after content that needs to be shared is obtained by using the screen recognition function, the picture that needs to be shared may be directly shared.

Figure 14A:
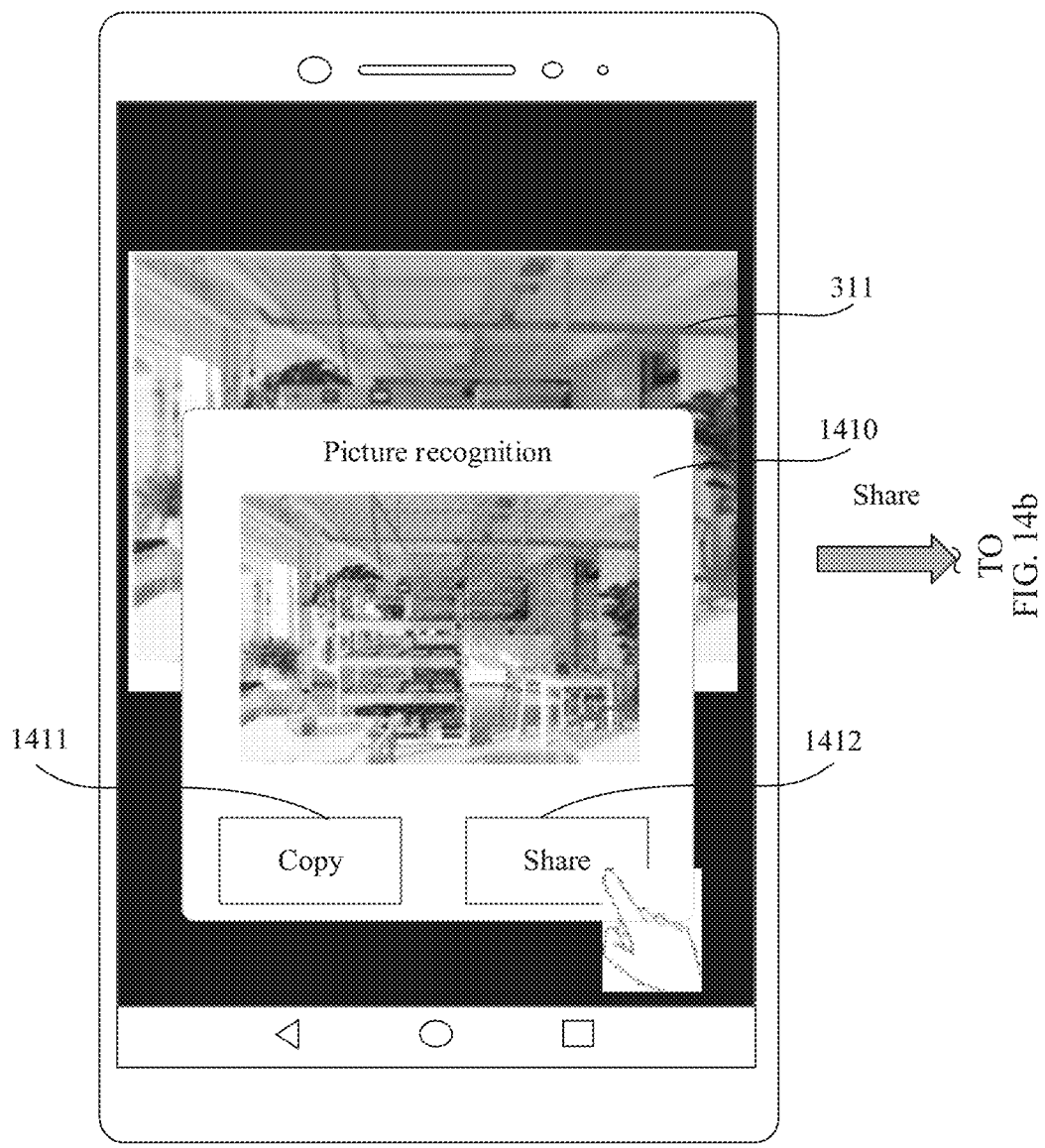
FIGS. 14a to 14d are a schematic diagram of another group of interfaces according to an embodiment of this application.

The following uses an example in which the screen recognition function is triggered for the user interface 310 shown in FIG. 3b. The mobile phone 100 displays a picture recognition window 1410 shown in FIG. 14a. The picture recognition window 1410 may include a copy control 1411, and may also include a share control 1412. For a process of sharing a picture by performing an operation on the copy control 1411, refer to the related descriptions of the copy control 322 in FIGS. 3a to 3h.

The following uses an operation on the share control 1412 as an example to describe in detail a process of sharing a picture.

Figure 14B:
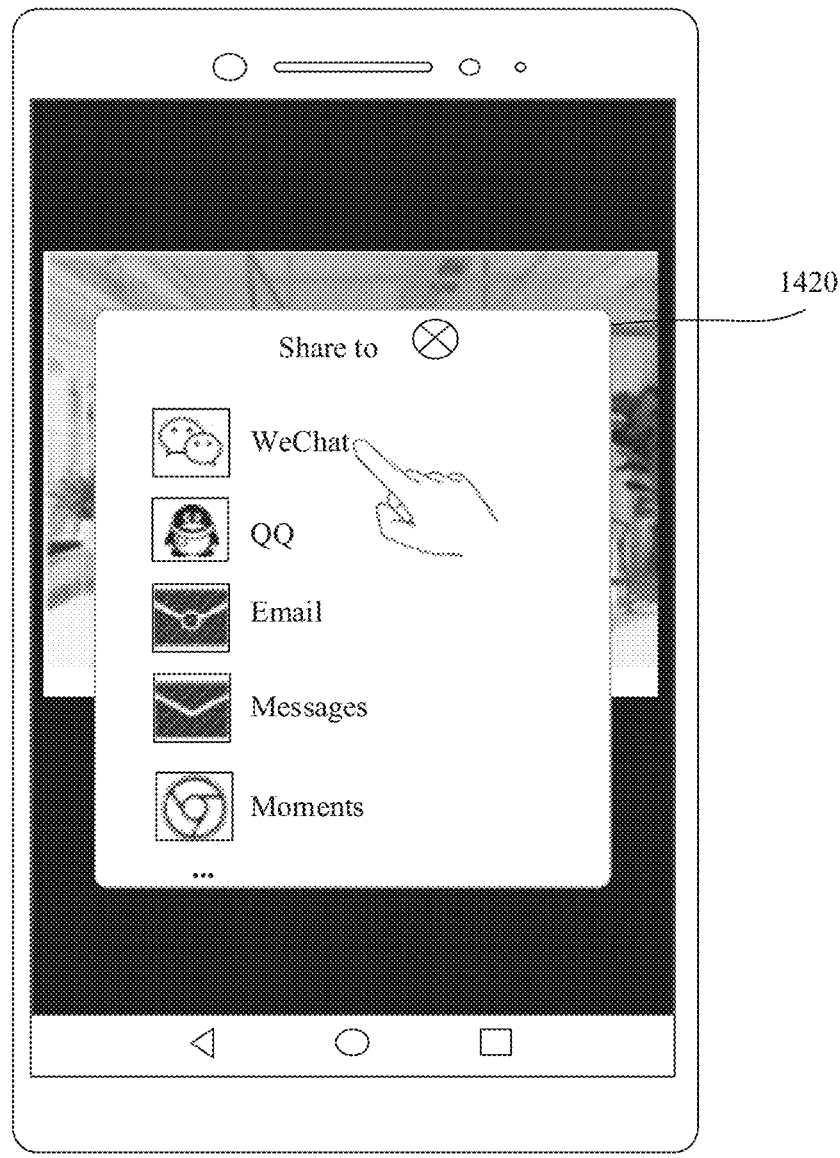
Figure 14C:
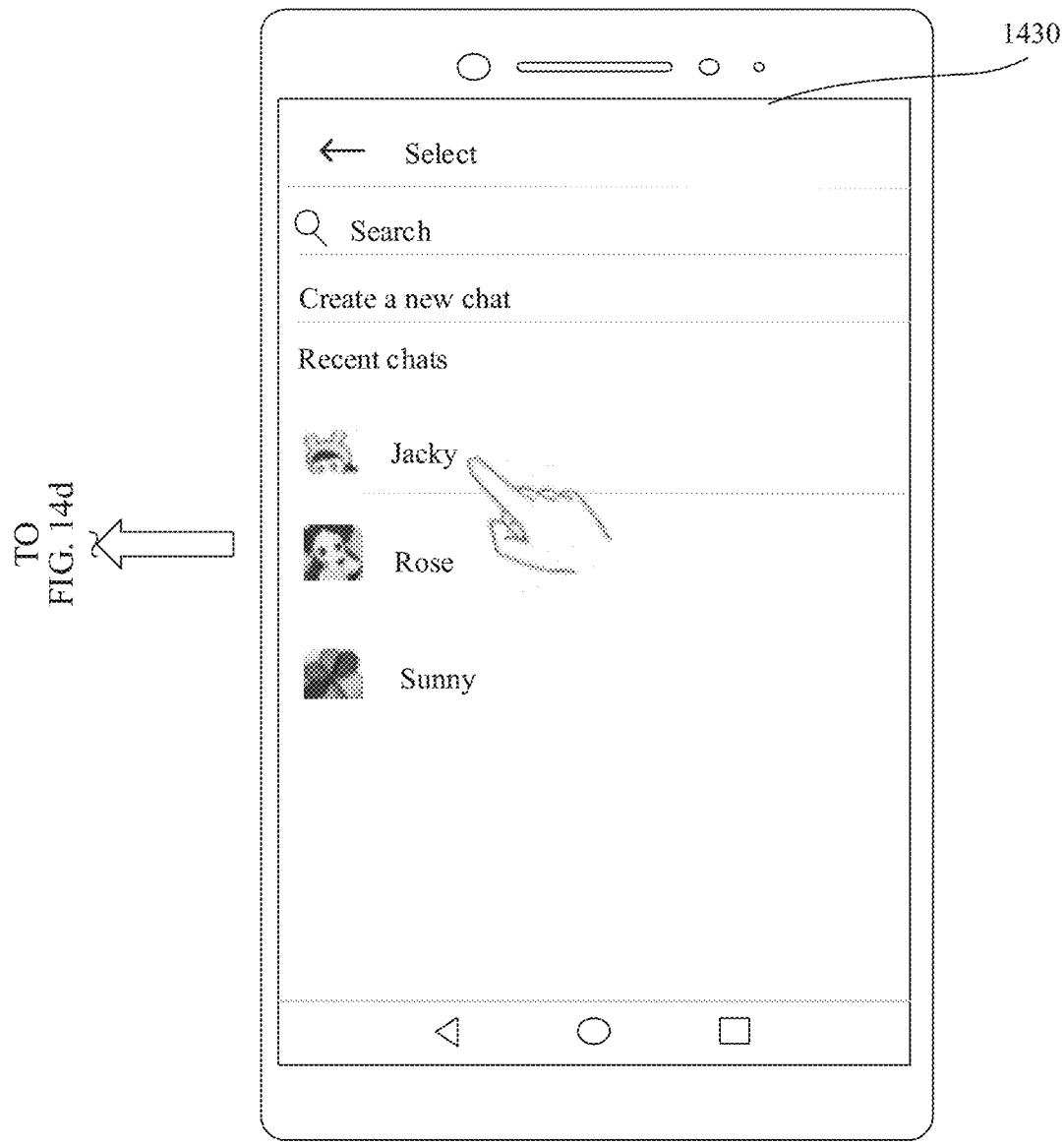

Refer to 14a. When detecting an operation (for example, tapping) performed on the share control 1412, the mobile phone 100 displays a window 1420 shown in FIG. 14b. The window 1420 includes a plurality of applications, including but not limited to WeChat, QQ, Email, Messages, Moments, and the like shown in FIG. 14b. The user may select, from the window 1420, an application for sharing the picture 311 with another user. When the user chooses to share the picture 311 by using WeChat, the mobile phone 100 may display a user interface 1430 shown in FIG. 14c. The user Lily of the mobile phone 100 may select one or more users from users such as Jacky, Rose, and Sunny in recent chats, and share the picture 311 with the one or more users, or may create a new chat, select another user from the address book, and share the picture 311 with the another user. For example, when Lily chooses to share the picture 311 with Jacky, the mobile phone 100 displays a window 1440 shown in FIG. 14d, or displays the user interface 350 shown in FIG. 3g. For content of the user interface 350, refer to the foregoing related descriptions. Details are not described herein again.

Figure 14D:
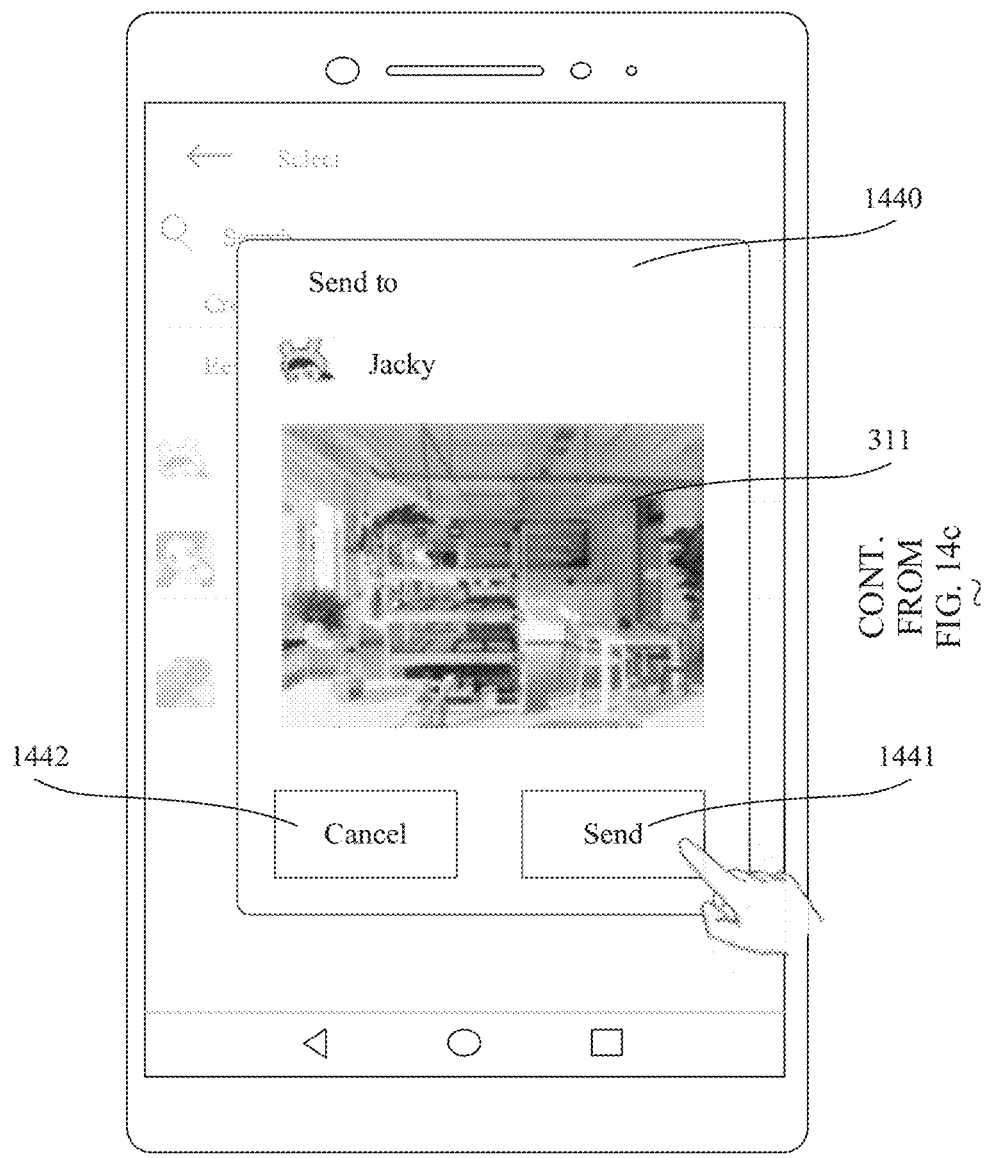

The window 1440 shown in FIG. 14*d* includes the picture 311, and may further include a send control 1441 and a cancel control 1442. In an example, the user may choose to continue to share the picture 311 with Jacky. When detecting an operation of triggering the send control 1441 by the user, the mobile phone 100 displays the user interface 350 shown in FIG. 3*g* in response to the operation. In another example, if the user does not expect to share the picture 311, the user may trigger the cancel control 1442 to cancel sharing of the picture 311 with Jacky. When detecting an operation performed on the cancel control 1442, the mobile phone 100 displays the user interface 1430 shown in FIG. 14*c*. The user may reselect another user in the user interface 1430, and share the picture 311 with the another user.

After the picture 311 is directly shared with another user, the mobile phone 100 directly releases the picture 311 in the internal memory 121, and the user does not need to manually clean the picture 311, so that operations of the user can be simplified, and user experience can be improved.

In this embodiment of this application, the following implementation may be further provided: A picture in the Weibo application is saved in the internal memory 121, then the picture is invoked from the local memory 121 for sharing when the picture is shared with another user by using the WeChat application, and the picture saved in the local memory 121 is automatically deleted after the picture is shared.

Figure 15A:
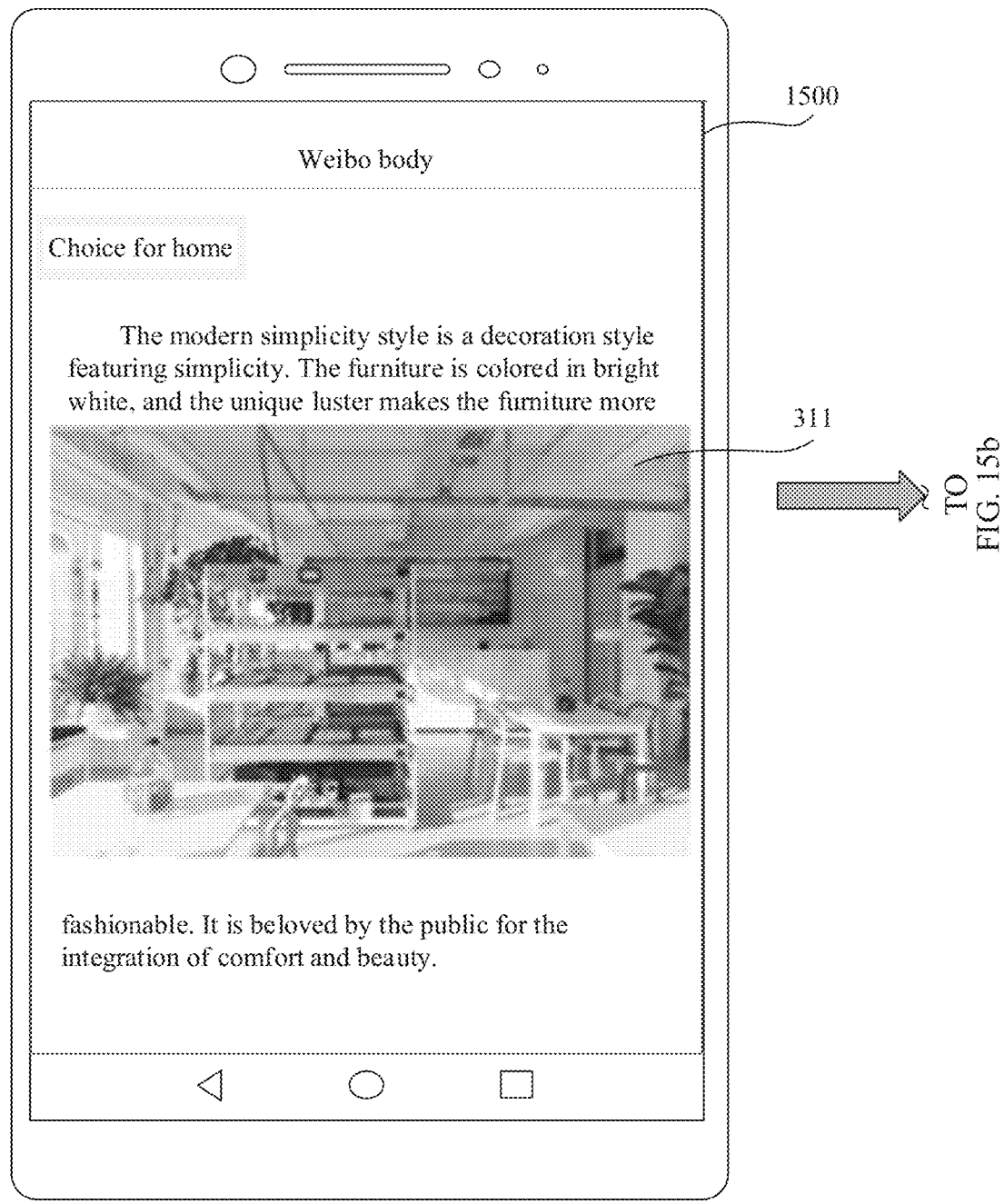
FIGS. 15a and 15b are a schematic diagram of another group of interfaces according to an embodiment of this application.
Figure 15B:
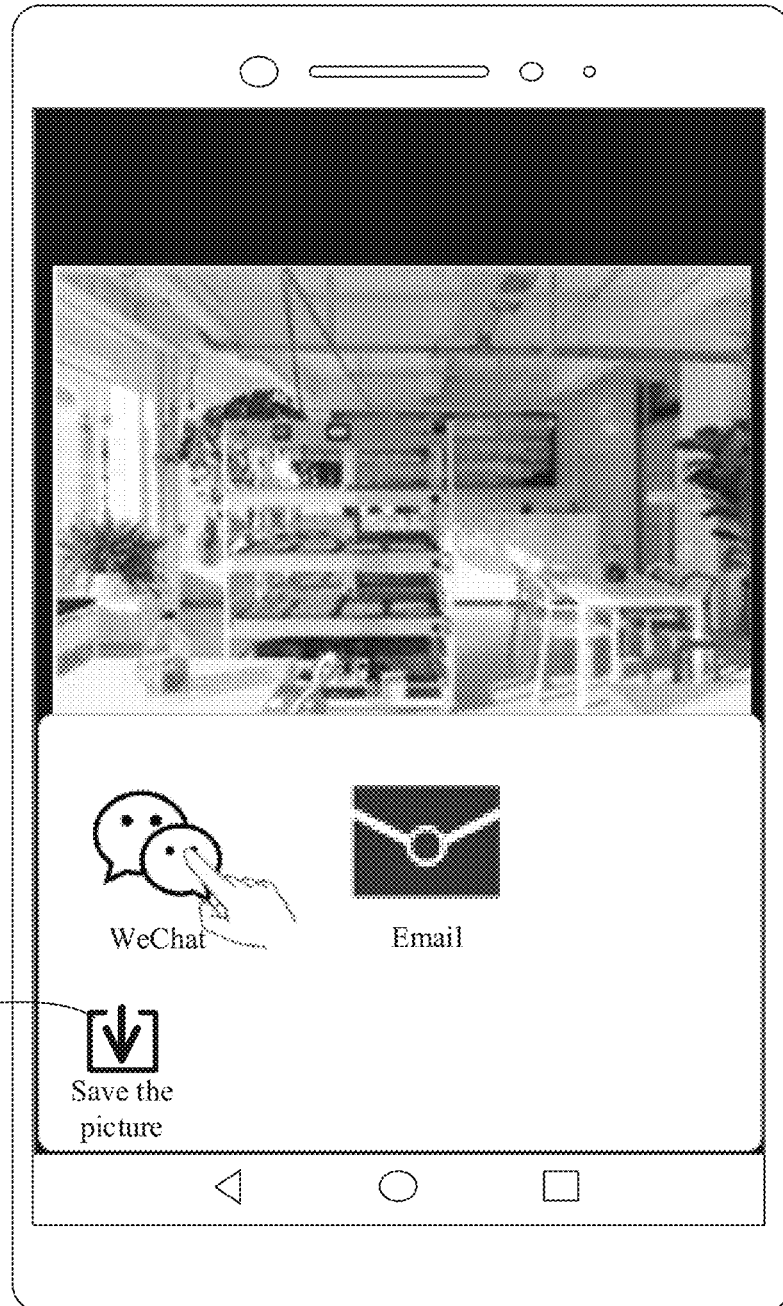

For example, for a process of saving a picture in the Weibo application in the internal memory 121, refer to FIGS. 15*a* and 15*b*. When detecting an operation performed on a control 1501 shown in FIG. 15*b*, the mobile phone 100 saves the picture 311 in the internal memory 121 of the mobile phone in response to the operation. When the user wants to view the picture 311, the user may enter Photos by using a Photos icon shown in FIG. 3*a*, to view the picture 311.

Figure 16A:
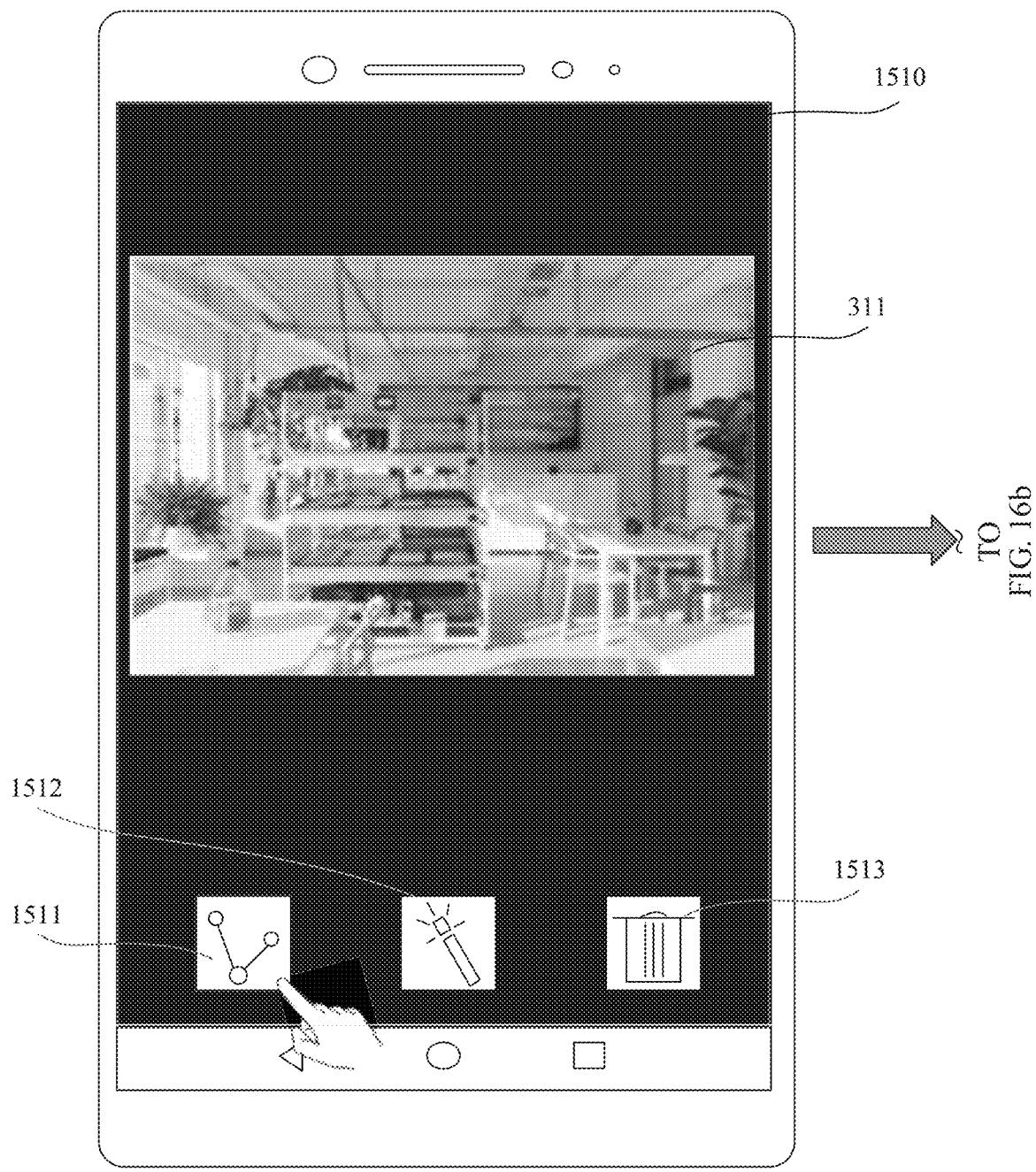
FIGS. 16a and 16b are a schematic diagram of another group of interfaces according to an embodiment of this application.

When the picture 311 is opened in Photos, a user interface 1510 shown in FIG. 16*a* is displayed. In the user interface 1510, the picture 311 may be displayed, and a plurality of controls that can implement an operation on a picture, for example, a share control 1511, an edit control 1512, and a delete control 1513, may be further displayed. The share control 1511 may monitor an operation of sharing a picture with another user, the edit control 1512 may monitor an operation of editing a picture, and the delete control 1513 may monitor an operation of deleting a picture.

Figure 16B:
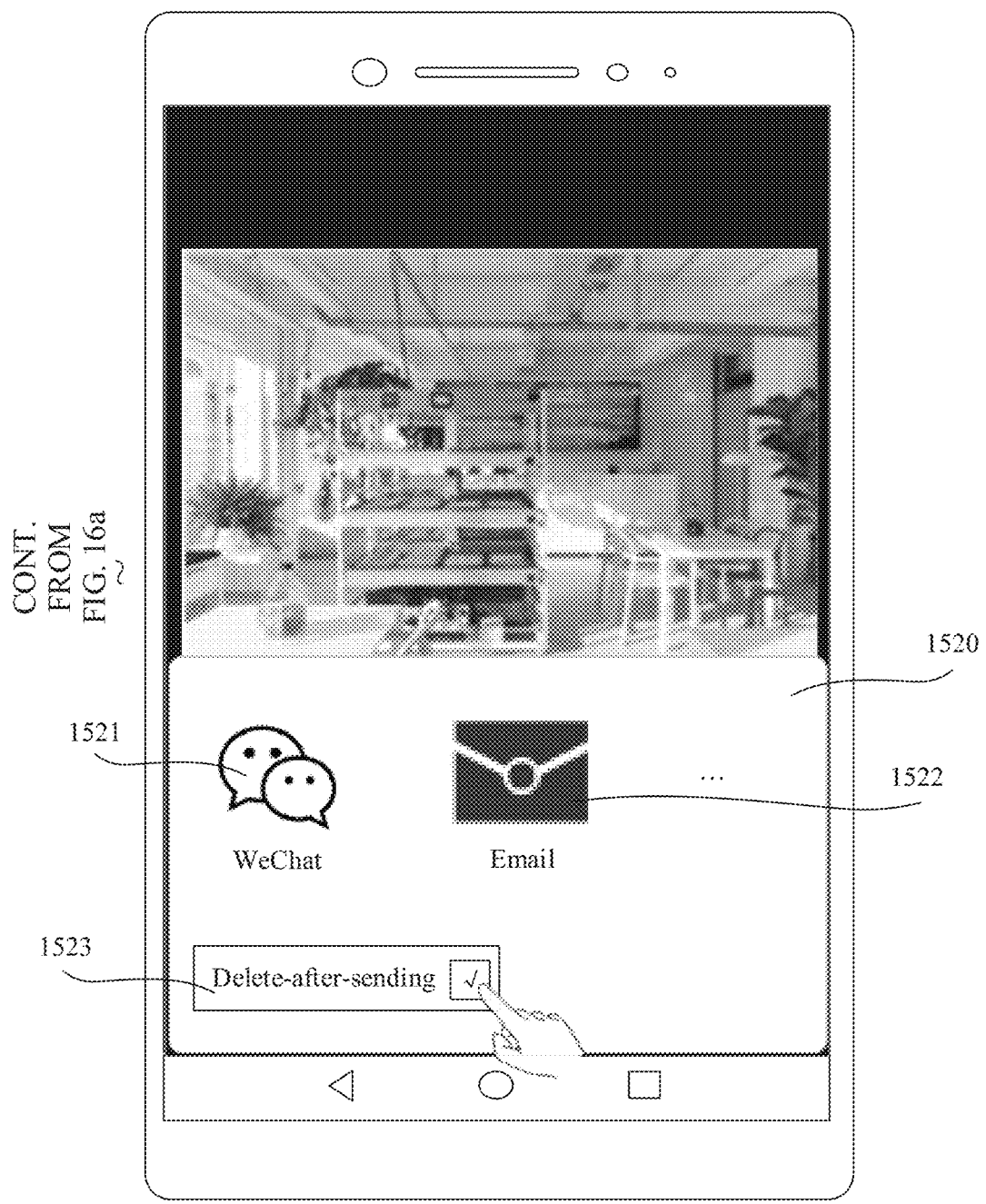

For example, when detecting an operation (for example, tapping) performed on the share control 1511, the mobile phone 100 displays a window 1520 shown in FIG. 16*b* in response to the operation. In the window 1520, a plurality of applications that can be used to share a picture, for example, a WeChat application 1521 and an Email application 1522, may be displayed, and a delete-after-sending option 1532 may be further included. After the user selects the delete-after-sending option 1532, the picture 311 in Photos can be automatically deleted after the picture 311 is sent by using an application, so that the user may not need to manually clean the internal memory 121.

The implementations of this application can be randomly combined to implement different technical effects.

Figure 17:
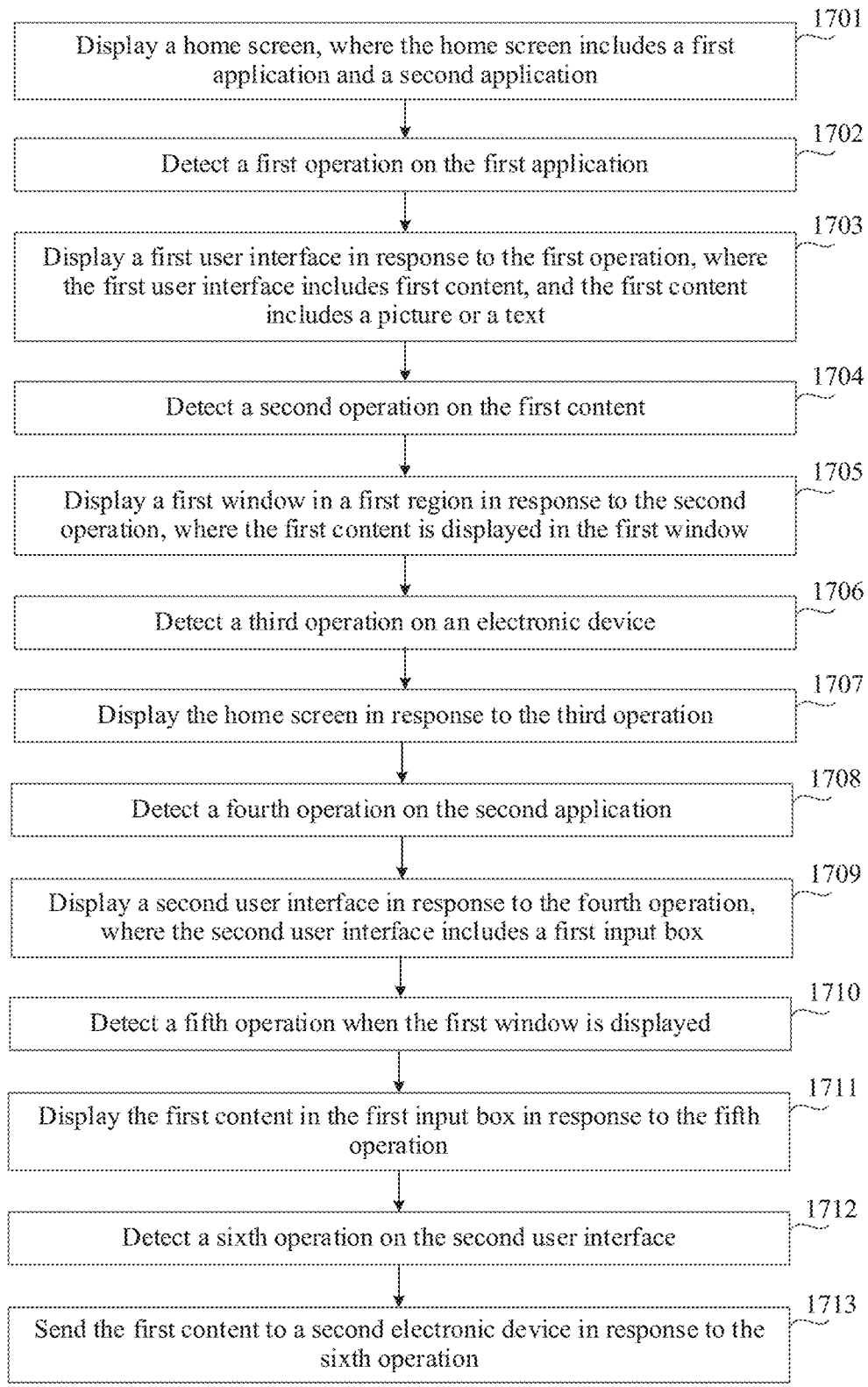
FIG. 17 is a schematic flowchart of a content sharing method according to an embodiment of this application.

With reference to the foregoing embodiments and the accompanying drawings, an embodiment of this application provides a content sharing method. The method may be implemented in an electronic device with the hardware structure shown in FIG. 1. As shown in FIG. 17, the content sharing method provided in this embodiment of this application may include the following steps.

Step 1701: Display a home screen, where the home screen includes a first application and a second application.

For example, the home screen may be the home screen 300 shown in FIG. 3*a*, the first application is a Weibo application, and the second application is a WeChat application.

Step 1702: Detect a first operation on the first application.

For example, if the first application is the Weibo application, the first operation may be an operation of tapping, by a user, the Weibo icon 305 shown in FIG. 3*a*.

Step 1703: Display a first user interface in response to the first operation, where the first user interface includes first content, and the first content includes a picture or a text.

For example, if the first application is the Weibo application, the first user interface may be an interface displayed after the Weibo application is enabled, for example, the interface 310 of the Weibo application shown in FIG. 3*b*, and the first content may be the picture 311, or may be a text in the interface 310.

Step 1704: Detect a second operation on the first content.

For example, if the first content is the picture 311 shown in FIG. 3*b*, the second operation may be the two-finger pressing operation shown in FIG. 3*b*.

Step 1705: Display a first window in a first region in response to the second operation, where the first content is displayed in the first window.

For example, the first window may be the shortcut bar 331 shown in FIG. 3*d*, and the shortcut bar 331 includes the picture 311.

Step 1706: Detect a third operation on an electronic device.

For example, the third operation may be a tap operation on a home (home) button icon of the electronic device, or may be a tap operation on a floating button, on the electronic device, with a function of returning to the home screen.

Step 1707: Display the home screen in response to the third operation.

Step 1708: Detect a fourth operation on the second application.

For example, if the second application is the WeChat application, the fourth operation may be an operation of tapping, by the user, the WeChat icon 304 shown in FIG. 3*a*.

Step 1709: Display a second user interface in response to the fourth operation, where the second user interface includes a first input box.

For example, if the second application is the WeChat application, the second user interface may be the interface 340 shown in FIG. 3*f*, and the first input box may be the chat input box 342 in the interface 340.

Step 1710: Detect a fifth operation when the first window is displayed.

For example, the fifth operation may be an operation of dragging the thumbnail 332 corresponding to the picture 311 to the input box 342 shown in FIG. 3*f*.

Step 1711: Display the first content in the first input box in response to the fifth operation.

Step 1712: Detect a sixth operation on the second user interface.

For example, the sixth operation may be an operation of tapping a "send" control in FIG. 3*g*.

Step 1713: Send the first content to a second electronic device in response to the sixth operation.

In the foregoing embodiments provided in this application, the method provided in the embodiments of this application is described from a perspective of an electronic device serving as an execution body. To implement functions in the foregoing method provided in the embodiments of this application, the electronic device may include a hardware structure and/or a software module, and implement the foregoing functions in a form of a hardware structure, a software module, or a hardware structure and a software module. Whether a function in the foregoing functions is performed in a form of a hardware structure, a software module, or a hardware structure and a software module depends on particular applications and design constraints of the technical solutions.

Based on the context, the term "when" used in the foregoing embodiments may be interpreted as a meaning of "if" or "after" or "in response to determining" or "in response to detecting". Similarly, based on the context, the phrase "when it is determined that" or "if (a stated condition or event) is detected" may be interpreted as a meaning of "if it is determined that" or "in response to determining" or "when (a stated condition or event) is detected" or "in response to detecting (a stated condition or event)".

All or some of the foregoing embodiments may be implemented by using software, hardware, firmware, or any combination thereof. When the software is used to implement the embodiments, all or some of the embodiments may be implemented in a form of a program product. The program product includes one or more computer instructions. When the program instructions are loaded and executed on a computer, the procedure or functions according to the embodiments of this application are completely or partially generated. The computer may be a general-purpose computer, a dedicated computer, a computer network, or another programmable apparatus. The computer instructions may be stored in a computer-readable storage medium or may be transmitted from a computer-readable storage medium to another computer-readable storage medium. For example, the computer instructions may be transmitted from a website, computer, server, or data center to another website, computer, server, or data center in a wired (for example, a coaxial cable, an optical fiber, or a digital subscriber line) or wireless (for example, infrared, radio, or microwave) manner. The computer-readable storage medium may be any usable medium accessible by a computer, or a data storage device, such as a server or a data center, integrating one or more usable media. The usable medium may be a magnetic medium (for example, a floppy disk, a hard disk, or a magnetic tape), an optical medium (for example, a DVD), a semiconductor medium (for example, a solid-state drive), or the like.

For a purpose of explanation, the foregoing descriptions are described with reference to specific embodiments. However, the foregoing example discussion is not intended to be detailed, and is not intended to limit this application to a disclosed precise form. According to the foregoing teaching content, many modification forms and variation forms are possible. Embodiments are selected and described to fully illustrate the principles of this application and practical applications of the principles, so that other persons skilled in the art can make full use of this application and various embodiments that have various modifications applicable to conceived specific usage.

Persons of ordinary skill in the art may understand that all or some of the processes of the methods in the embodiments may be implemented by a computer program instructing relevant hardware. The program may be stored in a computer-readable storage medium. When the program runs, the processes of the methods in the embodiments are performed. The foregoing storage medium includes any medium that can store program code, such as a ROM or a random access memory (RAM), a magnetic disk, or an optical disc.

What is claimed is:

1. A method comprising:
    displaying, by a first electronic device, a home screen comprising a first icon of a first application and a second icon of a second application;
    detecting a first operation on the first icon;
    displaying, in response to the first operation, a first user interface of the first application comprising first content, wherein the first content comprises a first picture;
    detecting a second operation on the first content;
    displaying, in response to the second operation, a first window in a first region, wherein the first window comprises a first thumbnail of the first picture and a second thumbnail of a second picture, and wherein the second picture corresponds to second content;
    detecting a third operation on the first electronic device;
    displaying, in response to the third operation, the home screen;
    detecting a fourth operation on the second icon;
    displaying, in response to the fourth operation, a second user interface of the second application;
    detecting a fifth operation on the first thumbnail and the second thumbnail;
    displaying, in response to the fifth operation, a preview window comprising the first picture and the second picture;
    detecting a sixth operation on the second user interface; and
    sending, in response to the sixth operation, the first content and the second content to a plurality of second electronic devices.

2. The method of claim 1, further comprising:
    displaying, in response to the second operation, a third user interface comprising a copy control;
    detecting a seventh operation on the copy control; and
    further displaying, in response to the seventh operation, the first window in the first region.

3. The method of claim 1, wherein before detecting the fifth operation, the method further comprises:
    stopping displaying the first window in the first region;
    detecting, on the first electronic device, an eighth operation comprising one of a slide gesture in a first direction of the first region, a touch and hold gesture in the first region, or tapping a floating window when the first electronic device displays the floating window; and
    further displaying, in response to the eighth operation, the first window in the first region.

4. The method of claim 1, further comprising automatically deleting a screenshot file of the first picture after sending the first content to the second electronic device.

5. The method of claim 1, wherein a first area of the first region is less than a second area of a display region of a display screen.

6. The method of claim 1, wherein either the first region is located on any-side edge of a display region of a display screen or the first region comprises:
    a second region located on a first-side edge of the display region; and
    a third region located on a second-side edge of the display region.

7. The method of claim 1, wherein the second operation further comprises one of:
    touching and holding with two fingers;
    holding with one hand;
    tapping with a knuckle; or
    tapping with the knuckle and drawing a closed pattern.

8. The method of claim 1, wherein the first window further comprises more than two thumbnails of corresponding pictures, the method further comprising:
- detecting a ninth operation comprising moving a finger to select any of the thumbnails; and
- displaying in the preview window, in response to the ninth operation, pictures corresponding to selected thumbnails.

9. A first electronic device comprising:
a memory configured to store instructions; and
one or more processors coupled to the memory, wherein when executed by the one or more processors, the instructions cause the first electronic device to:
- display a home screen comprising a first application and a second application;
- detect a first operation on the first application;
- display, in response to the first operation, a first user interface of the first application comprising first content, wherein the first content comprises a first picture;
- detect a second operation on the first content;
- display, in response to the second operation, a first window in a first region, wherein the first window comprises a first thumbnail of the first picture and a second thumbnail of a second picture, and wherein the second picture corresponds to a second content;
- detect a third operation on the first electronic device;
- display, in response to the third operation, the home screen;
- detect a fourth operation on the second application;
- display, in response to the fourth operation, a second user interface of the second application;
- detect a fifth operation on the first thumbnail and the second thumbnail;
- display, in response to the fifth operation, a preview window comprising the first picture and the second picture;
- detect a sixth operation on the second user interface; and
- send, in response to the sixth operation, the first content and the second content to a plurality of second electronic devices.

10. The first electronic device of claim 9, wherein when executed by the one or more processors, the instructions further cause the first electronic device to:
- display, in response to the second operation, a third user interface comprising a copy control;
- detect a seventh operation on the copy control; and
- display, in response to the seventh operation, the first window in the first region.

11. The first electronic device of claim 9, wherein before detecting the fifth operation, when executed by the one or more processors, the instructions further cause the first electronic device to:
- stop displaying the first window in the first region;
- detect, on the first electronic device, an eighth operation comprising one of a slide gesture in a first direction of the first region, a touch and hold gesture in the first region, or tapping a floating window when the first electronic device displays the floating window; and
- display, in response to the eighth operation, the first window in the first region.

12. The first electronic device of claim 9, wherein when executed by the one or more processors, the instructions further cause the first electronic device to delete a screenshot file of the first picture after sending the first content to the second electronic device.

13. The first electronic device of claim 9, wherein a first area of the first region is less than a second area of a display region of a display screen.

14. The first electronic device of claim 9, wherein either the first region is located on any-side edge of a display region of a display screen or the first region comprises:
- a second region located on a first-side edge of the display region; and
- a third region located on a second-side edge of the display region.

15. The first electronic device of claim 9, wherein the second operation further comprises one of:
- touching and holding with two fingers;
- holding with one hand;
- tapping with a knuckle; or
- tapping with the knuckle and drawing a closed pattern.

16. The first electronic device of claim 9, wherein the first window comprises more than two thumbnails, and wherein when executed by the one or more processors, the instructions further cause the first electronic device to:
- detect a ninth operation comprising moving a finger to select any of the thumbnails; and
- display in the preview window, in response to the ninth operation, pictures corresponding to the selected thumbnails.

17. A computer program product comprising computer-executable instructions that are stored on a non-transitory computer-readable medium and that, when executed by one or more processors, cause a first electronic device to:
- display a home screen comprising a first application and a second application;
- detect a first operation on the first application;
- display, in response to the first operation, a first user interface of the first application comprising first content, wherein the first content comprises a first picture;
- detect a second operation on the first content;
- display, in response to the second operation, a first window in a first region, wherein the first window comprises a first thumbnail of the first picture and a second thumbnail of a second picture, and wherein the second picture corresponds to a second content;
- detect a third operation on the first electronic device;
- display, in response to the third operation, the home screen;
- detect a fourth operation on the second application;
- display, in response to the fourth operation, a second user interface of the second application;
- detect a fifth operation on the first thumbnail and the second thumbnail;
- display, in response to the fifth operation, a preview window comprising the first picture and the second picture;
- detect a sixth operation on the second user interface; and
- send, in response to the sixth operation, the first content and the second content to a plurality of second electronic devices.

18. The computer program product of claim 17, wherein the computer-executable instructions further cause the first electronic device to:
- display, in response to the second operation, a third user interface comprising a copy control;
- detect a seventh operation on the copy control; and
- display, in response to the seventh operation, the first window in the first region.

19. The computer program product of claim 17, wherein before detecting the fifth operation, the computer-executable instructions further cause the first electronic device to:
- stop displaying the first window in the first region;
- detect, on the first electronic device, an eighth operation comprising one of a slide gesture in a first direction of the first region, a touch and hold gesture in the first region, or tapping a floating window when the first electronic device displays the floating window; and
- display, in response to the eighth operation, the first window in the first region.

20. The computer program product of claim 17, wherein the computer-executable instructions further cause the first electronic device to delete a screenshot file of the first picture after sending the first content to the second electronic device.

* * * * *